(12) United States Patent
Williames

(10) Patent No.: US 6,327,986 B1
(45) Date of Patent: Dec. 11, 2001

(54) FIELD TRANSPLANTER

(75) Inventor: Geoffrey Allan Williames, Warragul (AU)

(73) Assignee: Williames Hi-Tech International Pty Ltd. (AU)

( * ) Notice: Subject to any disclaimer, the term of this patent is extended or adjusted under 35 U.S.C. 154(b) by 0 days.

(21) Appl. No.: 09/331,906

(22) PCT Filed: Dec. 31, 1997

(86) PCT No.: PCT/AU97/00893

§ 371 Date: Aug. 20, 1999

§ 102(e) Date: Aug. 20, 1999

(87) PCT Pub. No.: WO98/28965

PCT Pub. Date: Jul. 9, 1998

(30) Foreign Application Priority Data

Dec. 31, 1996 (AU) .................................................... PP4423
Jul. 10, 1997 (AU) .................................................... PP7843

(51) Int. Cl.[7] .......................... A01C 11/00; A01C 11/02; A01G 9/10
(52) U.S. Cl. ............................................................. 111/105
(58) Field of Search ..................................... 111/105, 104, 111/103, 100, 200, 903, 915, 918, 919

(56) References Cited

U.S. PATENT DOCUMENTS 5,676,072   10/1997   Williames .

FOREIGN PATENT DOCUMENTS

| 484946 | 4/1976 | (AU) . |
|---|---|---|
| 9475851 | 12/1994 | (AU) . |
| 2125 757 | 8/1983 | (GB) . |
| 2-104205 | 4/1990 | (JP) . |
| 2-104206 | 4/1990 | (JP) . |
| 2-104207 | 4/1990 | (JP) . |
| 4-293406 | 10/1992 | (JP) . |
| 4-293407 | 10/1992 | (JP) . |
| 4-293408 | 10/1992 | (JP) . |
| 08037833 | 2/1996 | (JP) . |
| 08103112 | 4/1996 | (JP) . |
| 08140429 | 6/1996 | (JP) . |
| PCT/AU90/00093 | 9/1990 | (WO) . |
| PCT/AU93/00408 | 2/1994 | (WO) . |
| PCT/AU94/08783 | 2/1995 | (WO) . |

*Primary Examiner*—Christopher J. Novosad
(74) *Attorney, Agent, or Firm*—Reising, Ethington, Barnes, Kisselle, Learman & McCulloch, P.C.

(57) ABSTRACT

The present specification discloses apparatus for transplanting seedlings (24) from a tray (6) that has a plurality of seedling retaining cells (34), into a prepared ground planting position, the apparatus having tray holding means (1), seedling eject means (15, 16, 17) for removing one or more seedlings (24) from the seedling retaining cells (34), seedling delivery means (26, 27, 29) for receiving a seedling (24) ejected from the tray (6) and delivering same via a travel path to a ground planting preparation device (78) arranged to at least partly prepare said ground planting position, seedling holding means (100) associated with the ground planting preparation device arranged to hold a seedling delivered by said seedling delivery means (26, 27, 29), plant plug removal means (82, 83, 85) arranged between said seedling eject means (15, 16, 17) and said seedling holding means (100) to remove any plant plug (84) not containing a seedling viable for planting from said travel path prior to reaching said seedling holding means (100), and seedling planting means (89) to move a said seedling from said seedling holding means (100) to the prepared ground planting position in response to said apparatus having travelled a predetermined distance over the ground.

24 Claims, 40 Drawing Sheets

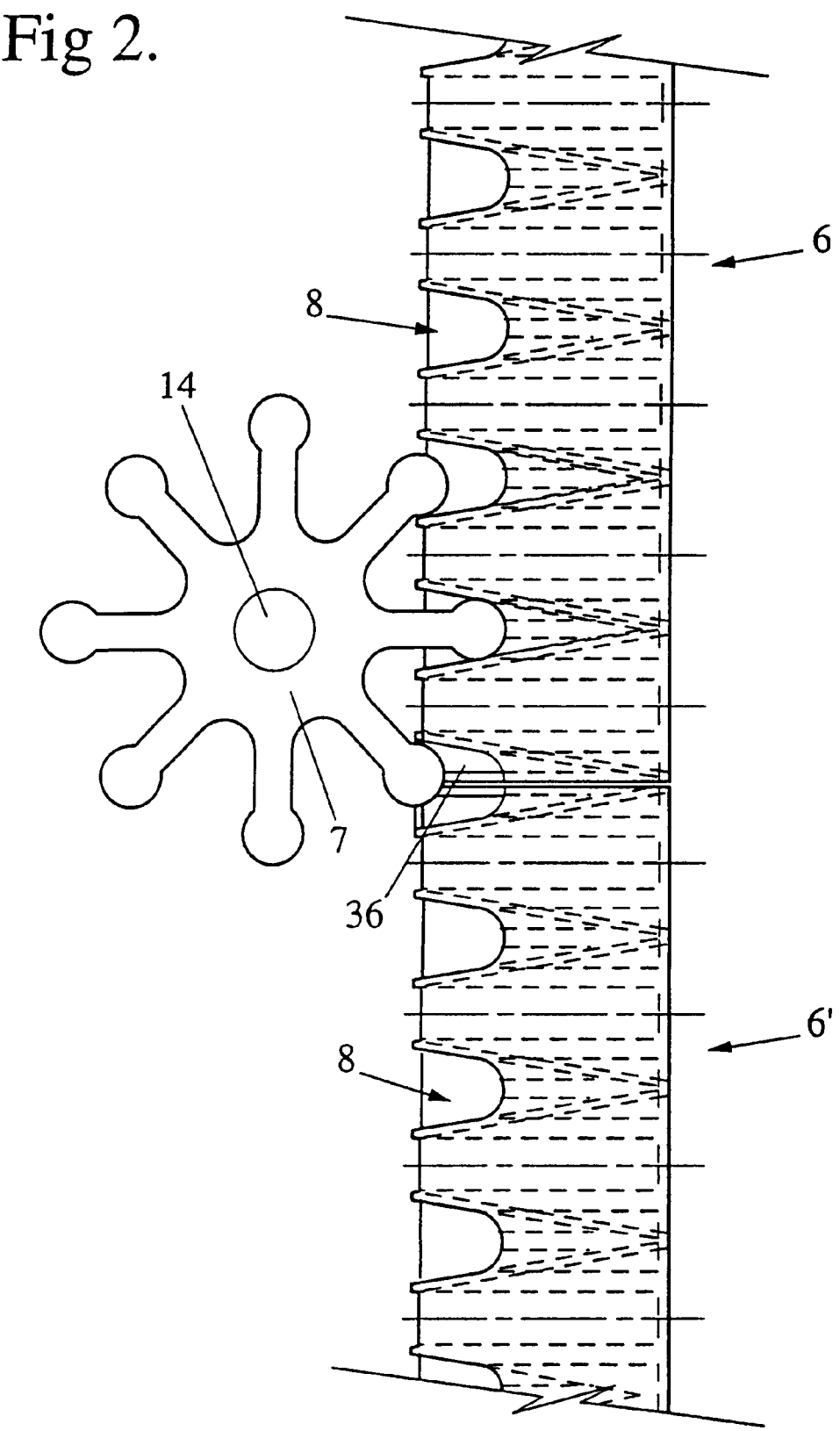

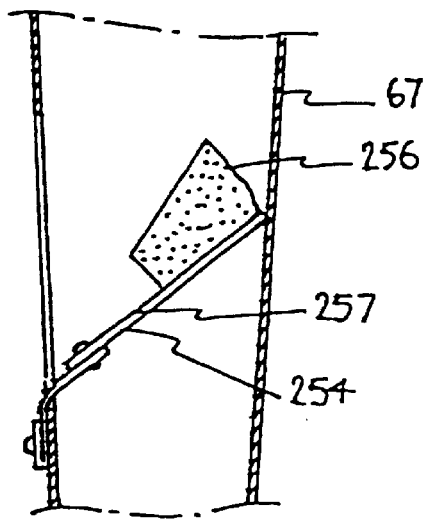
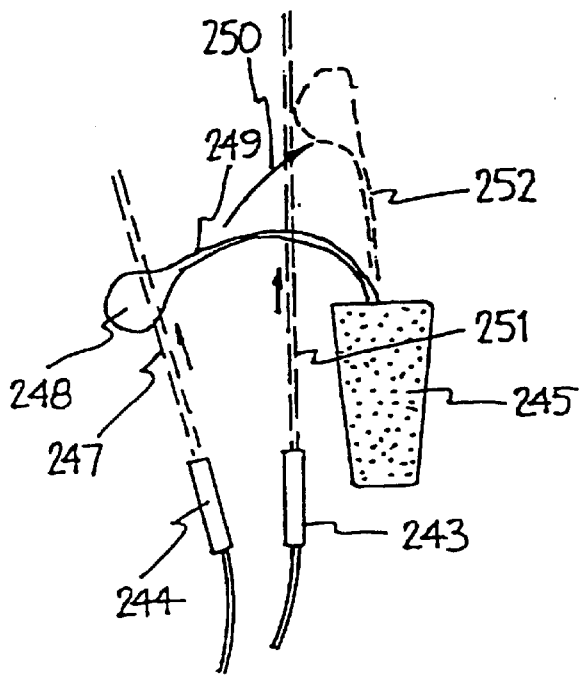
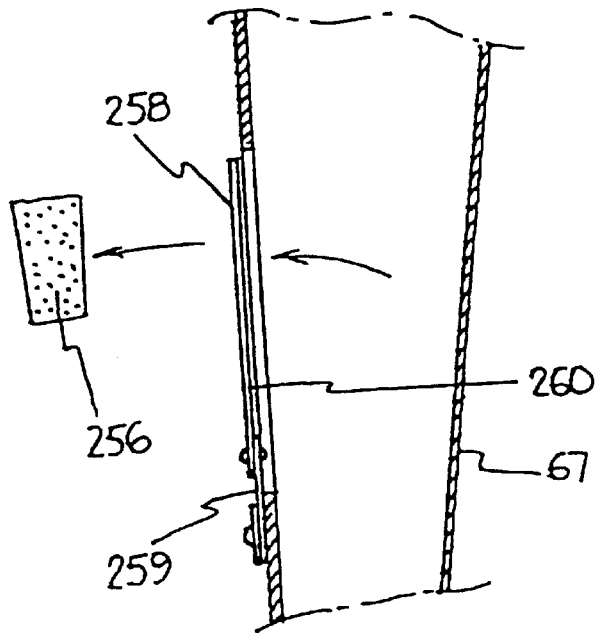

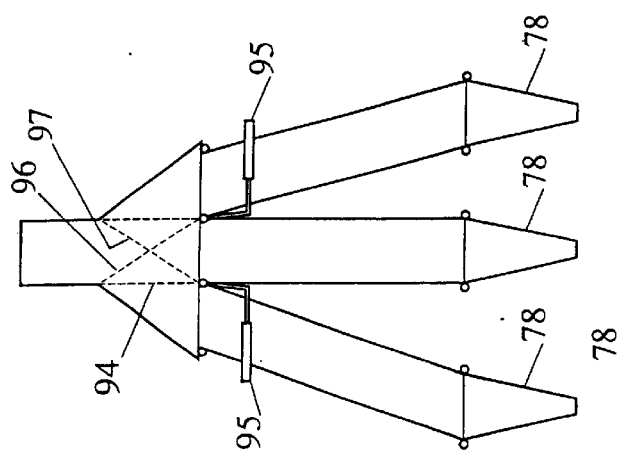
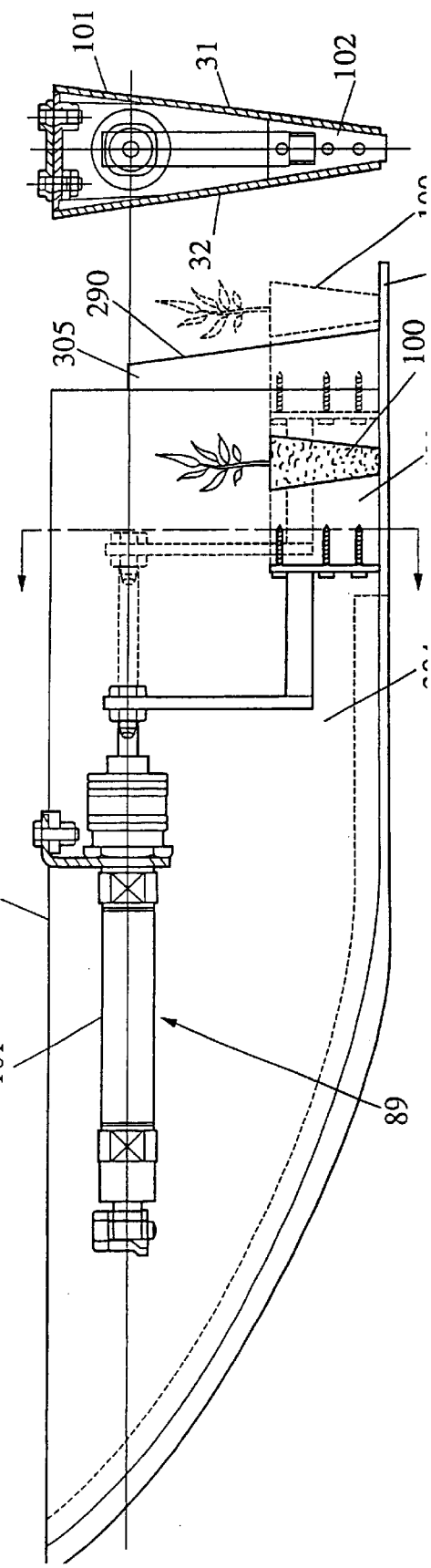
Fig 28.
Fig 29.

FIELD TRANSPLANTER

FIELD OF THE INVENTION

The present invention relates to apparatus for transplanting seedlings from a propagating and growing tray directly into a prepared ground planting position.

BACKGROUND TO THE INVENTION

Transplants comprising a plant growing in a discrete and separate mass of growing medium, known as a plug, or more simply as plant seedlings have traditionally been planted by hand or by means of a semi-automatic machine which generally performs one or more of the following functions:

(i) A rotating set of cups receive a manually selected and placed plant.

(ii) The plant cup mechanically opens and drops the plant via free fall to the ground height.

(iii) A mechanical pushing mechanism pushes the transplant out of the rear of the soil opening shoe.

(iv) A variety of machines variously drop plants into a belt with finger wires to assist in guiding the plant tops in an attempt to hold the plant vertical.

(v) Other mechanical transplanting mechanisms remove every plug regardless of whether or not a plug contains a living plant which causes gaps in the plant spacing in the field.

In all of the manual and automatic transplanters described there is:

(a) A continuous movement of plugs from the container tray to the ground with no provision for gapping up that is a separate zone able to move plants at different speeds to another zone with the ability to change one zone speed from stationary to very high speed and transfer the seedling to another zone.

(b) No provision for separate areas of plant storage or provision for sorting plugs not containing plants from plugs with plants.

It is accepted that 10–15% of tray cells in a nursery tray of seedlings will not contain a live seedling suitable for transplanting into the field. This will result in a market gardener or the like having to have additional workers to hand plant seedlings in the missing gaps. A more difficult problem may result if the machine not only leaves gaps but also plants seedlings too close together which require workers to manually dig out and replant such seedlings. In the case of celery, for example, 45,000 seedlings are planted per acre and 15% missing live seedlings in the trays amounts to 6750 gaps or misses per acre that have to be manually planted. In Australian Patent Application No. 46909/93 there is disclosed an arrangement which will allow seedlings to be transplanted from trays into a field position with their spacing substantially uniform, however, this arrangement, while working satisfactorily is relatively complicated and therefore expensive to produce. Field planting machinery of this general type also desirably requires a number of other capabilities including the ability for adjacent rows of planted seedlings to be closely adjacent one another and that in some cases down to eight inch row centres and that it be capable of simple connection to and operation from conventional tractors commonly used by nursery men and market gardeners.

The current practice of mechanically pushing a plant out of the soil opening shoe is reliant on the plants dropping vertically over a long distance and arriving at the correct time to coincide with the plant pushing mechanism and then pushing only to the shoe edge. This results in very variable planting in terms of the precise height of the plug relevant to the soil surface and the angle of the plant with some plants with broad leaf foliage having leaves being buried. A particular case in point is the necessity with lettuce plants to have the top of the plug level with the soil surface.

If the plug top is above the soil surface, evaporation and wicking occurs causing the plant plug to very rapidly dry out. If the plug top is below the soil surface, the soil then being in contact with or surrounding the stems and leaf area at the base of the plant will cause crown rot to set in with the loss of the plants.

Furthermore, planting often takes place in windy conditions resulting in plants blowing over in the wind before they are positioned correctly and enveloped with soil.

The objective therefore of the present invention is to provide improved machinery of the aforementioned type that is capable of transplanting seedlings from trays directly into ground planting positions, preferably with uniform ground spacing, and preferably constructed in a relatively uncomplicated manner. A further objective of the present invention is to provide improved devices for use in transplanting machinery of the aforementioned type.

SUMMARY OF THE INVENTION

Accordingly, the present invention provides apparatus for transplanting plugs comprising seedlings and propagating medium from a tray including a plurality of plug retaining cells into a prepared ground planting position, said apparatus including tray holding means, seedling eject means for removing one or more seedlings from the seedling retaining cells, seedling delivery means for receiving a seedling ejected from said tray and delivering same via a travel path to a ground planting preparation device arranged to at least partly prepare said ground planting position, seedling holding means associated with said ground planting preparation device arranged to hold a seedling delivered by said seedling delivery means, plant plug removal means arranged between said seedling eject means and said seedling holding means to remove any plant plug not containing a seedling viable for planting from said travel path prior to reaching said seedling holding means, and seedling planting means to move a said seedling from said seedling holding means to the prepared ground planting position in response to said apparatus having travelled a predetermined distance over the ground.

Conveniently, the apparatus is constructed and operated so as to ensure that a seedling is always located at the seedling holding means when the seedling planting means is activated in response to the apparatus having travelled the predetermined distance. Preferably this might be achieved by providing at least one intermediate seedling holding device located along said travel path to interrupt and hold a seedling at said intermediate seedling holding device, the or each said intermediate seedling holding device including sensor means to determine if a seedling viable for planting is held by the intermediate seedling holding device, and a said plant plug removal means located at or adjacent each said intermediate seedling holding device to remove from said travel path any plant plug not containing a seedling viable for planting. Conveniently the travel path might be formed by at least one substantially upright drop tube through which said seedlings pass while moving towards said seedling holding means associated with said ground planting preparation device, at least one said intermediate seedling holding device being located along the or each said drop tube. Preferably, at least one further sensor means may be located before the or each said intermediate seedling holding device to determine if a said plant plug contains a seedling viable for planting as said plant plug moves along said travel path. A further said plant plug removal means may be provided associated with the or each said further sensor means to remove from said travel path any said plant plug not containing a seedling viable for planting.

In one preferred embodiment, the seedling delivery means may include an endless conveyor having a plurality of plant plug receiving receptacles there along, each of said plant plug receiving receptacles being adapted to receive a plant plug ejected from a said seedling retaining cell of the tray, said endless conveyor being bodily movable from a position where one or more said seedling plant plugs are positioned in respective said plant receiving receptacles to a second position where said seedling plant plugs are sequentially released from said endless conveyor. Conveniently the bodily movement of the endless conveyor may be between 0° and 60° to 120°, preferably between 0° and 90°. In a still further preferred embodiment, the tray holding means may be arranged to hold at least one tray in a substantially vertical orientation and includes tray indexing means to index the or each said tray downwardly a predetermined distance by one row of said seedling retaining cells each indexing movement, said seedling eject means being arranged to eject simultaneously a row of said seedling plant plugs to the seedling delivery means.

In accordance with a further aspect of the present invention, a seedling planting device is provided for use in planting seedlings into a prepared ground planting position, said seedling planting device being adapted to be mounted from transplanting apparatus capable of movement in a planting direction, said seedling planting device having a forward furrow forming member and a rearwardly located seedling plug holding region adapted to receive sequentially and hold seedlings with their associated seedling plug, and actuator means adapted to sequentially rearwardly eject said seedlings with their associated seedling plug into the furrow formed by said furrow forming member, said actuator means being actuated in response to said apparatus having travelled a predetermined distance in said planting direction, planting spacings being linearly constant along the ground. Preferably the linearly constant spacing being achieved regardless of ground speed variation controlled by a ground driven encoder and programmable microprocessor control with plant to plant distance being able to be changed and set by the operator while the machine is stationary or in motion. Preferably the holding region is formed by side walls of said device being angled toward one another in a downward direction to cooperate with and hold the seedling plug. Conveniently, the actuator means comprises a pusher member and an actuator, said actuator being arranged to reciprocally move said pusher member in a forward and rearward direction, said pusher member being arranged to move a said seedling plug rearwardly from said planting device when moved in a rearward direction. In a further preferred arrangement, the seedling planting device may also include a ski assembly having a forward portion extending forwardly of the furrow forming member and a rearward portion located laterally on either side of the furrow forming member, the ski assembly having an under surface which, in use, engages on the surface of the ground in which the seedlings are to be planted. Conveniently, the height of the ski assembly relative to the furrow forming member is adjustable. The ski assembly may be mounted whereby, in use, its height relative to the transporting apparatus can vary in response to changes in ground contour. The furrow forming member may be mounted whereby, in use, its height relative to the transplanting apparatus varies in response to changes in ground contour.

In accordance with a still further aspect, the present invention provides apparatus for transplanting seedlings from a tray including a plurality of seedling retaining cells into a prepared ground planting position, said apparatus comprising tray holding means, seedling eject means for removing one or more seedlings from the seedling retaining cells, seedling delivery means for receiving a seedling ejected from a said tray and delivering same to a ground planting preparation device, said seedling delivery means including at least one seedling holding means having a sensor means associated therewith to determine if a seedling plug at said seedling holding means includes a live seedling viable for planting, said seedling holding means also including seedling plug eject means activated in response to said sensor means determining that a seedling plug at said seedling holding means does not contain a live seedling viable for planting. Preferably, the seedling delivery means includes re-orientation means and one or more drop tubes defining a travel path for said seedlings to the ground planting preparation device, said re-orientation means being arranged to reorientate seedlings ejected from a said tray such that the seedling plugs are directed downwardly when they enter a said drop tube.

According to another aspect, the present invention provides apparatus for transplanting seedlings from a tray including a plurality of seedling retaining cells into a prepared ground planting position, said apparatus comprising tray holding means, seedling eject means for removing one or more seedlings from the seedling retaining cells, seedling delivery means for receiving a seedling ejected from a said tray and delivering same to a ground planting preparation device, said seedling delivery means including an endless conveyor adapted, in a first position, to receive and hold a plurality of seedling plugs ejected from the seedling retaining cells of the tray, said endless conveyor being bodily movable from said first position to a second position where said seedling plugs are sequentially released at a release zone from said endless conveyor, and a first sensor means arranged to sense each said plant plug immediately after release from said endless conveyor to determine whether a live seedling viable for transplanting exists with said seedling plug. The apparatus may include a second sensor means associated with said endless conveyor to sense each said seedling plug conveyed by said endless conveyor to determine whether a live seedling viable for transplanting exists therewith, said second sensor means being located prior to release of the seedling plug from said endless conveyor. Preferably each said seedling plug released from said conveyor means is deposited in a delivery tube means with the plug directed downwardly, the delivery tube means extending to the ground planting preparation device. The seedling plug removal means may be provided at or adjacent an entrance zone of said delivery tube means to remove therefrom seedling plugs not containing a seedling viable for transplanting. In a further preferred embodiment, one or more intermediate seedling holding means for holding seedling plugs is provided part way along the length of the or each said delivery tube means. Preferably in a still further embodiment, a third sensor means is provided at the or each said intermediate seedling holding means to determine if a seedling viable for transplanting exists with each seedling plug held at the or each said intermediate seedling holding means, and eject means being provided associated with the intermediate seedling holding means to eject seedling plugs from said delivery tube means when the third sensor means establishes that a said seedling plug does not contain a seedling viable for transplanting.

In a still further preferred embodiment, the endless conveyor may include a plurality of adjacent transverse extending receptacles open at both ends and adapted to retain a said seedling plug therein after being ejected from a seedling retaining cell of a said tray, each said receptacle being formed by a belt portion of the endless conveyor and wall portions laterally extending from said belt portion, each said wall portion having a T-shape in cross-section providing a plurality of spaced retaining bars spaced from said belt portion. The release zone may be defined by said belt portion passing around roller means of a diameter sufficient to open the distance between the adjacent retaining bars to allow the seedling plugs to be released from the endless conveyor. The belt portion may be moved in discreet steps, the distance of each said step being equal to the plug cell width, at a speed sufficient to move said seedling plugs laterally away from the conveyor means at said release zone. Conveniently, at said first position, both ends of each said receptacle are open and at said second position, a movable member traverses a lower end of the receptacles so as to retain the seedling plugs therein until the release zone is reached.

In another preferred embodiment, the endless conveyor may include a plurality of transverse extending receptacles to retain a said seedling plug therein after being ejected from a seedling retaining cell of a said tray, said endless conveyor having a plurality of spaced teeth formations on an inner surface co-operable with complimentary shaped formations on an indexing member, said indexing member being moved in a forward direction and a reverse direction by actuator means whereby in a forward direction said indexing member engages with the teeth formations on one length of said endless conveyor and in the reverse direction, said indexing member engages with the teeth formations on a second length of said endless conveyor opposite to said one length. The indexing member may be moved laterally towards said second length and away from said one length, and vice versa, when the indexing member is respectively moved in the reverse and the forward directions.

In another aspect the present invention also provides a tray indexing arrangement for use in apparatus for transplanting seedlings from cells within a tray to a ground planting position, said tray indexing arrangement comprising a guide frame support to enable a seedling tray to be supported substantially vertically with the seedlings disposed substantially horizontally, said guide frame support permitting the tray to move in a downward direction past a seedling eject mechanism, and a tray indexing mechanism including at least one sprocket wheel having teeth adapted to engage with indexing formations on the tray, the sprocket wheel or wheels being driven by an indexing device having a rotatable control wheel with a plurality of spaced control pins each adapted to pass through a cam guide track of a pivoting arm during at least part of the movement of the control wheel, said control wheel being rotatable under the influence of the weight of a said seedling tray moving downward in said guide frame support until a said control pin engages with a stop zone of the cam guide track of said pivoting arm indicative of the seedling tray reaching a position where one or more seedlings can be ejected therefrom by said seedling eject mechanism, and an actuator means provided to move said arm to release the control pin from the stop zone of the cam guide track when a further indexing step is required.

THE DRAWINGS

Several preferred embodiments will hereinafter be described with reference to the accompanying drawings, in which:—

FIG. 2 is a side elevation of adjacent trays suitable for use in the apparatus of the present invention including a tray indexing wheel;

FIGS. 15, 16, 17, 18, 19, 20, 21, 22, 23, 24, 25, 26, 27 and 28 illustrate various features associated with delivering a plant or seedling to a delivery tube and the configuration of several embodiments of the delivery tube itself;

FIGS. 29, 30, 31 and 32 show various features of a ground planting preparation device according to the present invention and means for mounting same to the remainder of the apparatus;

DETAILED DESCRIPTION

Figure 1:
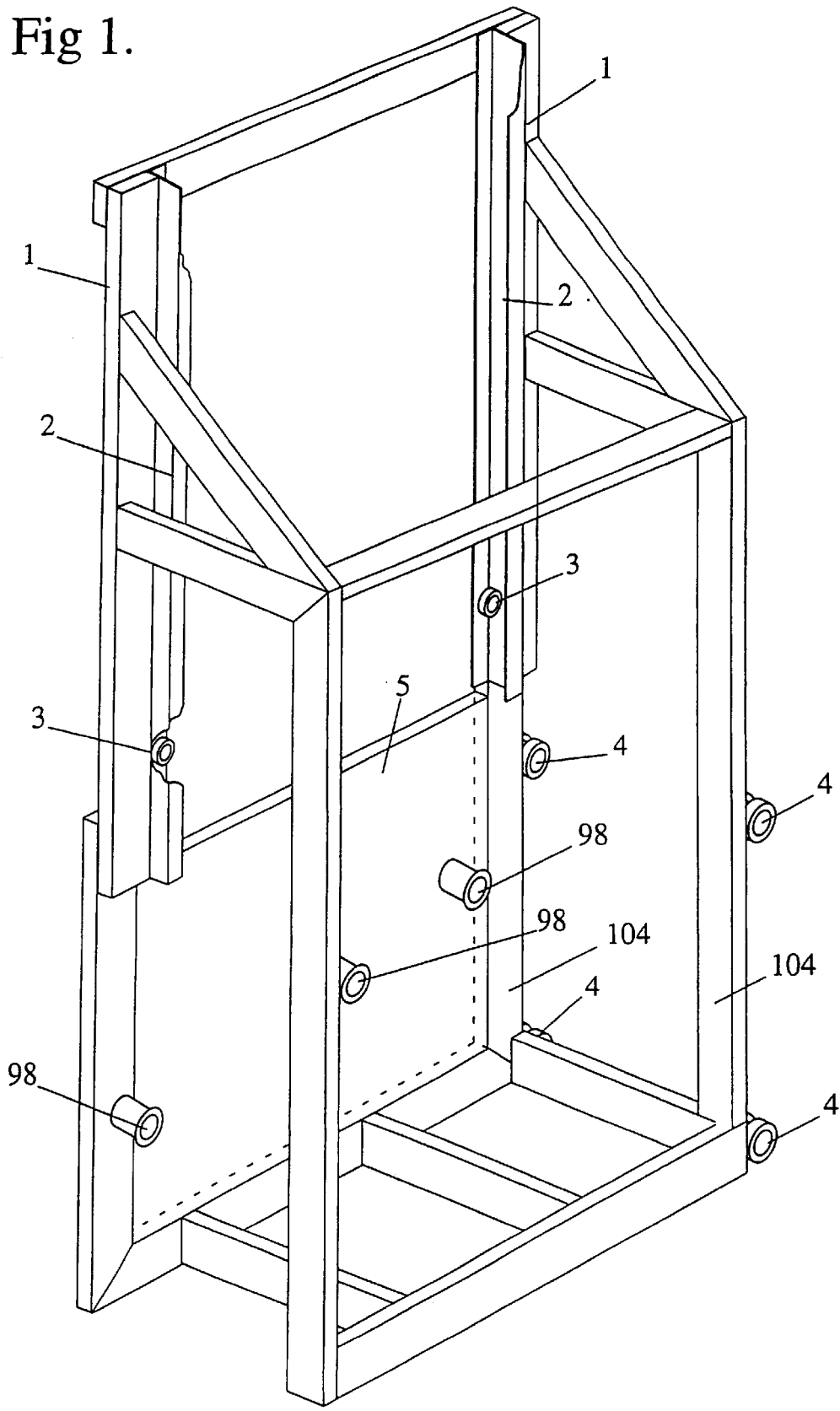
FIG. 1 is a perspective view of a tray holding frame.

The apparatus of this invention is intended to selectively transplant viable plants from a tray that may be a purpose built hard plastic tray such as, disclosed in co-pending International Patent Application No. PCT/AU97/00596 and into the ground being accurately positioned along the row and correctly placed in relation to depth of planting and correct distance between plants along the row. The machine basically consists of a tool bar which is carried on the three point linkage of the tractor, which also includes the air compressor for running the pneumatics and the power supply for running the electronics. The field transplanters are connected to the tool bar via an intermediate mounting frame and there are usually four transplanting machines, (or transplanting heads), across the width of the tool bar although this may be varied. Each head may consist of a tray holding frame in which the full trays are loaded and slide down, under gravity, until they hit and rest on an indexing mechanism. The indexing mechanism then actuates and the tray indexes down the tray loading frame, until a horizontal row of plants are accurately positioned in line with a plant eject mechanism including one or more eject pins.

The plant eject mechanism may transfer a horizontal row or plants out of the tray and into receptacles on a feed or delivery conveyor. When the conveyor has been loaded with a row of plants in the horizontal position it swings down to a maximum of 90° to disentangle any plant foliage that may be entangled, so that the row of plants are now positioned with the root mass positioned vertically down. The conveyor then indexes along and the plants are forcibly separated horizontally then drop vertically under gravity into a plant tube which transfers the plants from the conveyor into a ground planting preparation device which in one embodiment may be a keel shaped plant shoe which creates a furrow in the soil for the plant to be placed into. At this stage the plant has conveniently been scanned at least once and up to three times by three separate sensors. Once the plant has lodged in holding means formed by the base of the shoe, a planting means pushes the plant out into the furrow produced by the plant shoe, precisely at the required time which is determined by the ground distance from the last plant planted, by an accurate ground travel being precisely measured as distinct from traditional fixed distance mechanical devices. The preferred planting means is a pneumatic kicker cylinder acting directly against the plug containing a plant and located within the soil opening shoe. The cylinder is activated in response to a ground driven digital encoder which is readily adjusted on a keypad to give real time instant plant space changes without the necessity to change mechanical components giving plant spacing accuracy regardless of travel speed. Surrounding the plant shoe on three sides (the rear being left open) with special contoured protrusions, is a ski or sledge runner which has two purposes. The first purpose is to alter the planting depth of the plant and the second purpose is to cover the just placed plant root mass with soil and compress the soil around the plant root mass to provide an environment in which the plant is securely placed in the soil.

FIG. 1 shows a tray holding frame (1) including two pressed channel guides (2) mounted vertically on the frame (1). Near the base of these guides (1) are two resilient rubber rollers (3), one on each guide, which horizontally and centrally position the tray accurately when the tray indexes into the plant eject position by moving the tray horizontally until compression forces of both rollers are equal and the tray is central. The frame also includes front mount rollers (4) for vertical height adjustment roller frames (see FIG. 21). On the side of the lower half of the frame (1) is a light gauge steel panel (5), which acts as a wind break to stop the empty trays from being blown over while planting during high wind, particularly in desert areas of North America. A further wind guard may be provided to surround the indexing plug retaining belt which protects plants from misalignment at the primary selectivity stage and as a guide for the plants as they move along in the endless conveyor.

Once a tray (6) has moved down the tray guides (2) it rests on indexing mechanism drive sprockets (7). These indexing mechanism drive sprockets (7) engage in the indexing slots (8) of the tray (6) and index the tray down one horizontal row of cells at a time. The indexing contact area is at the back of the tray and only intrudes each end of the tray for maximum horizontal stability.

Figure 2A:
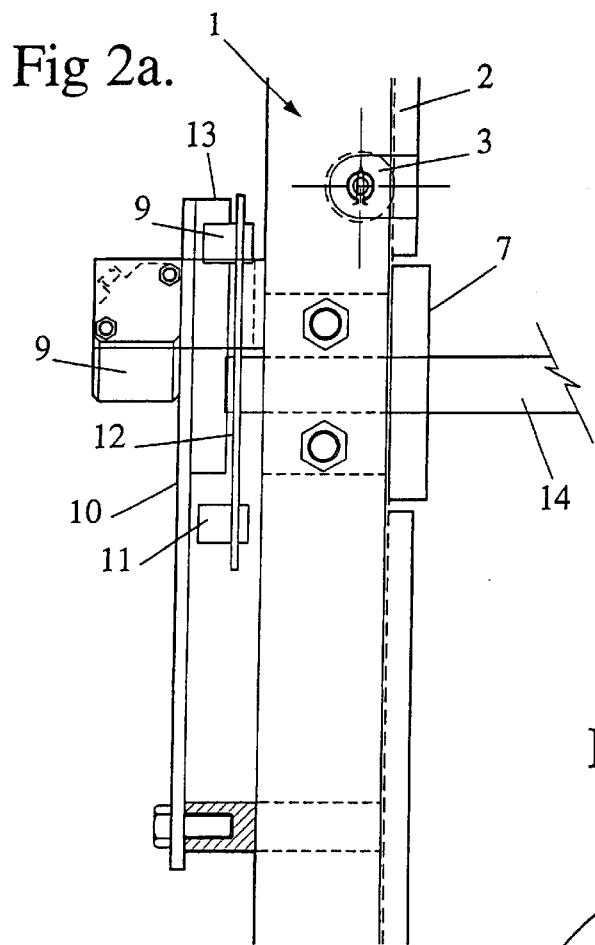
FIGS. 2a, 2b and 2c illustrate a mechanism for activating the tray indexing wheel shown in FIG. 2.
Figure 2B:
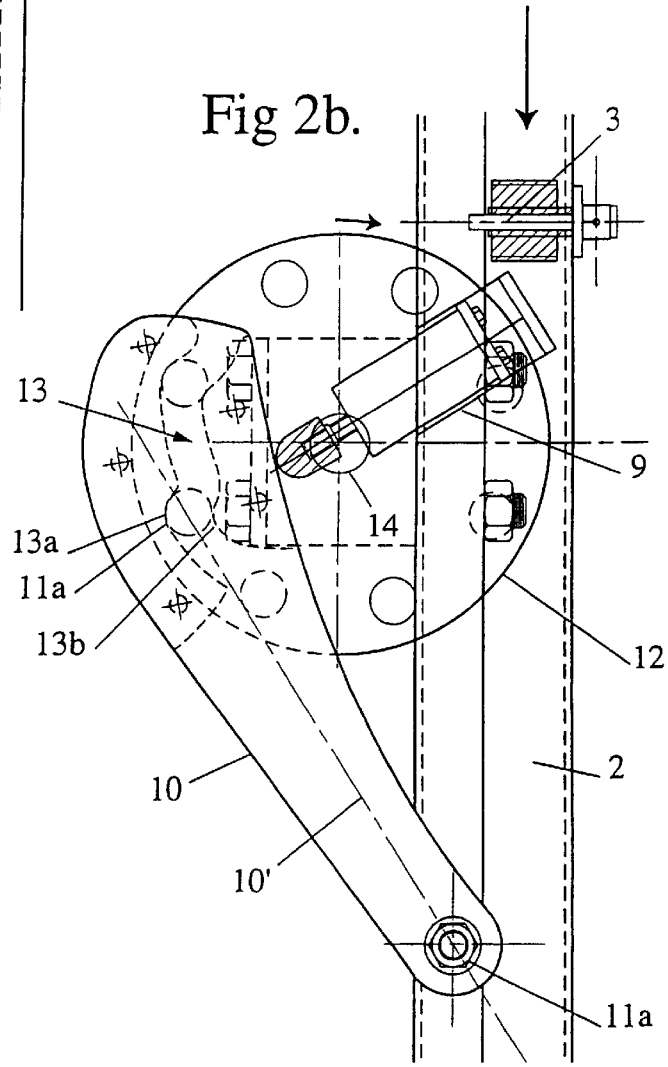
Figure 2C:
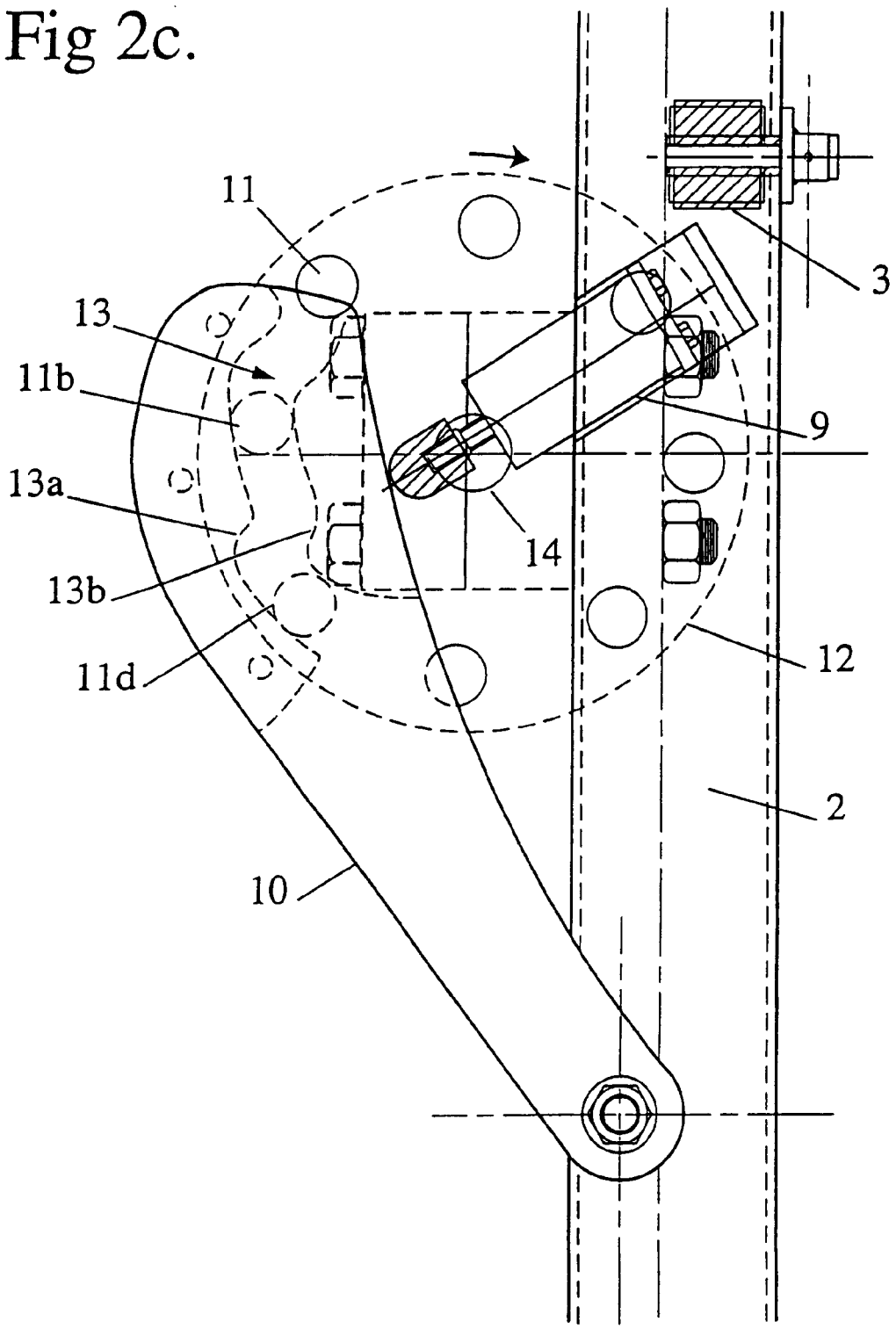

As shown in FIGS. 2a, 2b and 2c, the indexing mechanism is activated by a pneumatic cylinder (9) which pushes on a pivoting arm (10). A primary indexing drive wheel (12) is connected to the two drive sprockets (7) arranged at opposite sides of the frame (1) via a drive shaft (14). A number of pegs (11) are provided as part of the primary indexing drive wheel (12) and are engaged by a shaped self-locking guide track (13) formed on the pivoting arm (10) as the wheel (12) is rotated. Peg (11a)(FIG. 2a) is locked in position against the shaped guide track at (13a) when it is on the centre line (10') of pivot arm (10) thereby creating an effective stop and lock. When the cylinder (9) is actuated it pushes the arm (10) about its pivot to disengage the peg (FIG. 2c)(11B) from its locked position and the weight of the trays (6) on the indexer drive sprockets (7) commonly connected to the same drive shaft (14), rotates and drives the pegs (11) on the primary indexing wheel (12) through the shaped polyethylene guide track (13). Once the cylinder (19) pushes the arm (10) out, peg (11) hits on the side (13b) opposite the peg lock position (13a) and begins to slide up the slot as shown in FIG. 2c. This allows entry of peg (11d) into the slot (13) and due to the shape of the slot the preceding peg (11) forces the arm back again and peg (11d) hits against the stop (13a) and is therefore locked in position. The indexing mechanism is so designed to be a single shot indexing mechanism whereby one cylinder actuation causes indexing of one row of plants and needs no other mechanical device to assist in this motion and no other mid point stop is required. This method ensures that a positive engagement is achieved through a very simple mechanism. The drive shaft (14) may be formed by a torque tube to ensure positive and accurate horizontal alignment of the tray.

Figure 3A:
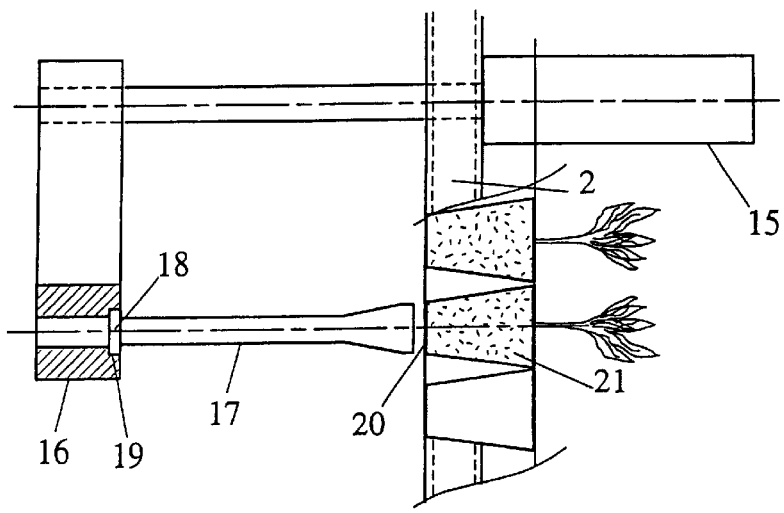
FIGS. 3a, 3b and 3c illustrate features of the seedling eject mechanism for ejecting seedlings from the tray.
Figure 3C:
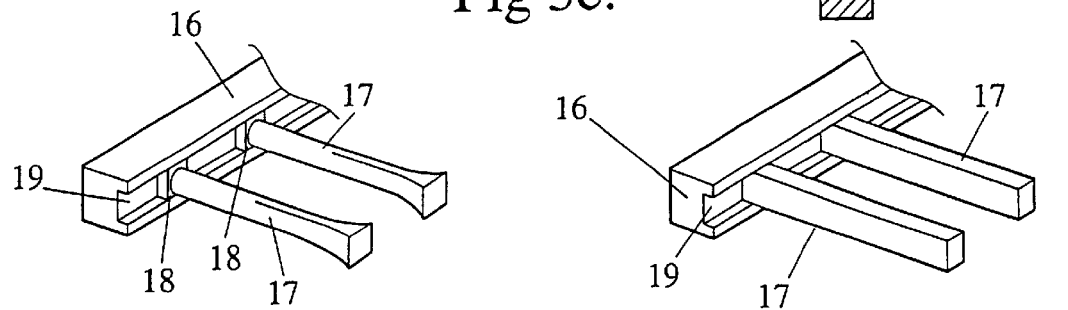
Figure 3B:
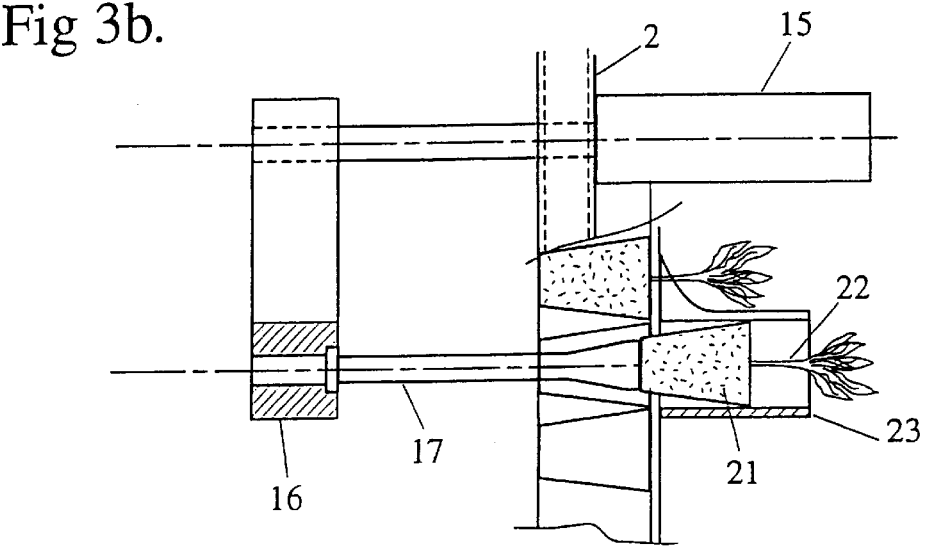

As shown in FIGS. 3a to 3c, once the plant eject index position has been achieved, plant eject cylinders (15) fitted with internal guides, which are mounted to the frame (2), retract. Mounted on the rods of these cylinders (15) is a horizontal bar (16) which holds the plant eject pins (17). These pins (17) are secured in the bar (16) and a narrow square head (18) fits into a slot (19) in the bar (16) thereby stopping the pins from rotating. The pins are manufactured from aluminium square which engage in the square holes (20) in the base of the cells of the tray (6). When the cylinder (15) is retracted the pins (17) engage with the base of the root mass plug (21) of the plants within this particular row of cells. The plants are then dislodged and one row of plants are pushed into waiting receptacles (22) secured to the conveyor belt (23)(FIG. 3b). The eject pins (17) may be trimmed along the stem so as to allow deflection and alignment or might be solid square light weight material secured via a threaded hole and bolt (17a)(FIG. 3c).

Figure 4:
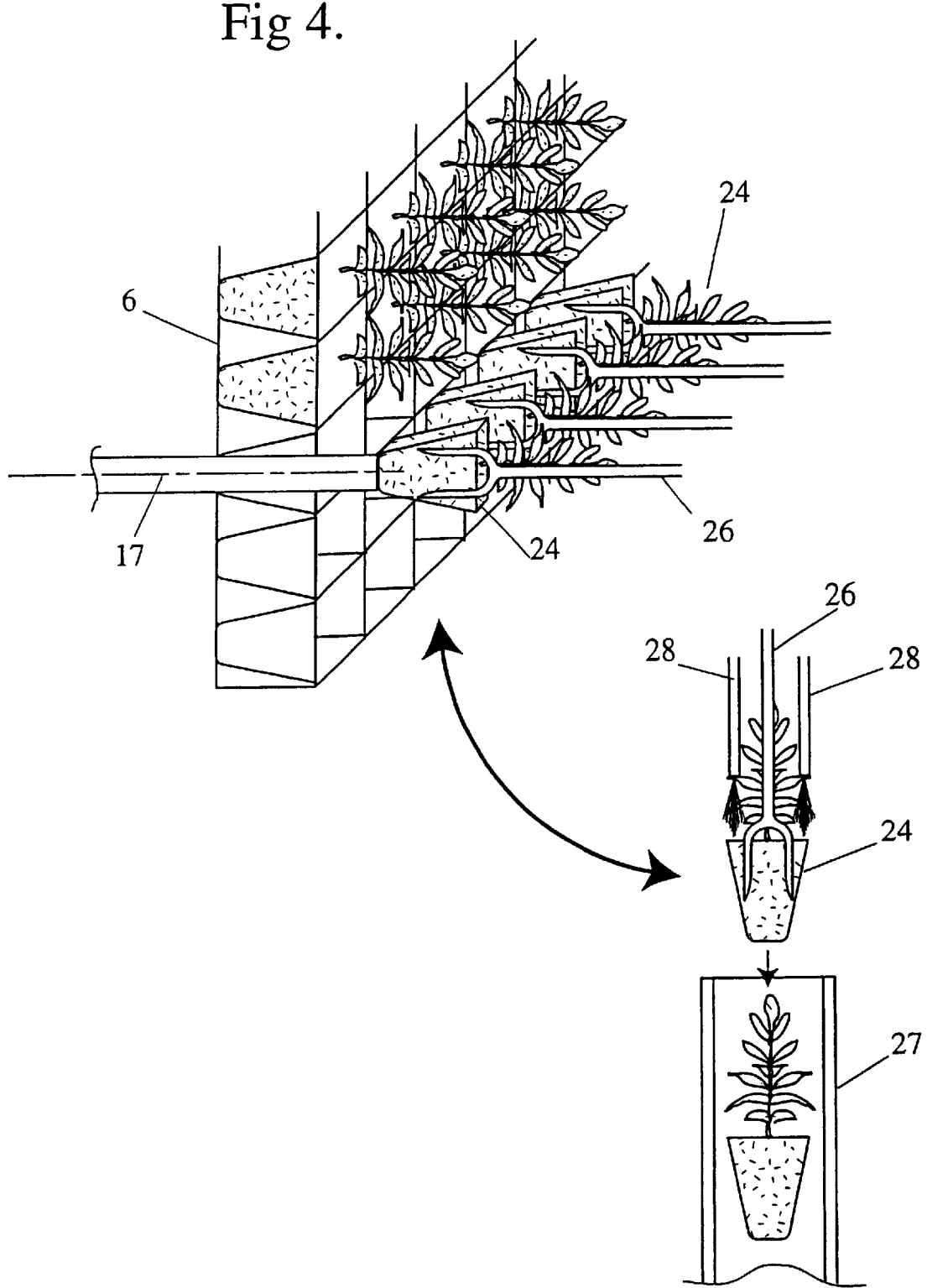
FIG. 4 illustrates one embodiment for transferring seedlings ejected from a tray to a plant delivery tube.

FIG. 4 shows another embodiment of the transfer of the plant from the tray (6). In this embodiment, a row of plants (24) may be ejected from the tray (6) by the method shown in FIG. 3a to impale the plugs of plants (24) on a row of prongs (26) which are positioned directly opposite the cells of the tray at the eject position. Once each plant in the row is impaled on these prongs (26), the conveying means (prongs (26)) will swing down to a maximum of 90° so that a row of plants are retained vertically and will index along until each plant is positioned in turn over a plant drop tube (27). Once positioned over the drop tube a blast of high pressure air from air supply tubes (28) is directed vertically downwards over the plant plug to force the plant off the prong (26) and into the drop tube (27). The movement and air blast may be activated by a microprocessor receiving encoded pulses to determine precise ground travel distance and plant spacing.

The conveyor mechanism may be generally as disclosed in FIGS. 5 to 14. The plant belt conveyor (29) has the principal function of moving plants which have been ejected from the tray and dropping them into a down tube (27) ready for planting. A number of operations are performed by the plant belt conveyor (29) including:

1. the disentanglement of the foliage of the row of plants held in the conveyor belt from the remaining plant foliage in the tray above;
2. the positioning of the plants held in the conveyor belt in a vertical position suitable for planting vertically downwards;
3. the racking forward of the conveyor belt in discrete steps;
4. the identification of cells which contain no plant and foliage; and
5. the dropping of plants into a down tube when previous stored plants are moved to the next place of retention or planted into the ground.

These operations are described in greater detail in the following.

Figure 5:
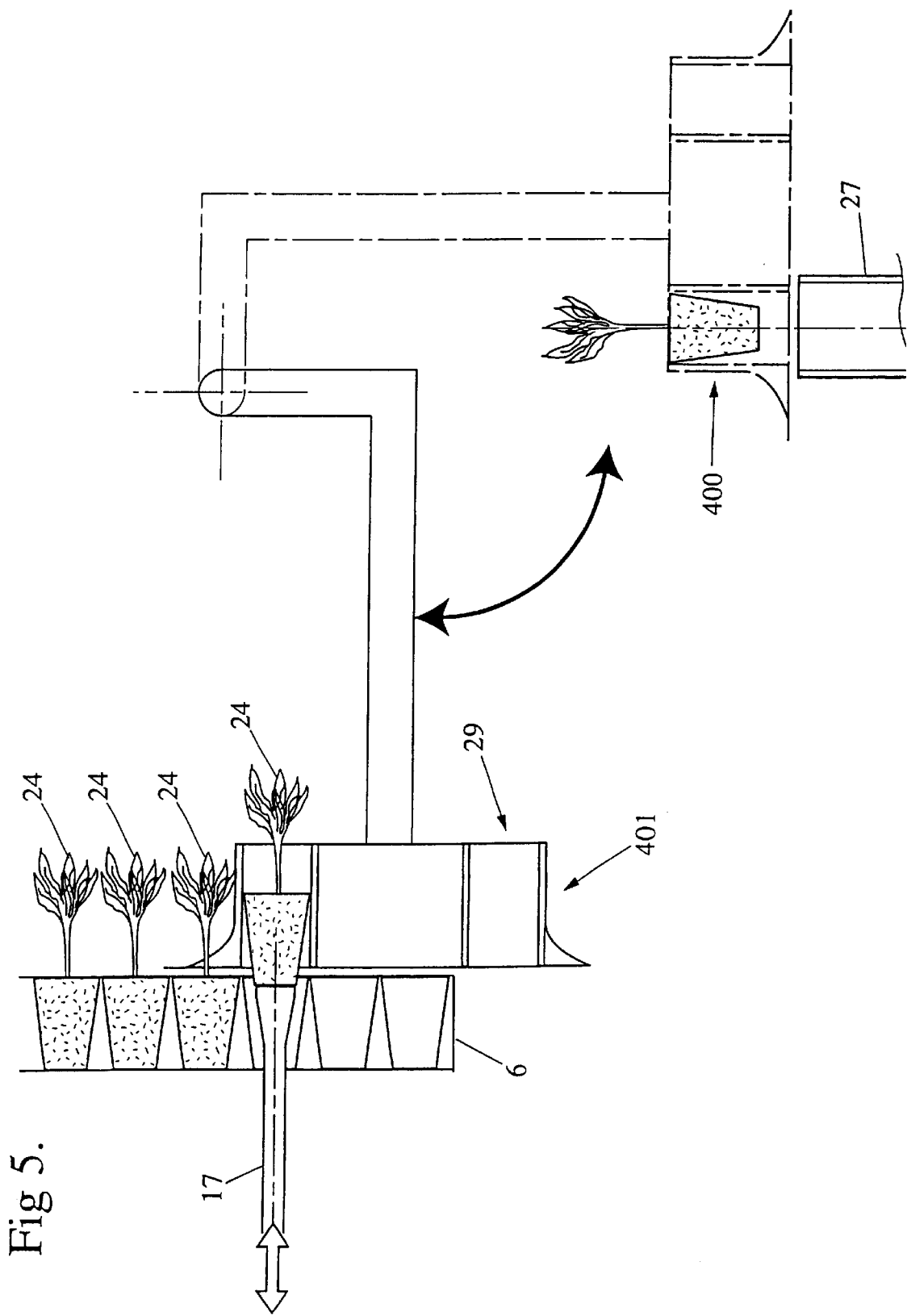
FIGS. 5, 6, 7, 8, 9, 10, 11, 12, 13 and 14 illustrate features of a second embodiment for transferring seedlings ejected from a tray to a plant delivery tube.

FIG. 5 shows that disentanglement of the foliage of the plant (24) is effected by retaining the plants which have been pushed into the plant belt conveyor (29) via the plant eject pins (17) and swinging them away from the tray (6) through to a maximum of 90° thus separating a row of plants and the foliage from the foliage of plants (24) remaining in the tray (6) and presenting the plant in a vertical position ready to transfer into the drop tube.

Figure 6:
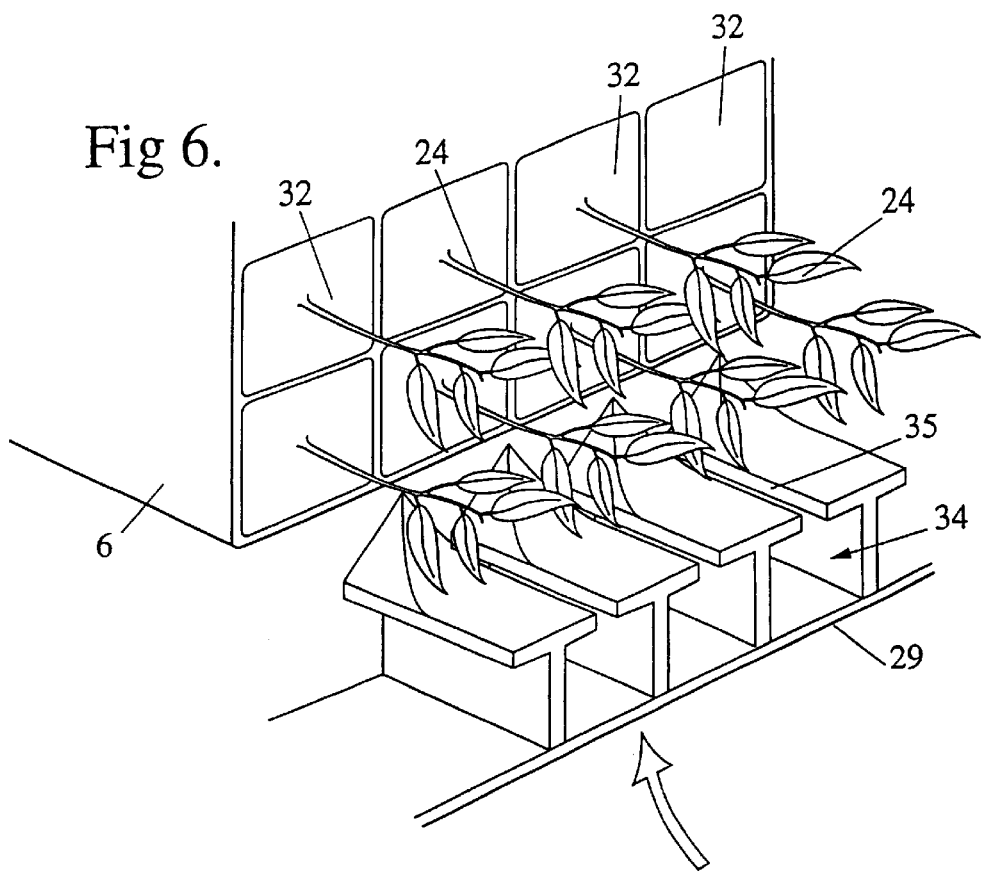

Due to the diversity of plant growth many plants do not grow with straight vertical stalks (FIG. 6). Often these plants can grow horizontally along the cells and grow vertically in the adjacent cell (32). This may cause major plant separation problems when it comes to plant ejection.

Figure 7:
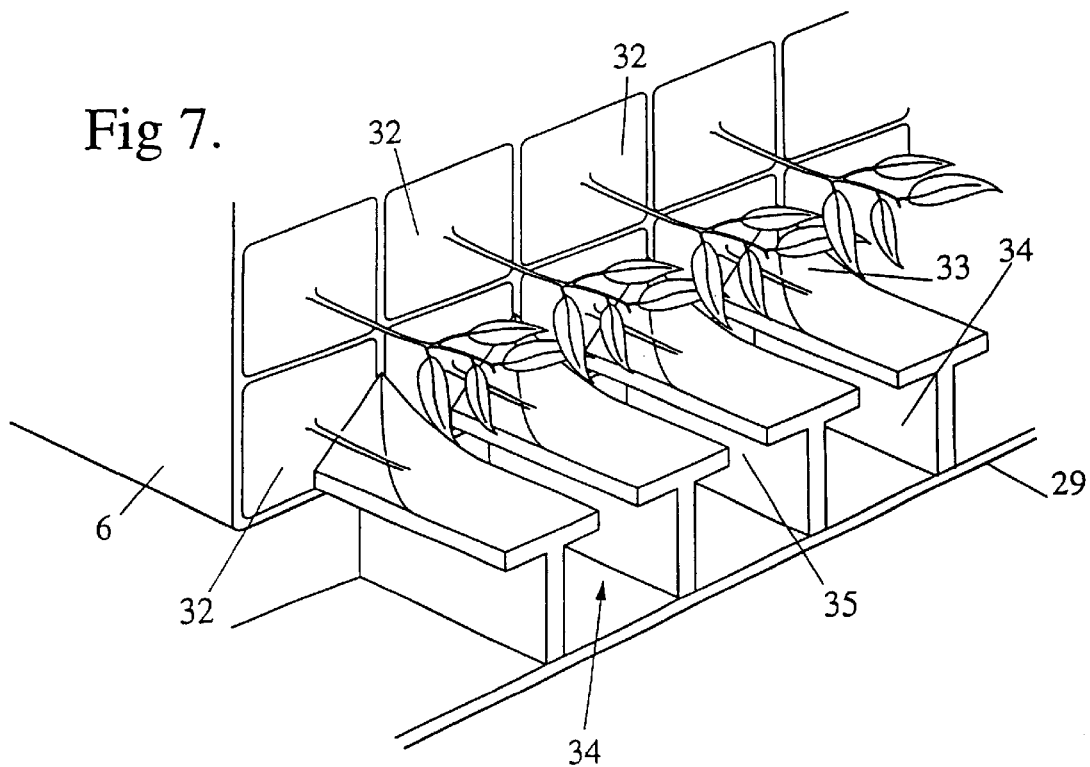
Figure 8:
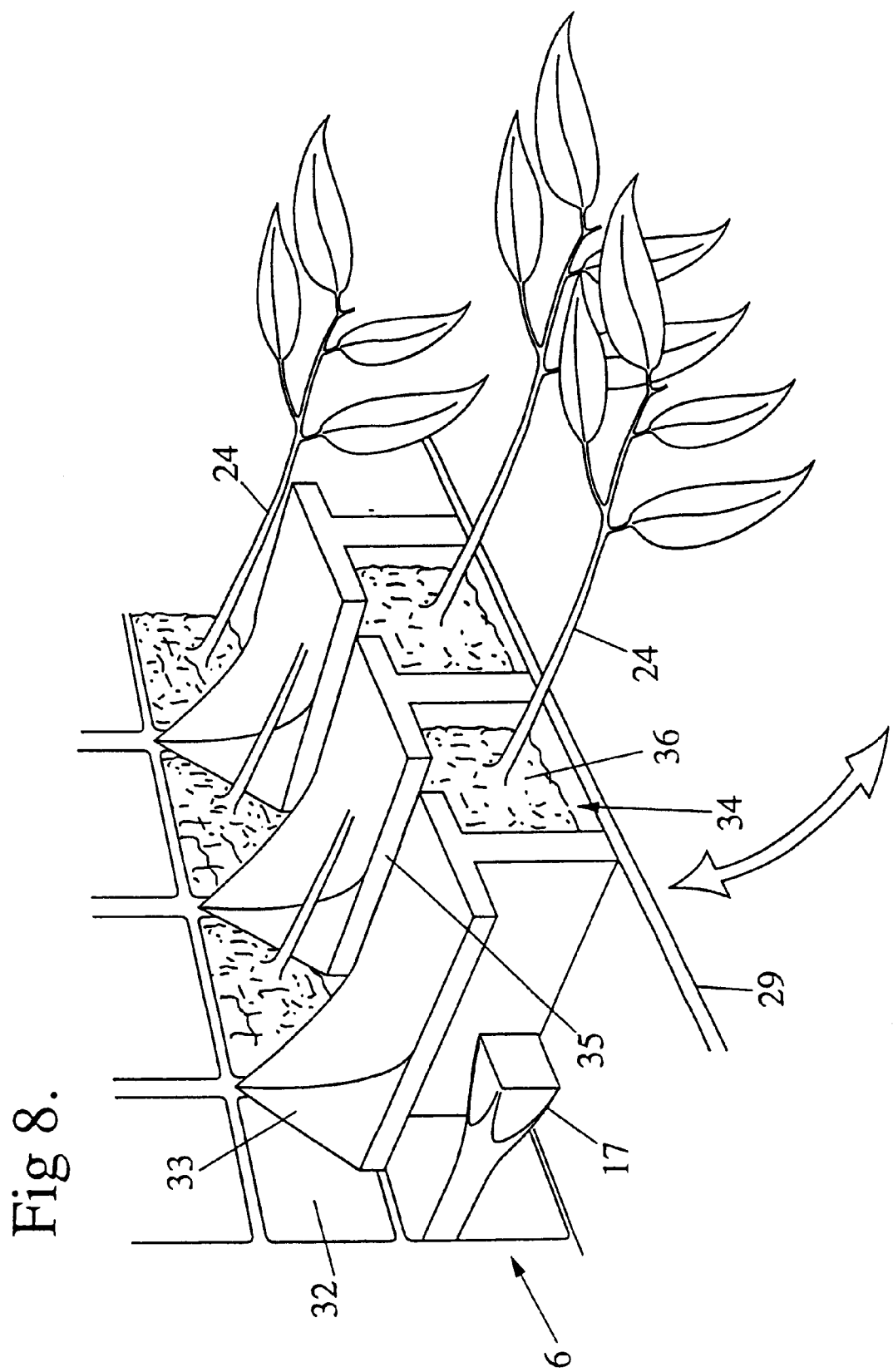

FIGS. 6 and 7 show the conveyor being swung back up ready for the plant eject cycle. The pointed triangular curved extensions (33) on the top of the plant receptacles (34) sweep up in close proximity (less than the diameter of the plant stem) to the tray cell vertical dividing walls and enters into the foliage mass on the way up, separating the stems very close to the base of the stem where it enters the plug and guides the stem down the curved side of the extension (33) and into the slot (35) caused by the two adjacent receptacles (34) on the conveyor 29. Once the foliage and stem are correctly aligned and directly in front of the plant receptacle, the plant is ejected into the receptacle (FIG. 8). This prevents plug and plant rotation and retains the plug, being held on both upper sides preventing escape while being subjected to the forces of separating the entangled foliage as the retainers swing downward and away from the remaining plant foliage in the tray. Now the plug (36) is totally encapsulated on four sides with a central top slot to receive the plant. This prevents plug and plant rotation (FIG. 8) totally encapsulating the plug thereby eliminating escape problems. The plant receptacles (34) constrain the plant as the conveyor (29) is swung down away from the tray.

Figure 9:
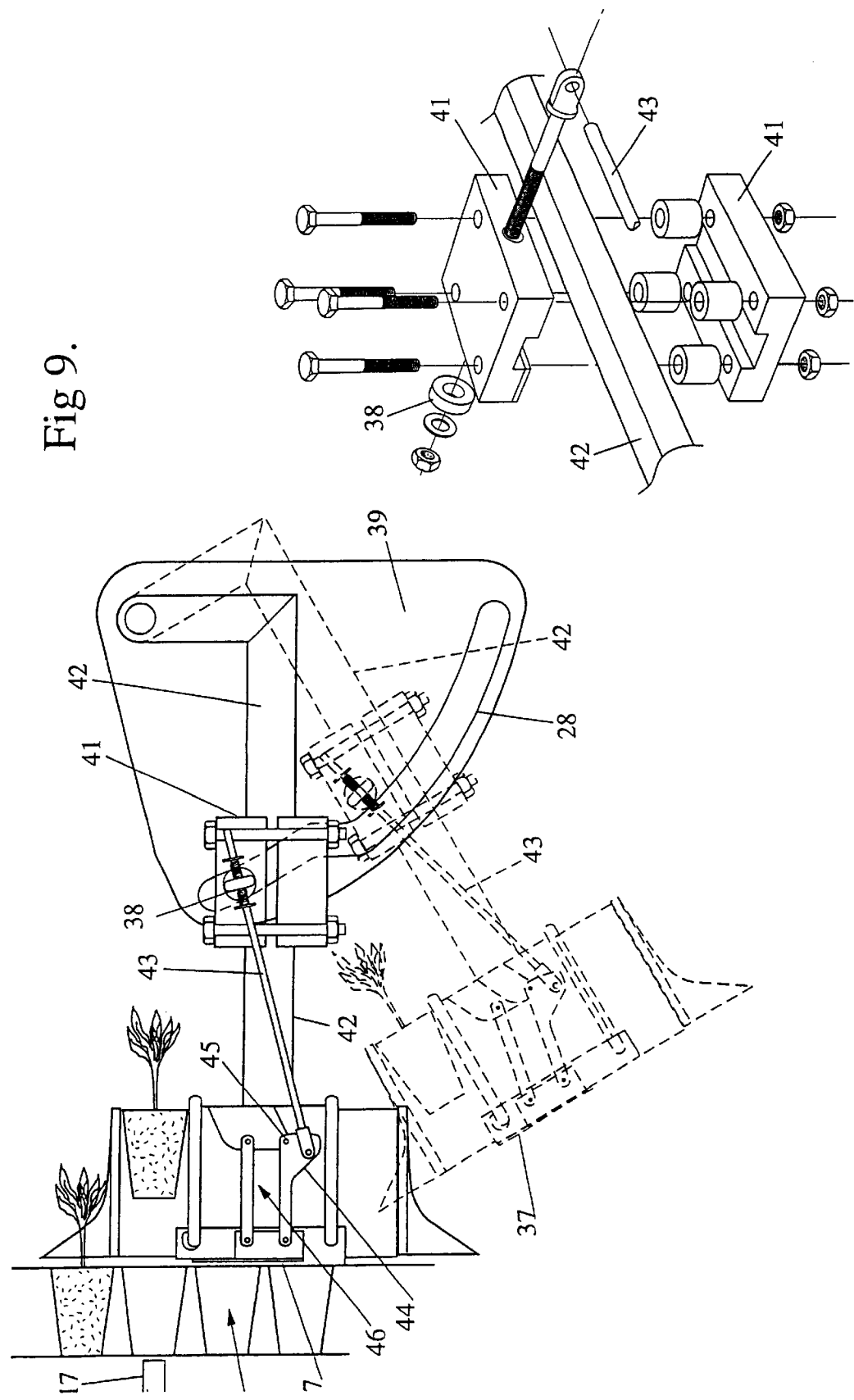

As can be seen in FIG. 9, to prevent the plants from falling out the bottom side of the conveyor (29) through the action of centrifugal force when the conveyor is swung through 90° and the effects of gravity on the vertical position of the plug and plant, a retainer flap (37) swings up flush with the bottom side of the conveyor as it swings down. The retainer flap (37) is activated through a rod (43) passing through a rotatable guided spring loaded device. In one preferred embodiment, a roller (38) running in a cam plate (39) moves the rod (43) up into position as soon as the conveyor has cleared the tray (6).

The cam plate (39) is fixed to the frame (2) on the right side. Running guide track (28) in the cam plate (39) is a roller (38), which is attached to a slide block (41) on the right hand conveyor arm (42). This slide block (41) activates a rod (43) which in turn moves an arm (44) attached via a pivot (45) to pivoting arm (42) pivoted to the plate (39). This arm (44) forms part of a parallelogram mechanism (46), ensuring that the flap (37) always stays in the same orientation and can be compactly stored while the conveyor (29) is in its up position, being stored clear of the tray (6) and allowing close entry of the plug retainers and plant alignment devices as described above.

Figure 11:
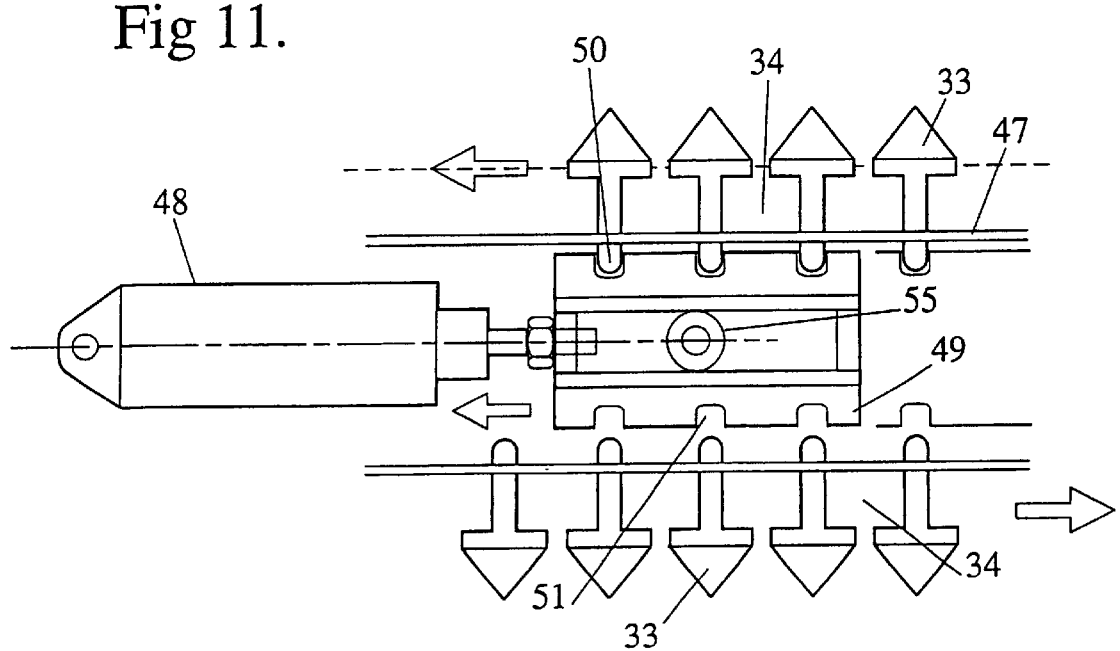
Figure 10:
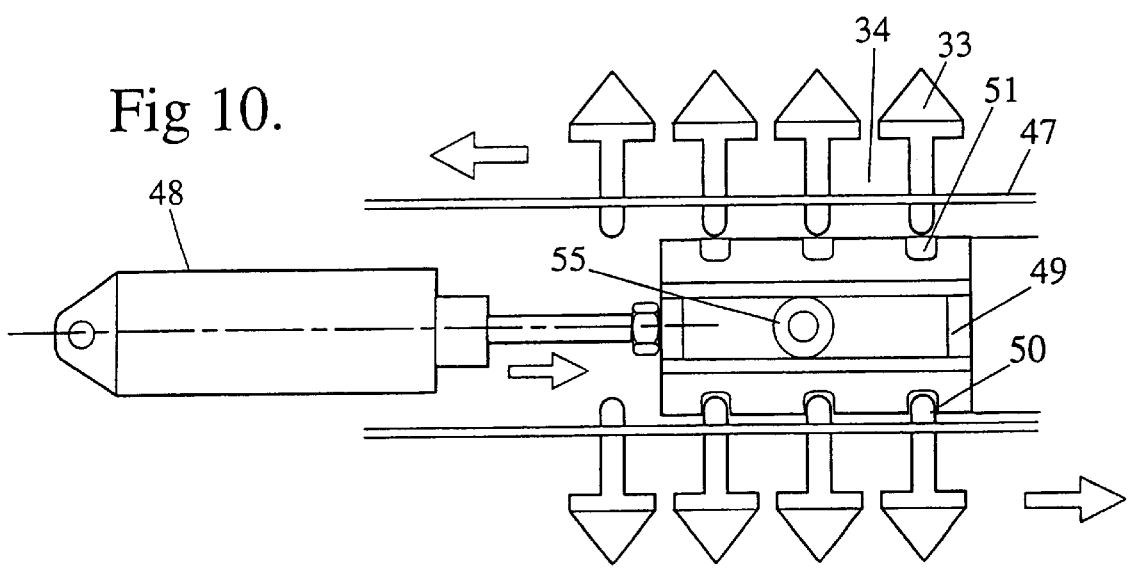
Figure 12:
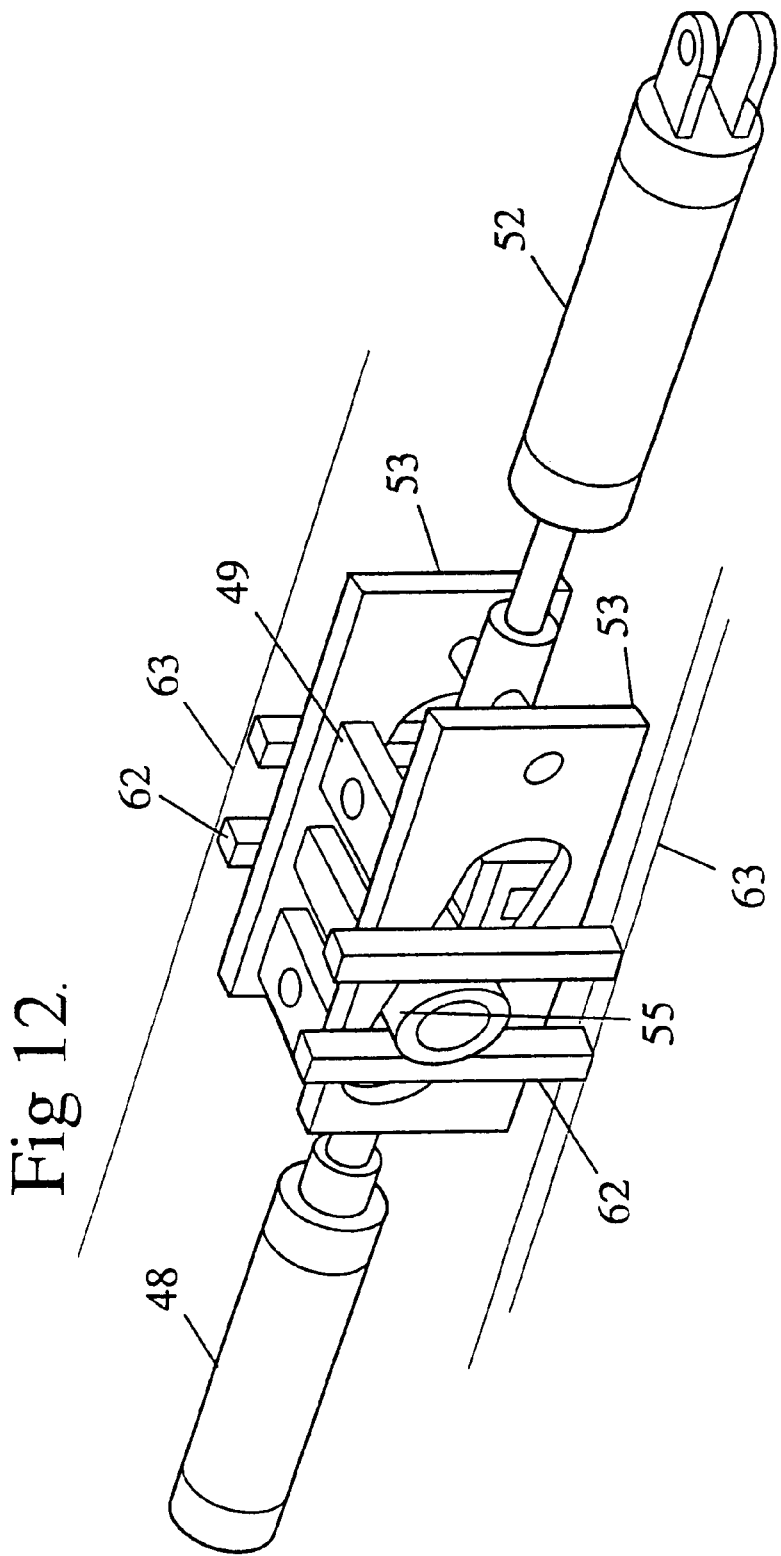
Figure 13:
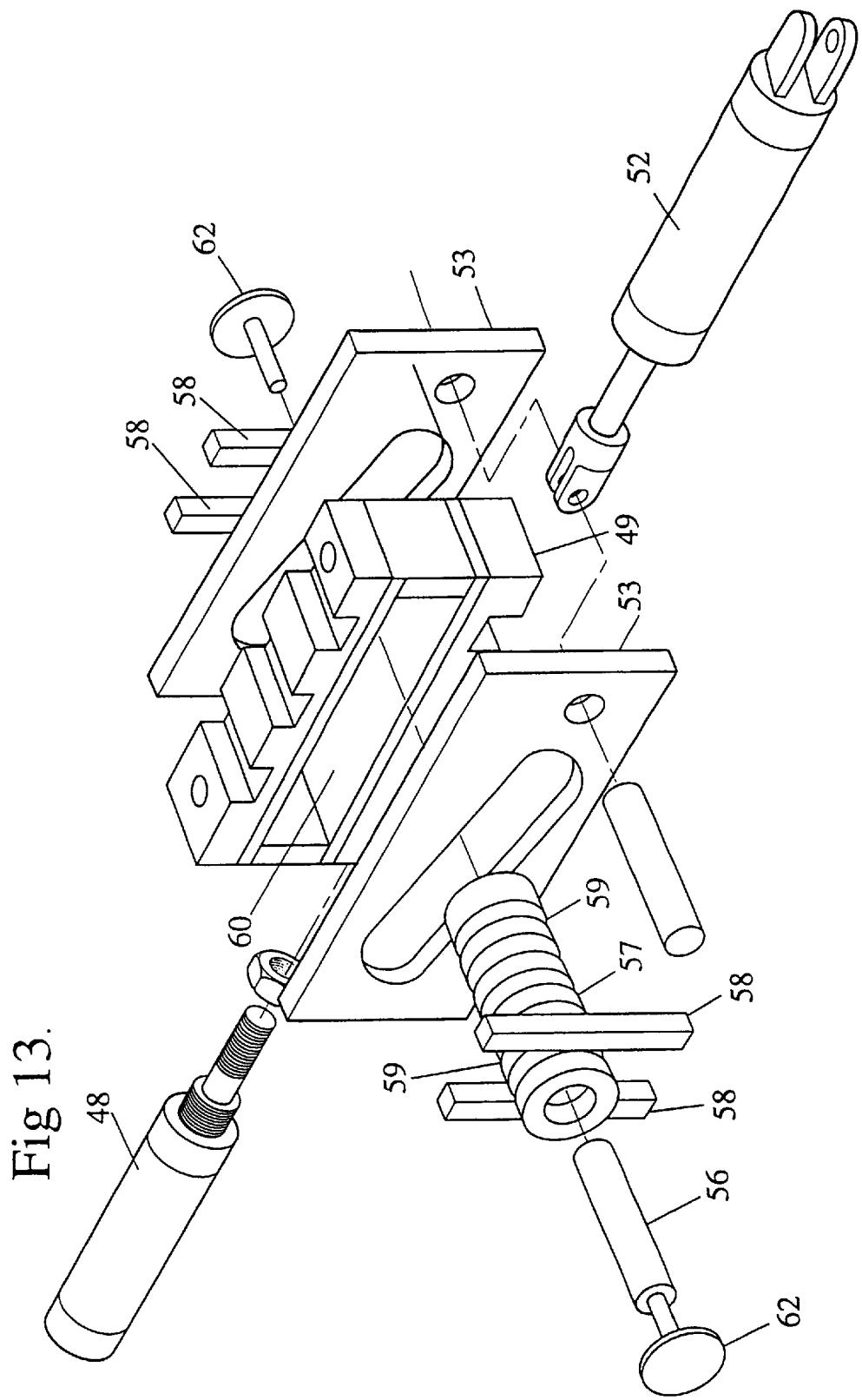

As shown in FIGS. 10 to 13, the conveyor (29) includes an endless belt (47) that is racked forward by a pneumatic cylinder (48) driving a grooved block (49) which on the extension stroke (FIG. 10) engages with the teeth (50) protruding through to the inside of the belt (47) on the "bottom" of the conveyor and on its extraction stroke engages with the teeth (50) protruding through to the inside of the belt on the "top" of the conveyor (FIG. 11).

The grooved block (49) has grooves (51) cut in its "top" and "bottom" which engage with the teeth protruding through to the inside of the belt.

The position of the grooved block ("up" or "down") is determined (FIGS. 12 and 13) by a second pneumatic cylinder (52) which moves forward and backwards two diagonally slotted plates (53) running on the outside of the grooved block (49).

Fitting into the slot in each one of these plates is a bearing (55). Passing through the bearings in each follower is a free floating shaft (56) running from one side of the conveyor to the other. Attached to this shaft are additional bearings (57). On each end of the shaft a bearing is attached which is restrained from forward or backward movement by two square pieces of steel (58) anchored to the conveyor frame on either end. As the slotted plates (53) move forward and backwards the free floating shaft and the bearings move up and down in the vertical slots created by the square steel pieces (58).

On the inside of this shaft are two additional bearings (59) which fit inside the central slot (60) of the grooved block (49). Thus, as the slotted plates (53) move forward and backwards, the followers move up and down, which in turn cause the grooved block (49) to move up and down and alternatively engage with the teeth (50) of the conveyor (47)(FIG. 11).

Restraining the bearings on the shaft are two polyethylene washers (62) which are fixed to the ends of the shaft (56). These washers prevent and movement of the free floating multi-bearing assembly which is restrained by the activating faces of each of the movable components described above.

The two pneumatic cylinders which rack the belt forward act in the following sequences (FIGS. 10 and 11):

Racking cylinder (48) extends; Grooved block (49) in the down position moves the bottom of the belt to the right, and the top of the belt to the left (counter-clockwise) and stays engaged in the teeth (50) until the cylinder (48) is fully extended, thus preventing belt inertial overrun;

Block positioning cylinder (52) then extends; Grooved block (49) moves up and when fully engaged with the upper teeth (50), the racking cylinder (48) then retracts.

Grooved block (49) in the up position moves the top of the belt to the left, and the bottom of the belt to the right (counter clockwise);

Block positioning cylinder (52) retracts; Grooved block (59) moves down.

By utilising the one air cylinder propulsion in both the out and in stroke effectively doubles the operating speed which is important for economic selectivity of live plants and to eliminate gaps in the planted field. In one preferred embodiment the plug retaining belt is indexed at 9.4 plug retainers per second. By sizing the grooved block (49) teeth depth so that before the upper drive teeth are disengaged the lower teeth are engaged making it impossible for the device to skip drive teeth. The fact that block (49) stays engaged with the teeth (50) by way of groove (51) during the propulsion cycle prevents any overrun from the high speed acceleration and deceleration of the belt, plug retainers, plugs and plant mass.

This system ensures no overrun on indexing, is an extremely direct drive, and has the advantage of only one cylinder performing two functions in relation to the indexing of the conveyor, where both functions propel the conveyor in the one direction.

Figure 14:
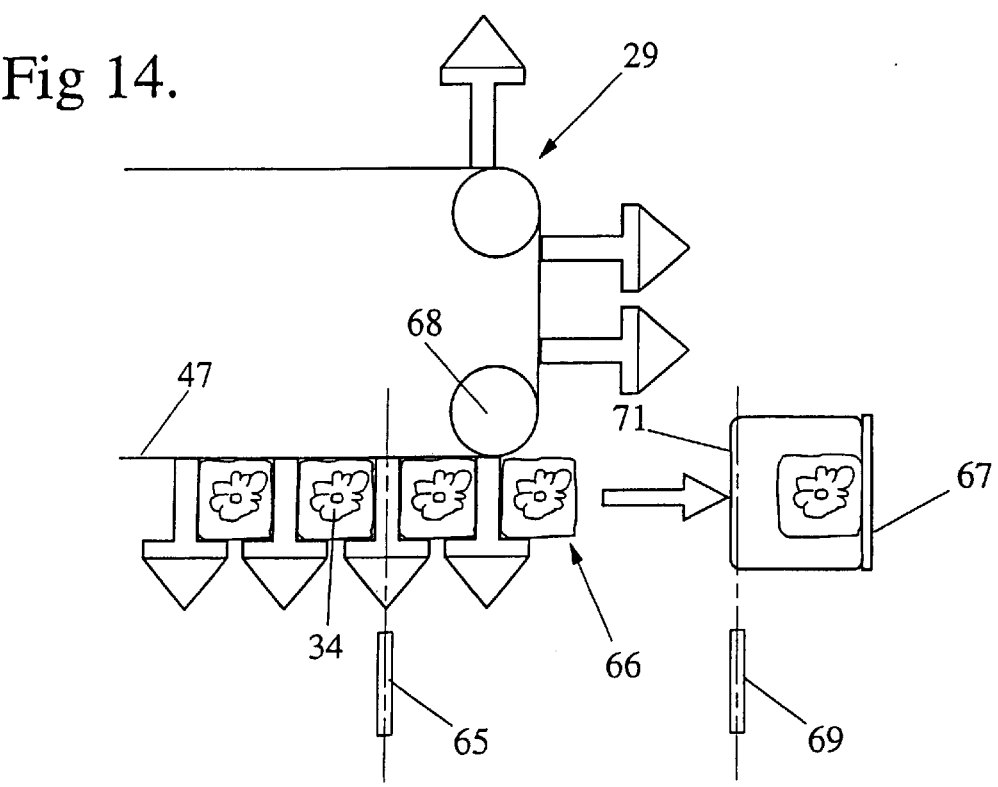
Figure 15:
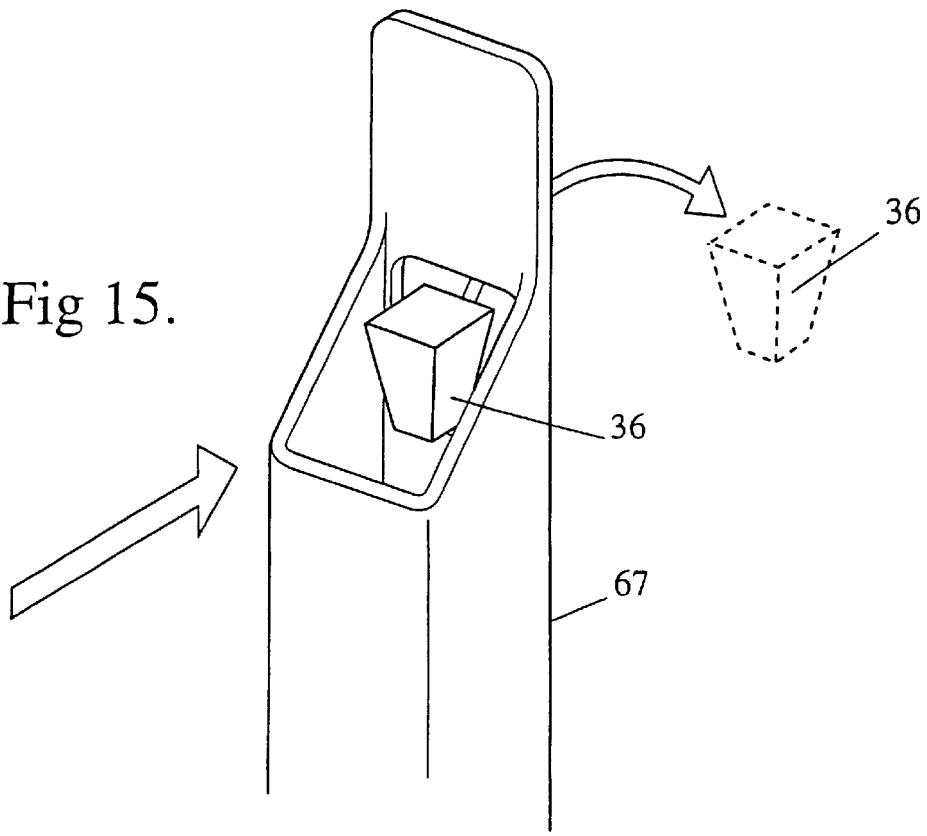

With reference to FIG. 14, as the belt (47) of the conveyor (29) moves along toward the plant eject point (66) each receptacle (34) is scanned to stem level by a sensor (65) to determine whether a plant is present. As the rapid acceleration of the belt (47) of the conveyor ejects the plant out of the receptacle (34) at the eject point (66) and against on top or inlet of the drop tube (67) (caused by a flexible conveyor, a small roller (68) and high speed), it is again scanned by another or second sensor or scanner (69) at a substantial distance from the first sensor or scanner (65) to confirm whether a plant is present or not for plant identification. A false reading at the first sensor (65) and/or (69) can be caused by malformed lower leaves of a non viable plant in the adjacent cell, particles of soil, old cotyledons, lower leaves and also over filled cells in the tray. Such plants as celery, pre-trimmed in the nursery, cause wide divergence of leaf material which encroaches on neighbouring cells causing a false reading in that cell. Lettuce has numerous lower leaves and can cause a false reading, therefore allowing a miss in the field. The second sensor (69) confirms a live plant is present in the plug by reading the foliage as it is being transferred through the air from the conveyor to the top of the drop tube (67) being distinctly separated at a greater distance than the leaves and stems of the following plants still in the plug retaining belt. If there is no live plant present, the plug (36) is ejected out through the side of the drop tube (67) (FIG. 15) and the conveyor (29) indexes at eight cells per second or more until a live plant is detected. In an alternative, the plug may drop down the tube (67) and be ejected at a later stage. Once the plant enters the plant drop tube (67) and starts to fall vertically, in one embodiment (FIG. 16) it is scanned a third time, just prior to being stored in the drop tube. To be sure of detecting crooked or offset plants within the drop tube it is necessary to have a series of beams. One method of scanning comprises the use of a sender and receiver and encapsulated mirrors using fibre optics. A sender (72) emits a beam of light across the plant tube which hits a mirror (74) and reflects back across the tube onto another mirror opposite (75). This action continues until a light beam has crossed the drop tube and is picked up by the receiving unit (76). The number of beams and the distance between them being determined by the angle of the transmitter and receiver in respect to the mirror.

If the light beam is broken, this determines that a live plant is present. Another method of scanning is by using ultrasonic field sensing or any appropriate scanning/sensing device.

A plant is stored in the down tube (67) and in the shoe (78), and can be scanned at (79) in the shoe if necessary. If any misses are determined at the first or second scanner these stored plants are released to fill in the gaps, therefore ensuring 100% accurately placed plants in the field with no misses or gaps.

The storage of plants serves two purposes, namely:

1. as a buffer of stored plants to enable high speed separation without any gaps in the field; and
2. allows the placement of viable plants in the field when non viable plants are determined by the scanning means, therefore again, ensuring 100% viable plants with no gaps or misses in the field.

In this drop tube (67) a plant can be stored (see above) (FIG. 16), to be planted when a non viable plant is detected via the scanner devices. When such a non-viable plant is detected, a pneumatic cylinder (80), connected to a V-shaped plant receptacle (81) or other mechanical device, can place this receptacle (81) into the plant drop tube (67) and is positioned there to arrest the travel of the falling plant. If a plant is not detected by the scanner at the top of the drop tube which scans for foliage an air cylinder (82) is activated and the plug pusher (83) forcibly ejects the non plant containing plug (84) to exit through a side wall aperture (85) out of the planting storage zone. The plug pusher (83) or deflector in one embodiment has a flat surface which will allow the next plug and plant to rest on it until it is retracted when the plug is allowed to drop. From the drop tube the plant is captured by holding means formed by the base of the shoe.

Figure 17:
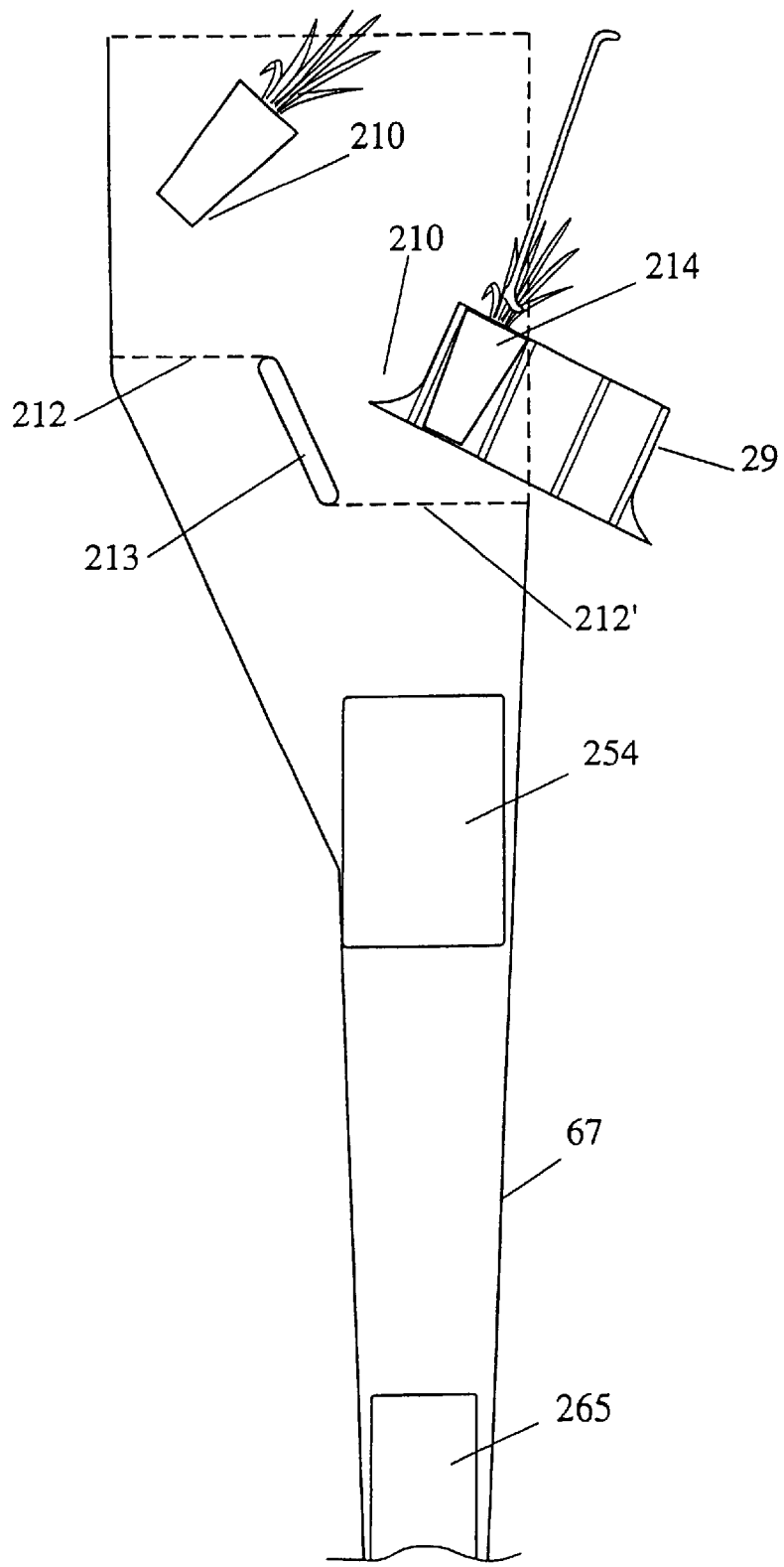
Figure 18:
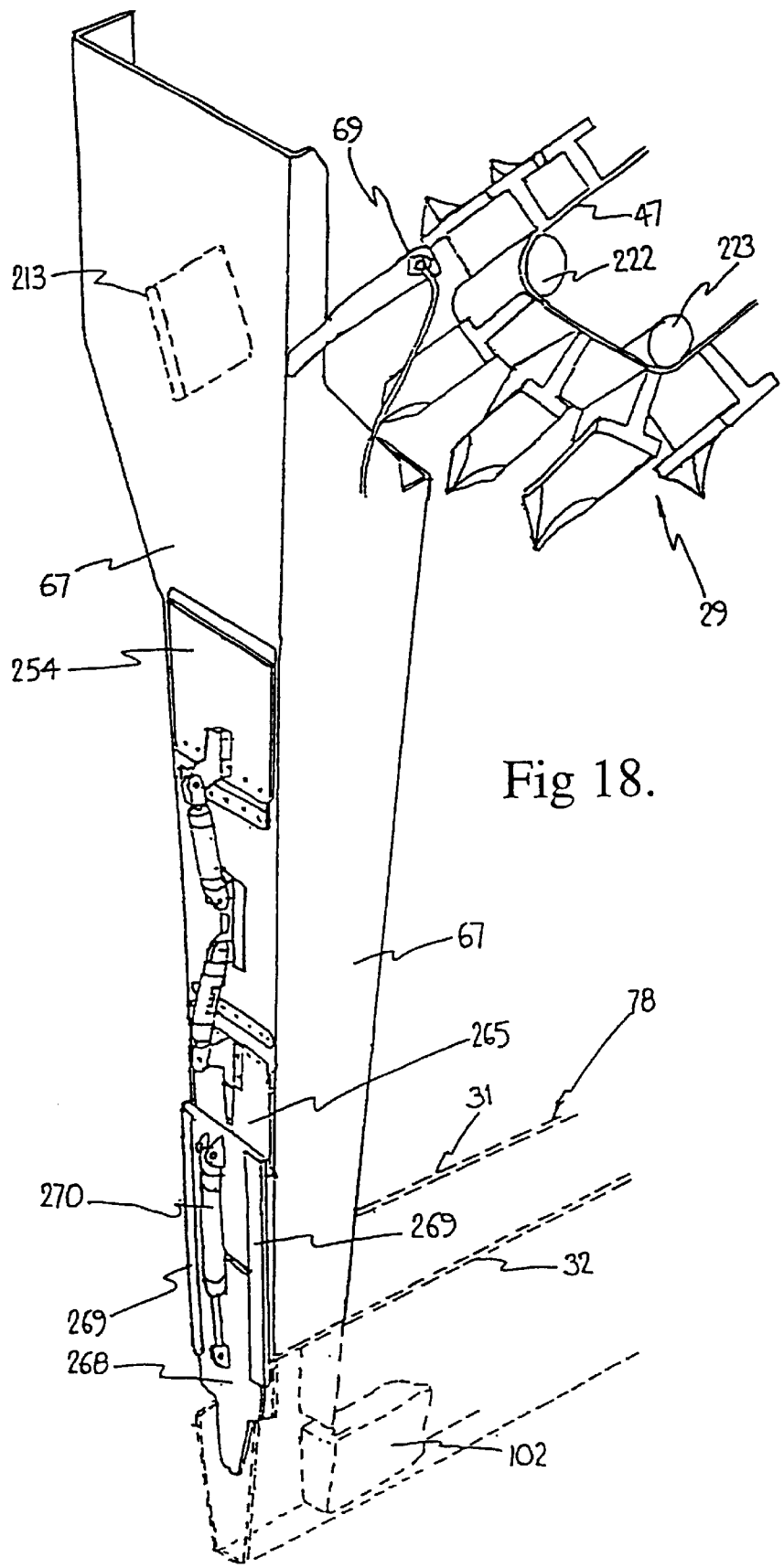

Referring now to FIGS. 17 and 18, a further preferred embodiment of this invention allows for the last plug/plants held in the plug retainer belt (29) to be discharged simultaneously as the plug retaining belt (29) swings upwardly to the plant loading position. This means that the plug retaining belt (29) has moved upwardly for 125 milliseconds prior to the plug being fully discharged into the vertical drop tube (67). A dual controlled entry point (210) at the top of the drop tube (67) is provided to ensure that the plant discharged on the upwardly loading cycle is correctly guided and aligned vertically at the entry (212) or (212') of the drop tube secondary guide (213). This is particularly important for the likes of plugs supporting very small plants, eg. small lettuce. The secondary guide (213) referred to above is designed for easy removal when planting tall, larger leafy plants, eg. cauliflower, broccoli, cabbage and tomatoes.

FIG. 18 depicts an isometric view of the vertical drop tube (67) as described above.

For very large plants that are both tall and have a high degree of bulky leaf material the vertical planting mechanism is simply unclipped and replaced with a larger vertical tapered planting mechanism.

The same procedure is adopted after having loaded the plug retaining belt (29) on the down stroke [see FIG. 17], the first plug (214) held in the plug retainer belt (29) is ejected at a predetermined point (211) by means of a sensor to allow the ejected plug to transfer vertically down the vertical drop tube (67) prior to the plug retaining belt reaching its home position (215) where in the case of a 240 cell tray a further 23 plugs can be ejected at 125 milliseconds.

One method of scanning the plug retaining belt (29) to detect live plants relies upon a sensor being positioned in line with one side of the plug retaining cavity and reading the live plants as the plug travels forwards one discrete step of 125 milliseconds.

Some species of plants, for example lettuce, parsley and celery, have widely spread low leaves and in the case of some plants such as cauliflower, low horizontally disposed old yellowed cotyledons often exist. Any such vegetative material which protrudes over the adjoining plug retaining cell can cause the plant sensor to record live plant material over a plug retaining cavity which does not contain a live plant. The effect is that each false reading as above will directly cause a plug without a plant to be planted into the field causing gaps along the row of plants, requiring field walkers with buckets of plants to infill.

Figure 19:
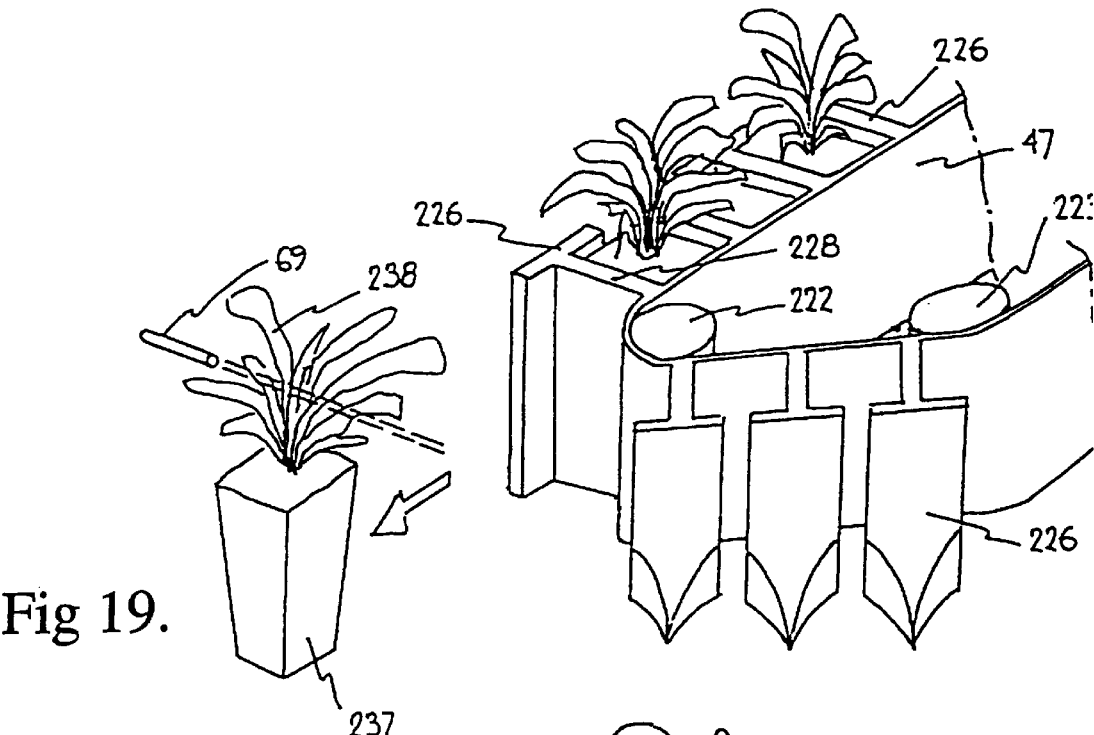

Referring to FIG. 19, the plug retaining belt is preferably designed with a very small roller (222) at the discharge end with a secondary roller (223) offset at a shorter distance to cause the belt (47) to angle back sharply from the eject point (66). This invention cause the 'T' shaped plug retaining walls (226) which are normally parallel relative to one another to cause the plug retaining wall forward of the plug (228) to accelerate very rapidly around the small roller (222) travelling some 3 to 4 times the distance at the tip of the plug retaining wall within the 125 milliseconds. This effectively moves away from the plug and allows the rapidly accelerating wall behind the plug to propel the plug out and away from the belt. The sensing read period is switched on by the input to start the plug retaining belt drive mechanism and is switched off at the end of the plug retainer belt stroke, except for one embodiment of this invention that allows an input to a microprocessor to adjust a delay period at the end of the plug retainer belt drive mechanism stroke.

The effect of the acceleration of the plug (229) causes the plug and plant to transfer through the air from the plug retaining belt. This allows the sensor (69) to be positioned at a considerable distance away from the plug and plant still in the indexing conveyor (29), and prevents misreading of foliage. On the commencement of the horizontal transfer of the ejected plug, gravity takes an immediate effect, causing the plug and plant to travel on a curved descent after being ejected from the belt (29). This can cause very short plants, eg. Small lettuce plants, to pass under the plant sensing position (69). One preferred aspect of this invention provides for the provision of a series of horizontally disposed orifices (235) [see FIG. 20] which are fitted to a pneumatic valve and connected to the controlling microprocessor to ensure a horizontal ribbon of relatively high velocity air (236) is provided, which engages the plug (237) on its trajectory horizontally and downward arresting the downward travel and immediately and rapidly transferring the plug horizontally ensuring that the plant top (238) immediately passes through the plant sensing position (231).

Referring to FIG. 21, another embodiment of the invention is provided to prevent long, slim stems (249) with small areas of foliage (248) on the extremity of the stem, eg. Celery, large soft lettuce, long soft leeks or onions, which can spread horizontally a long distance from the plug (245) in which they grow. Two rectangular bodies (243, 244) containing separate rows of orifices are positioned with the first unit (243) positioned vertically and close to the forward edge of the plug (245) and plant at the eject position, and the second unit (244) radially disposed at an angle spaced out from the eject position. Both air jets being controlled by an output from the microprocessor which controls the air flow to be either on or off, in relation to plants being planted. This allows for the second angular ribbon of air (247) to engage against the outer foliage (248) at the greatest point of leverage over the long stem (249) and propels it upwardly (250) to engage in the vertical ribbon of air (251) to effectively hold the foliage is a semi-vertical position (252) well clear of the plant sensing zone preventing false reading of plant material. It is the intention of this aspect of the present invention to allow different configuration and types of air jets to be placed in locations best suited to the plant species being selected for transplanting.

As previously described it is important to locate the plug containing a plant at a desired constant depth vertically in the ground and if plugs not containing plants were allowed to descend through the vertical planting mechanism. The fast forward indexing of the plug retaining belt (gapping up) would effectively discharge a plug containing a live plant immediately after having ejected one or more plugs not containing plants. The plugs without plants would lodge in the holding pocket immediately followed by the plug containing the live plant. On receiving the correct number of pulses from the encoder measuring the required planting distance between plants, the horizontal plant transfer mechanism would transfer the plug without a plant with the plug containing the plant lodged on top of it. This would cause a serious misplacement of the plug containing the live plant, which would require substantial labour forces of field walkers correctly positioning these plants.

This invention allows for the very rapid separation of plugs without plants from plugs with plants at 125 milliseconds each or 8 per second per single machine. Referring to FIG. 18, this is effected by a hinged deflection or flap (254), connected to the vertical planting mechanism pneumatically powered and controlled by a microprocessor in conjunction with the selectively plant sensing system.

As illustrated in FIG. 22 if a plant top is not detected the flap (254) is pushed inwardly to completely block the vertical drop tube (67) on an angle so that the descending plug (256) falls onto the sloping surface (257) and stays in this position until such time as a live plant is sensed and then immediately reverts to [see FIG. 23] the vertical position (258) to close the aperture and form the rear vertical wall of the drop tube (67). This action effectively ejects the plug without a plant and allows the normal vertical downward transfer of plugs with plants.

In one preferred embodiment a flexible synthetic material (259) is used for the hinge being attached to a light-weight composite sheet (260) to enable the mechanism to withstand repeated very high speed acceleration and deceleration.

For convenience of operation and to allow the necessary positioning of furrow opening shoes and height adjusting mechanisms the tray from which the seedlings are ejected is at a height from the ground from which the time that it takes a seedling under the effect of gravity to descend to the holding pocket is greater than the 500 milliseconds time between plants, when planting a 2 plants per second per row. To ensure accuracy of plant spacing across the broad spread of plant varieties and plug moisture contents and varying weights, a mid holding point is provided [see FIG. 18]. This is provided by a mechanism consisting of a flap (261) hinged from the top at (262) in the rear wall of the vertical drop tube (67), effectively providing a plant storage position (263) [see FIG. 24] in addition to a lower plant retaining pocket at the rear of the planting shoe.

Figure 24:
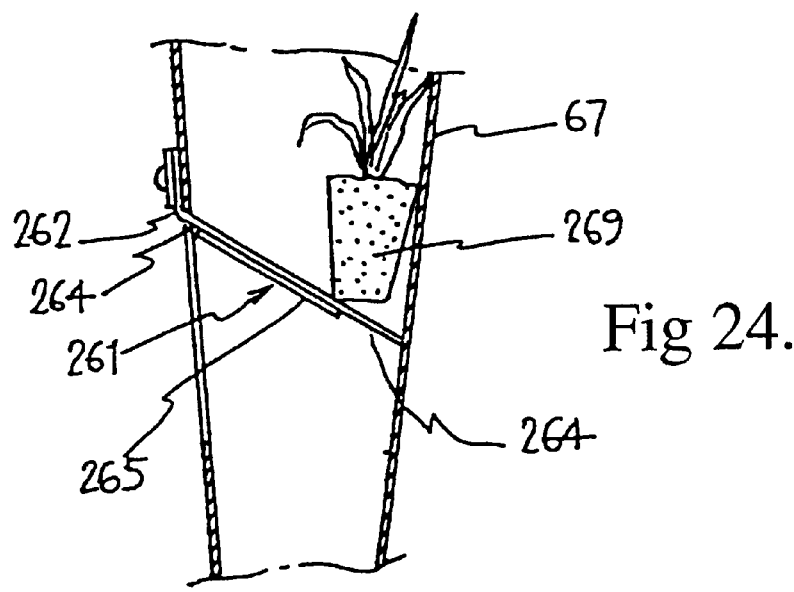
Figure 25:
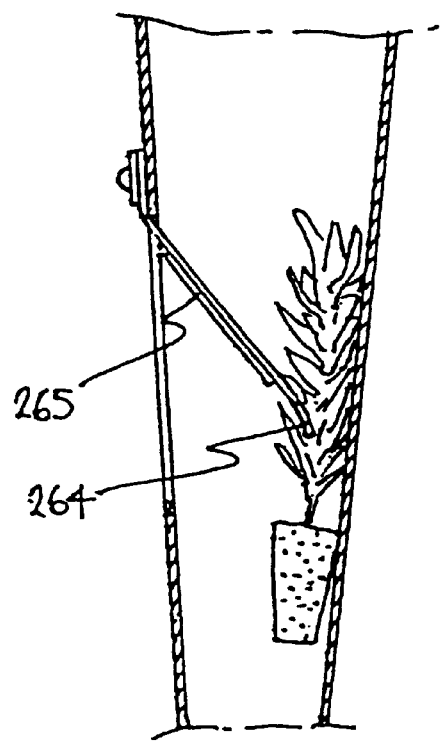

In one preferred embodiment a flexible synthetic material (264) which has a rigid composite material (265) attached to one side, being of a length that allows the upper end to form the flexible hinge (262) and the lower end being longer than the rigid composite material (265) forming a soft flexible extension so that plants of a significantly variable length and weight can be stored at the mid point with the flap under the plug [see FIG. 24] or by the soft flexible extended end lightly holding the plant material against the opposite wall [see FIG. 25].

The lower plant retaining pocket [see FIG. 18] represents four converging walls formed on two sides by the soil opening shoe (78) the forward lower wall being formed by the face of a plug ejector or kicker mechanism (89) and the rear wall of the pocket being formed in one preferred embodiment by a thin sheet of polyethylene (268) running in side guides (269) and attached to a pneumatic cylinder (270) which is controlled by the microprocessor. All of these four lower pocket walls are effectively extended upwardly by connection to the four walls of the vertical drop tube (67). The function of the plant retaining lower pocket (100) is to overcome short comings of all previous machines which allow for at least one side of the plant drop tube to remain open at all times, which during windy conditions or situations where the plug breaks away from the root material, eg. Leeks and onions which have a characteristic of poor rooting mainly located in the lower region of the plugs, the effect being of having little frictional side contact with the inner walls of the soil opening shoe, resulting in plants prematurely falling out of the correct location causing serious misalignment in the field. This slidable rear panel (268) is effectively timed by the microprocessor to open just prior to the horizontal transfer of the plug containing the plant, completely opening the back wall of the vertical planting mechanism allowing the plant top to freely transfer horizontally. Two further preferred aspects of the invention provide control of the upper plant vegetative material so as to ensure the plant is planted in a vertical position.

If the plug and plant top are accelerated at very high velocities, and when the pneumatic cylinder (101) propelling the horizontal plug transfer mechanism (89) suddenly reaches the end of its stroke, the plug forward speed being arrested by the enveloping soil, immediately stops allowing the mass of vegetation above ground level to continue unhindered with greater force than that preventing its movement by the engagement of the plug in the enveloping soil causing the plants to be located on an incline to the rear of the direction of travel.

By fitting in the air out end of the cylinder (101) an air restrictor with a one way return valve, the velocity is set to ensure the outward stroke positions the plug with the seedling being in a vertical position and the return of the pneumatic powered planting mechanism (89) due to the one way valve being at very high speed so that the complete planting cycle is less than 500 milliseconds in time to receive the next plant.

For high speed transplanting as outlined above, the horizontal plug transfer mechanism (89) when transferring a plant type with substantial and high foliage which encounters wind resistance and also the effects of the stationary mass of the foliage generated by the high forward speed may cause the plug to move ahead of the foliage resulting in the plant being planted on an angle with the foliage leaning forward towards the direction of planting.

Also, the same effect is worsened by often substantial windy conditions particularly with the wind direction from the rear of the machine. To minimize such problems, a vertical member with a horizontal 'Y' shaped retaining member may be provided engaging around the foliage centralising the stem and foliage and being attached directly to the horizontal plant transfer mechanism (89) whereby the plug and the plant top are transferred at exactly the same speed and ensures that the seedling is plated in a vertical position.

When normal commercial plant spacing are used, plants planted at 2 per second per row requires a relatively fast forward planting speed. This results in a speed boat like wake being formed immediately behind the plant shoe (78), resulting in a continuation of the soil being separated well behind the plant shoe which then converges to a central point.

One unique feature is that the horizontal plug transfer mechanism (89) on the outward travel extends very substantially past the rear vertical surfaces (290) of the soil opening shoe (78) to ensure that even with extremely high forward planting speeds, the plug is transferred past the point of the extended separated soil slot, as described above and firmly embeds the plug/plant into the enclosed soil.

Figure 16:
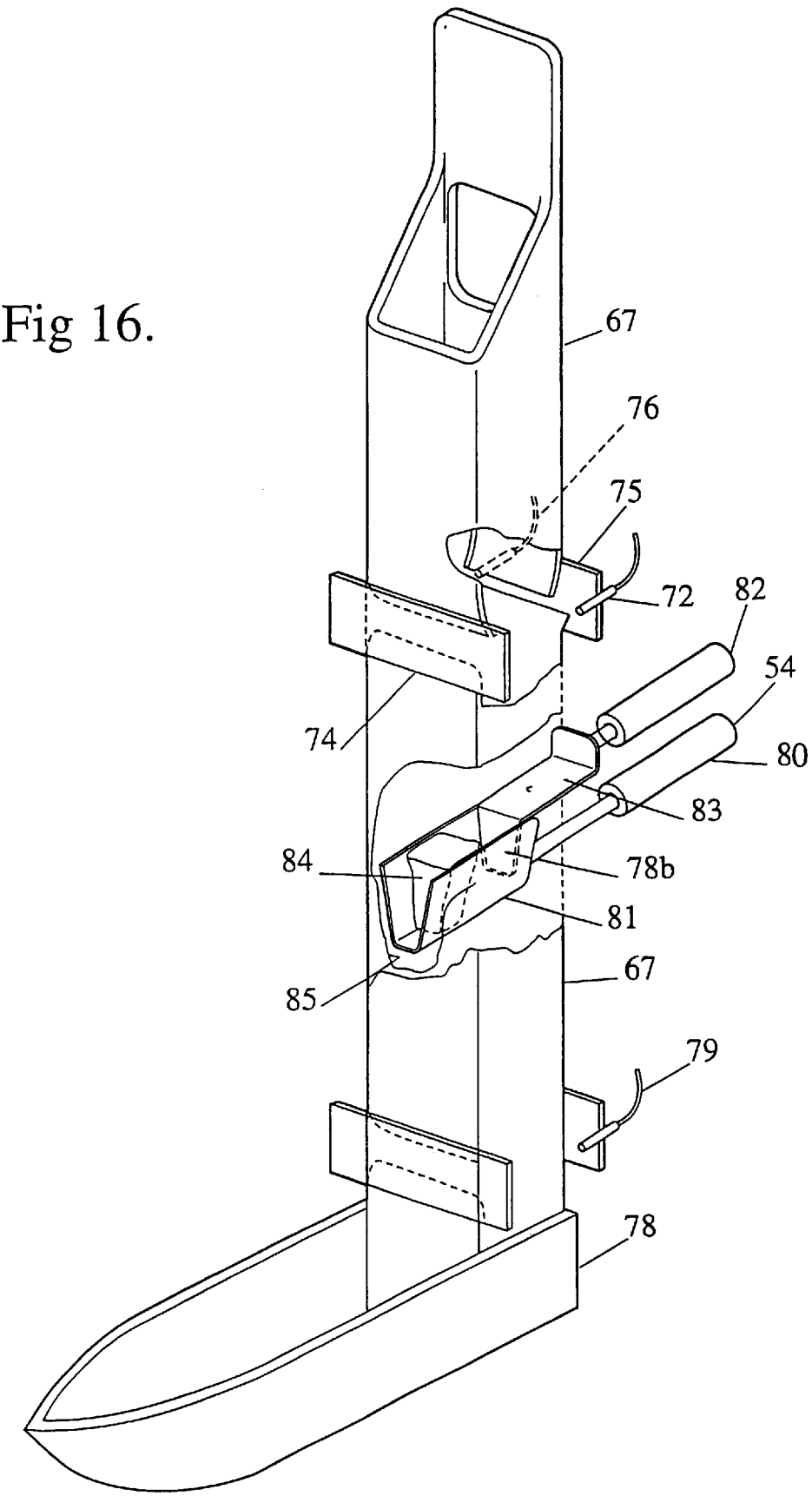

There are conveniently two types of drop tubes (67) that might be utilized. The first type (as shown in FIGS. 16 and 18) consists of a single tube (67) dropping vertically into the shoe (78). The second type may consist of multiple drop tubes (two in FIG. 27) (87) hinged to a single top tube (67) directly underneath the conveyor eject point (66). These tubes (87) are each connected to a respective shoe (78) for different row spacings and under the drop tube plant storage. Seedlings may pass down one or other of the tubes (87) by selective positioning of a flap gate (62). These tubes (87) are horizontally adjustable at (90) to adjust planting widths. For optional eight inch row spacings, a three drop tube mechanism can be fitted (FIG. 28).

Essentially the transplanter has provision after ejecting plants from the tray for sensing plants at 4 locations and storing plants at 3 locations with the ability to move the stored plants from each of the stored locations at independent times to each other, thus allowing buffer storage, gapping up and plant placement at precise distances in the field. This can be undertaken regardless of the variable forward ground speed of the transplanter and regardless of a reasonable number of plugs not containing live plants. Furthermore, regular high speed transplanting can be maintained which is not disturbed by part of the cycle of mechanically indexing trays and transplanting plants even if it is slower than the sustained planting speed.

In addition, stages are presented where a plug not containing a live plant will be mechanically ejected from the plant storage area allowing another plug containing a live plant to be advanced to the storage area, thus preventing the positioning of plugs not containing a plant in the planting shoe which would prevent the proper positioning of a selected plug containing a plant and cause an inaccurate placement of that plug and plant which would require replacement by hand.

Figure 26:
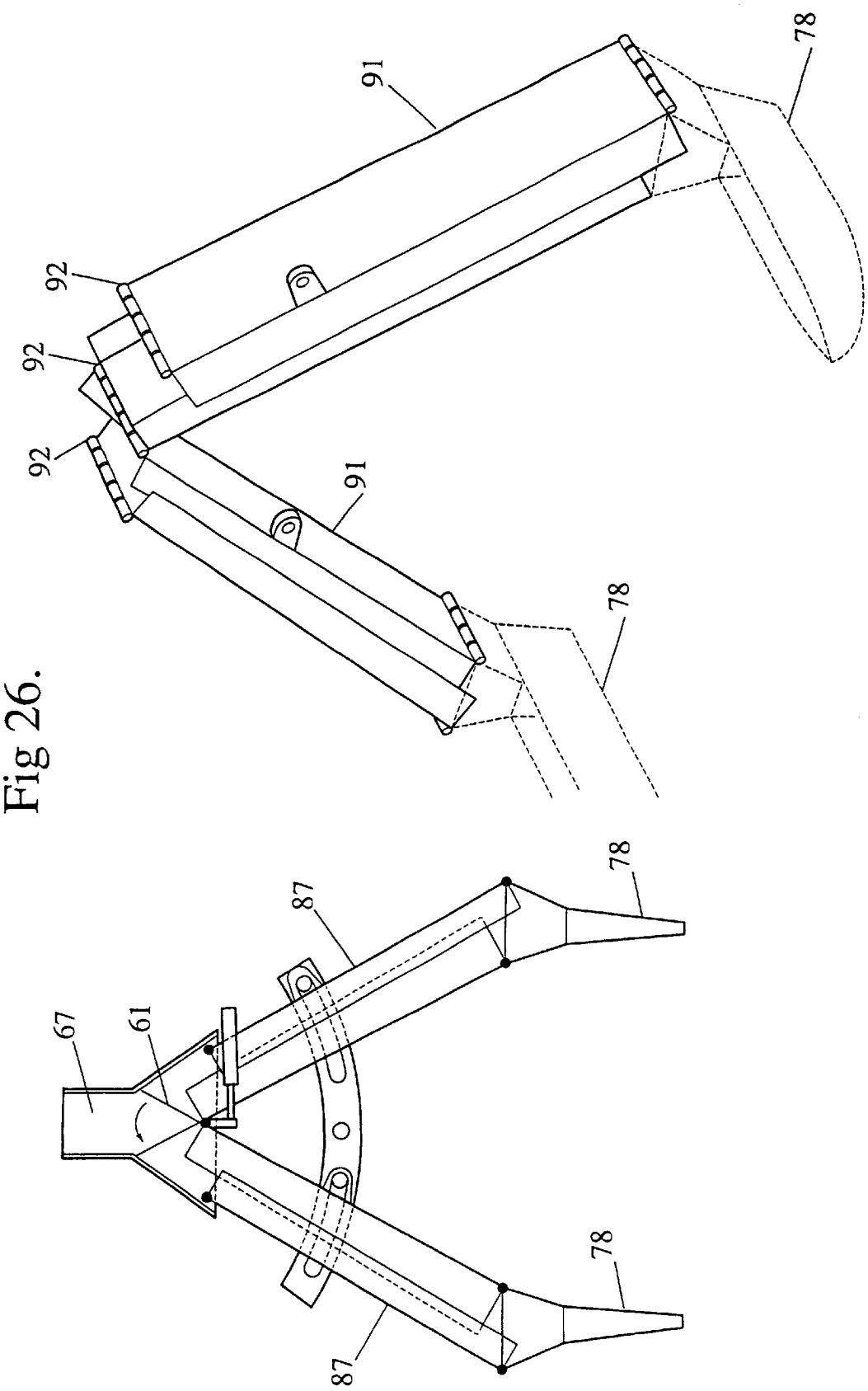

On the two and three tube mechanism (FIGS. 26 and 28) in one preferred embodiment, the construction simulates a parallelogram. Each tube consists of two pressed channels (91) (one slightly narrower than the other to allow it to slide inside the larger one), each channel section is pivoted at the top (92) onto a short section of vertical tube (88) and pivoted at the bottom onto the shoe mechanism. Therefore, any sideways movement or adjustment means that the shoe always stays in the vertical position.

A pneumatically operated flap (61) operates at the junction of the drop tubes to the top tube. The flap (61) directs the plant to the appropriate shoe in the correct sequence and timing. On the three leg assembly two steel directional flaps (94) are used and again they are pneumatically actuated via air cylinders (95) for vertical planting in the central tube, the two flaps are vertical. For planting in the right hand tube, left flap (94) stays vertical and the right flap (96) moves across. To allow access to the left hand drop flap (94) (LH) moves to the right (97) and right hand flap (94) stays vertical.

Figure 27:
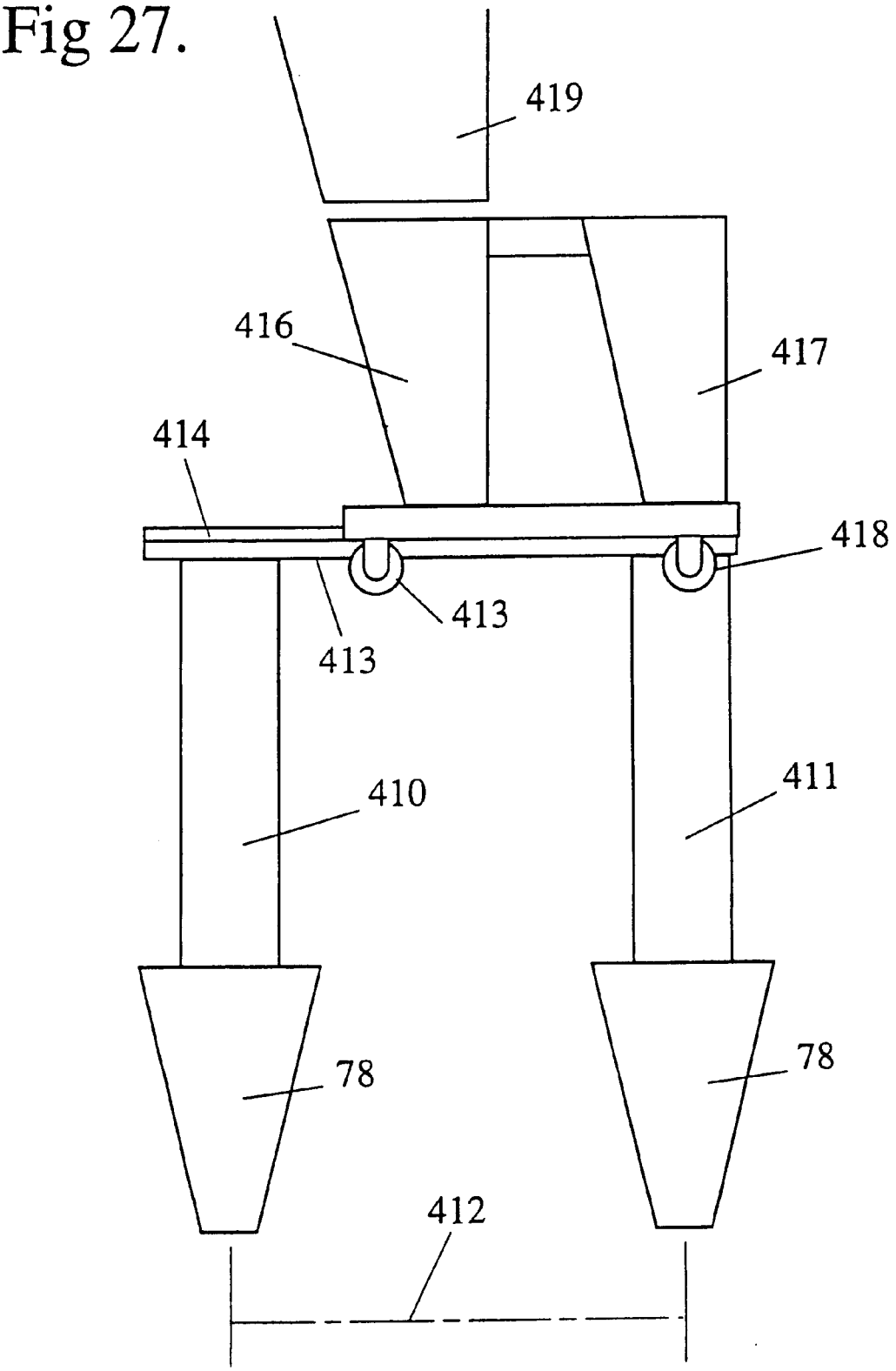

FIG. 27 illustrates a still further preferred embodiment for a twin drop tube transplanter having two fixed vertical plant tubes (410) and (411), which are attached to the twin shoe mechanisms (78), which are spaced at a predetermined center distance to suit the plant row spacings (412). Mounted at the top of these drop tubes and connecting both tubes, (410 and 411), is a joining plate (413) to which is bolted a flat section of material (414), eg. Polyethylene or some other suitable material, which acts as a slider plate for two plant retaining chutes, (416 and 417). The chutes (416 and 417) can be secured with the use of guide wheels (418) connected to the chute frame (419), which moves from side to side. The plant retaining chutes being moved by an actuator (not shown), are located in such a position that when a plant is dropped from the plant retaining receptacles (419) directly above the chutes, if falls into the left hand retaining chute (416) which immediately moves across to the left hand lower plant tube (410). When directly over the left hand plant tube the plant falls down the fixed lower drop tube and into the shoe mechanism (78). When the retaining chute stops over the left drop tube the adjacent plant retaining chute (417) is positioned under the plant storage receptacles (419), a plant drops from the receptacle into the plant retaining chute (417) which immediately moves to the right and stops over the right hand drop tube (411), bringing the adjacent retaining chute (416) under the plant storage receptacles (419) ready for the next cycle.

Referring now back to FIG. 1 of the drawings, once the tray (6) has been emptied of the last row of plants if falls under gravity down the tray guides and onto three narrow rollers (98) (FIG. 1) which are inclined towards the rear of the machine so that the tray rolls out of the loading frame and into a collection area. Another embodiment is to have an eject air cylinder or air blast at the end of the tray or alternatively, at the back of the tray to flat stack the trays.

Figure 30:
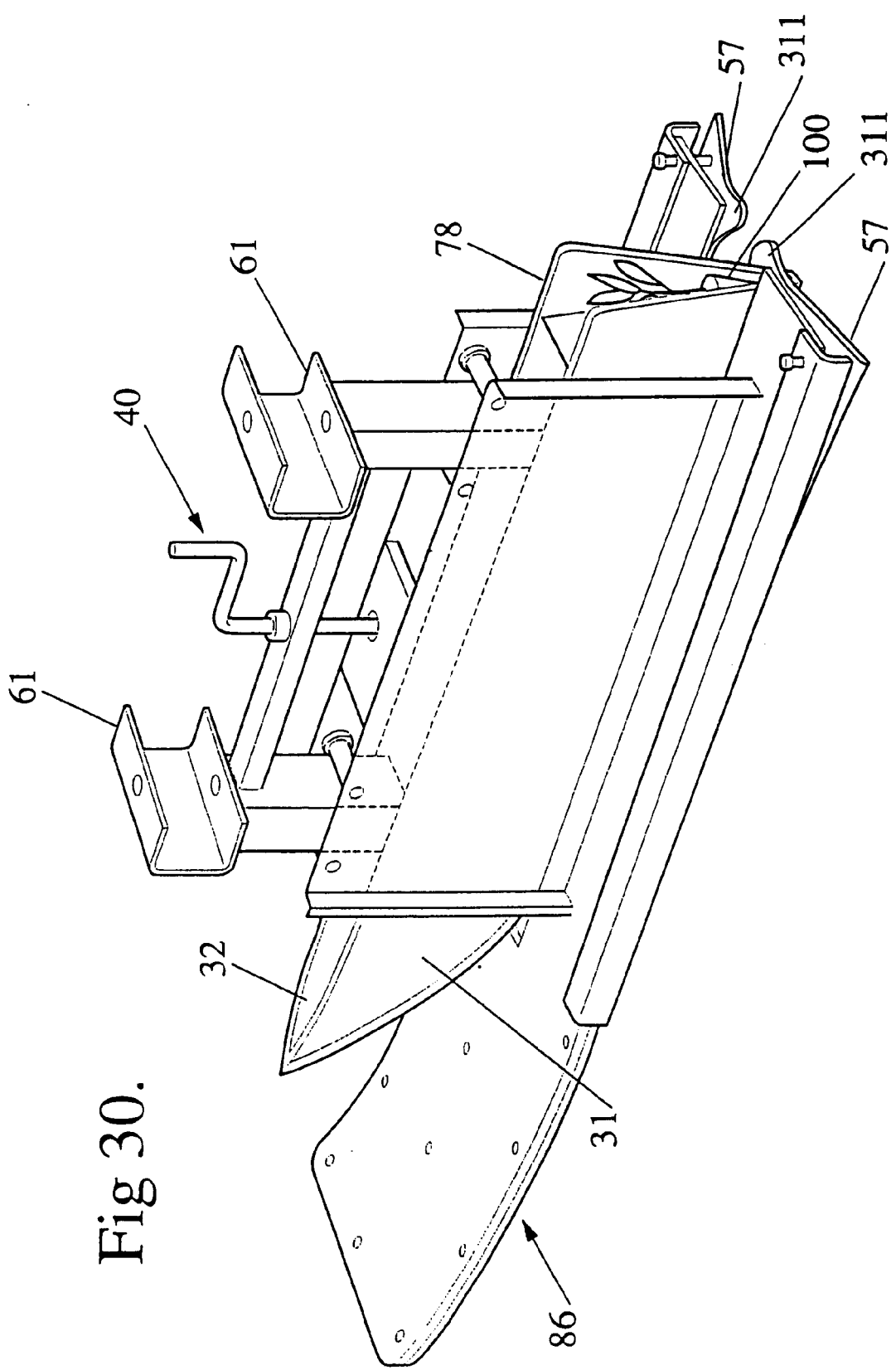

FIGS. 29 and 30 illustrate the plant shoe (78) and ski assembly (86). The plant shoe (78) is a keel shaped assembly designed to produce a furrow in the soil for the placement of the plant (100). Inside this shoe and to the rear of the shoe, a plant kicker mechanism (89) is located. This kicker mechanism (89) includes a pneumatic cylinder (101) which is on one embodiment, directly attached to a plug shaped section (102) which matches the shape of the plug soil mass of the plant, and also the internal profile of the plant shoe (78). When a plant is dropped into the base of this shoe (78), it wedges between the plant tube side plates (30, 31), therefore keeping the plant in the upright position. The cylinder (101) pushes out the plant into the open furrow created by the keel shaped shoe at the appropriate time which is initiated via a ground driven encoder microprocessor allowing fast on the move plant spacing settings and distance changes. The ski assembly (86) includes sledge runners (57) on either side of the plant shoe (78) and is mounted thereto such that the shoe (78) can be raised or lowered by a mechanism (40) relative to the ski assembly. This sub assembly may be mounted via brackets (61) to the assembly (89)/tool bar (107) as described above in the introduction and in the following description.

The horizontal plant transfer or plant kicker mechanism (89) in two preferred embodiments may comprise:

(a) A high density block of polyethylene or some other suitable material which is shaped to locate and guide within the sloping walls of the soil opening shoe which on its lower surface has a series of fully transverse serrations with the sloping notches facing rearward so that when the mechanism retracts any foreign material eg. Granules of sand roll under the sloping serrations into the notched teeth and on the extending stroke, the vertical faces of the serrated notches eject the foreign materials.

(b) A 'T' shaped block of high density polyethylene or some other suitable material running between horizontal guides attached to the shoe (78) and attached to the pneumatic cylinder (101), has a hinged face which contacts the plug (100) on the outward stroke during which time it is prevented from rotating by the lower extremity of the leg of the 'T' shaped block. On retraction the hinged face is free to rotate outwardly and trail over any soil of foreign material on the backstroke effectively pushing ahead any foreign material on the outstroke.

Figure 20:
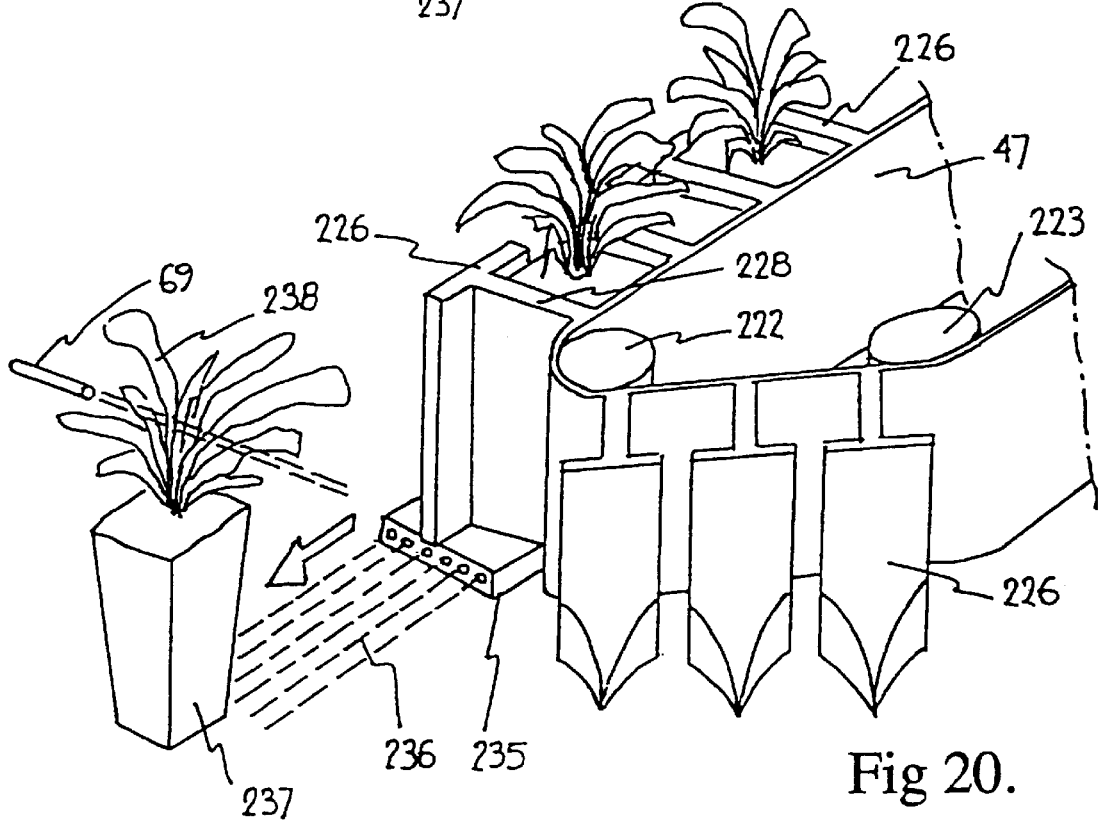

Referring to FIGS. 19 and 20, a unique feature of the soil opening shoe is that it is constructed of polished hardened material with minimum width for plug retention on the diagonal of the plug and formed on a very gentle curve being from front to rear totally free from the traditional angular bends in the side walls of the planting shoe to accommodate a vertical plant drop tube of a large lower diameter. The effect of the gentle and smooth curves and the special tapered shape of the vertical planting mechanism allows the shoe to pass through, even sticky mud, without the usual build up on the sides of the shoe adjacent to the angular bends which normally causes a substantial increase in width and opening a very wide furrow into which the plugs are transferred in a state of disarray and have insufficient displacement of soil to properly encompass the plugs.

Referring to FIGS. 29 and 30, a unique feature of the shoe is that a hardened thin plate (303) at the base of the shoe (304) is projected rearwardly beyond the end vertical side walls of the shoe (305) to the full extent of the horizontal transfer of the plug (100). This effectively ensures that the plug cannot improperly or prematurely drop to the full depth of the slot left in the soil by the hardened and sharpened soil opening shoe (78) and ensures exceptional control of the planting height of the plug and plant relative to the soil surface.

Referring to FIG. 30, a unique preferred aspect is that the ski assembly (86) is used to support the transplanting machine on the surface of the soil in which a pair of skis or a singular ski in which there is a provision for the insertion of a soil opening shoe (78), either between skis or through a ski. A further unique feature is that a shaped protrusion (311) on the inner sides of the skis effectively displaces soil inwardly in close proximity to the plant stem ensuring proper compression of the soil around the plug.

Figure 31:
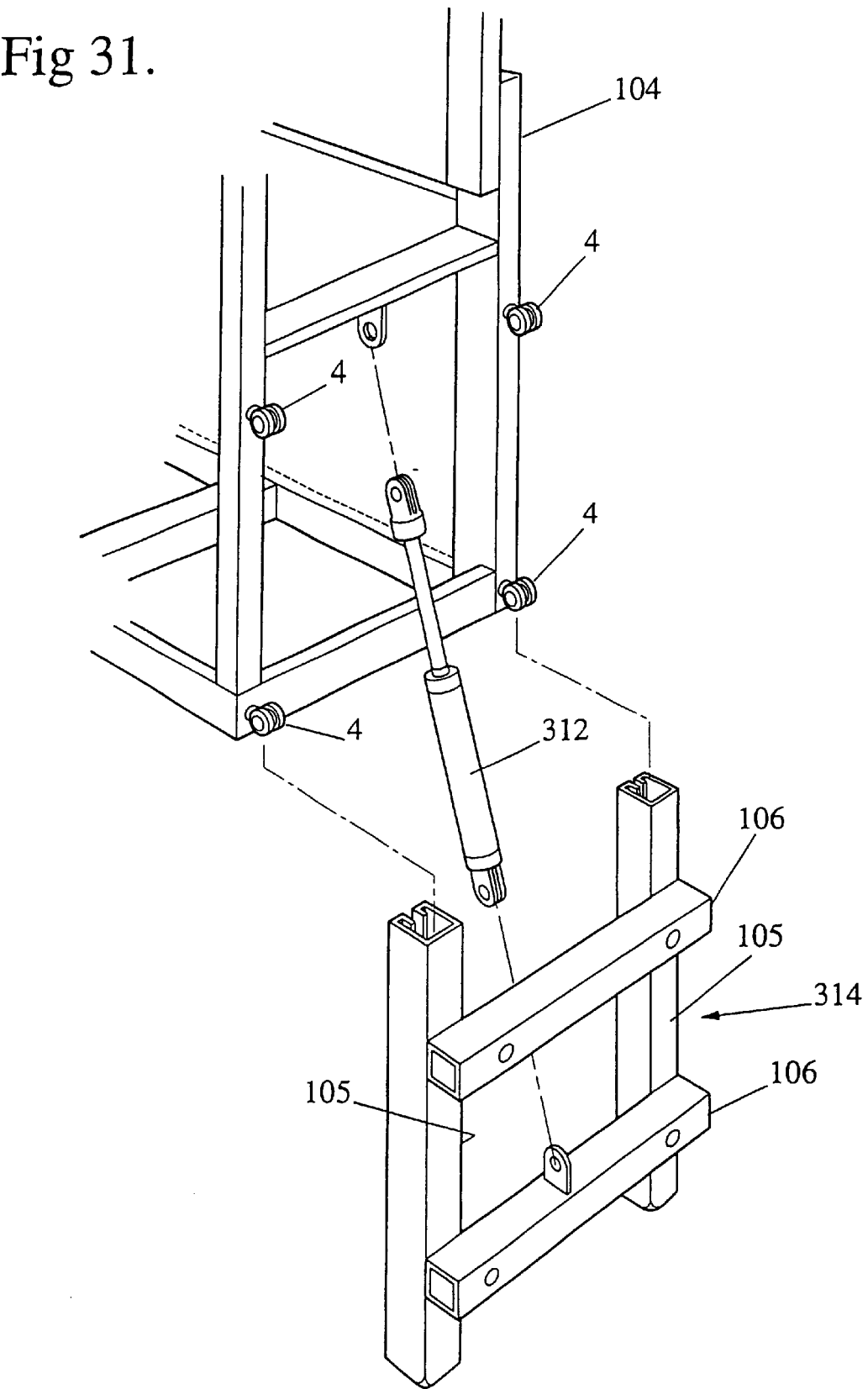

Mounted on the front (104) of the field transplanter frame (1) are the mounting points (4) for the vertical travel frame (314) shown in FIG. 31. This frame (314) consists of two vertical channel sections (105) and two cross braces (106). Four sets of wheels (4) are connected to these mounting points. These wheels (4) run inside the vertical channel sections (105) ensuring smooth vertical travel. In conjunction with the sledge runners extremely accurate positioning of plants into the ground is achieved.

Figure 32:
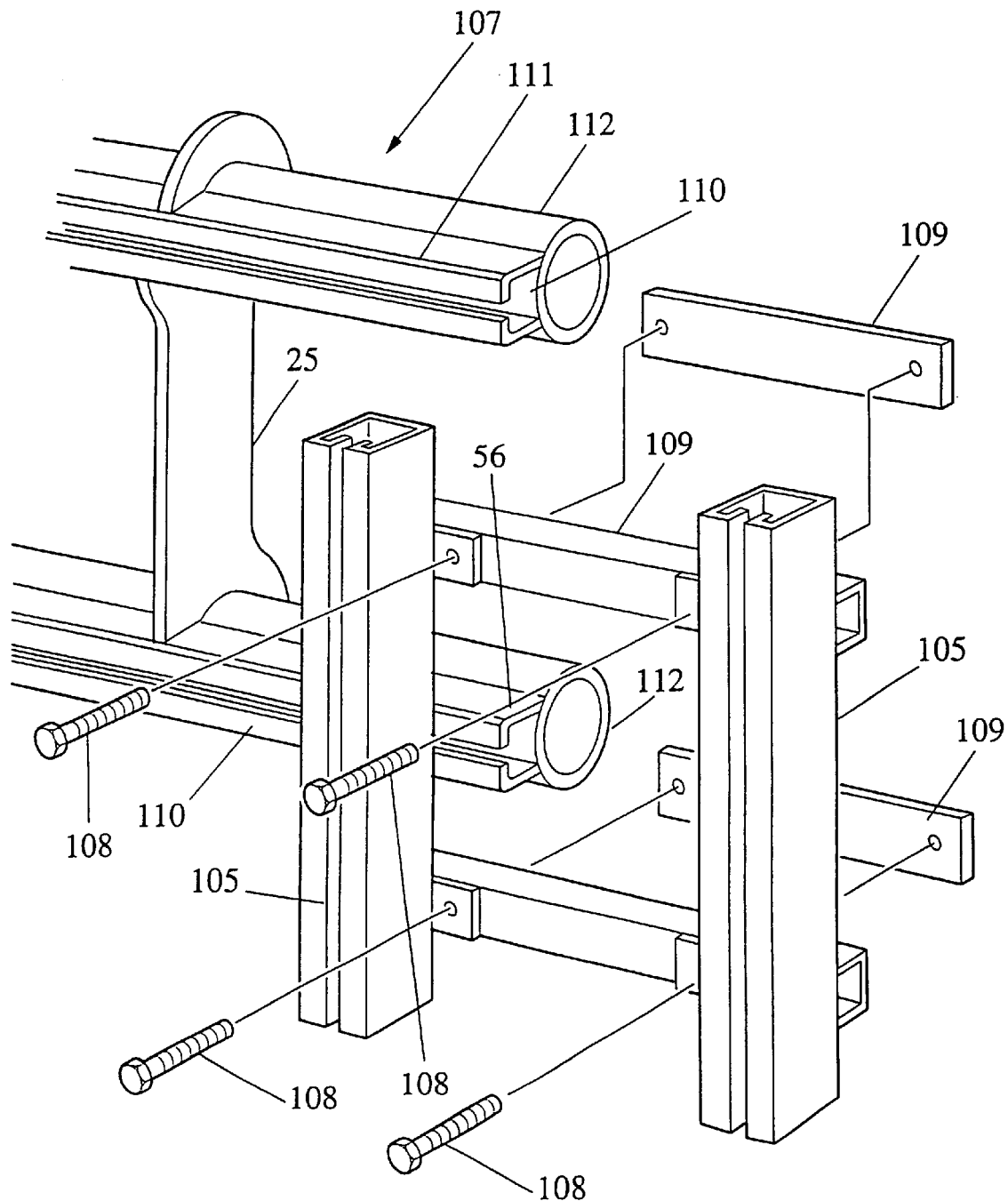
Figure 35:
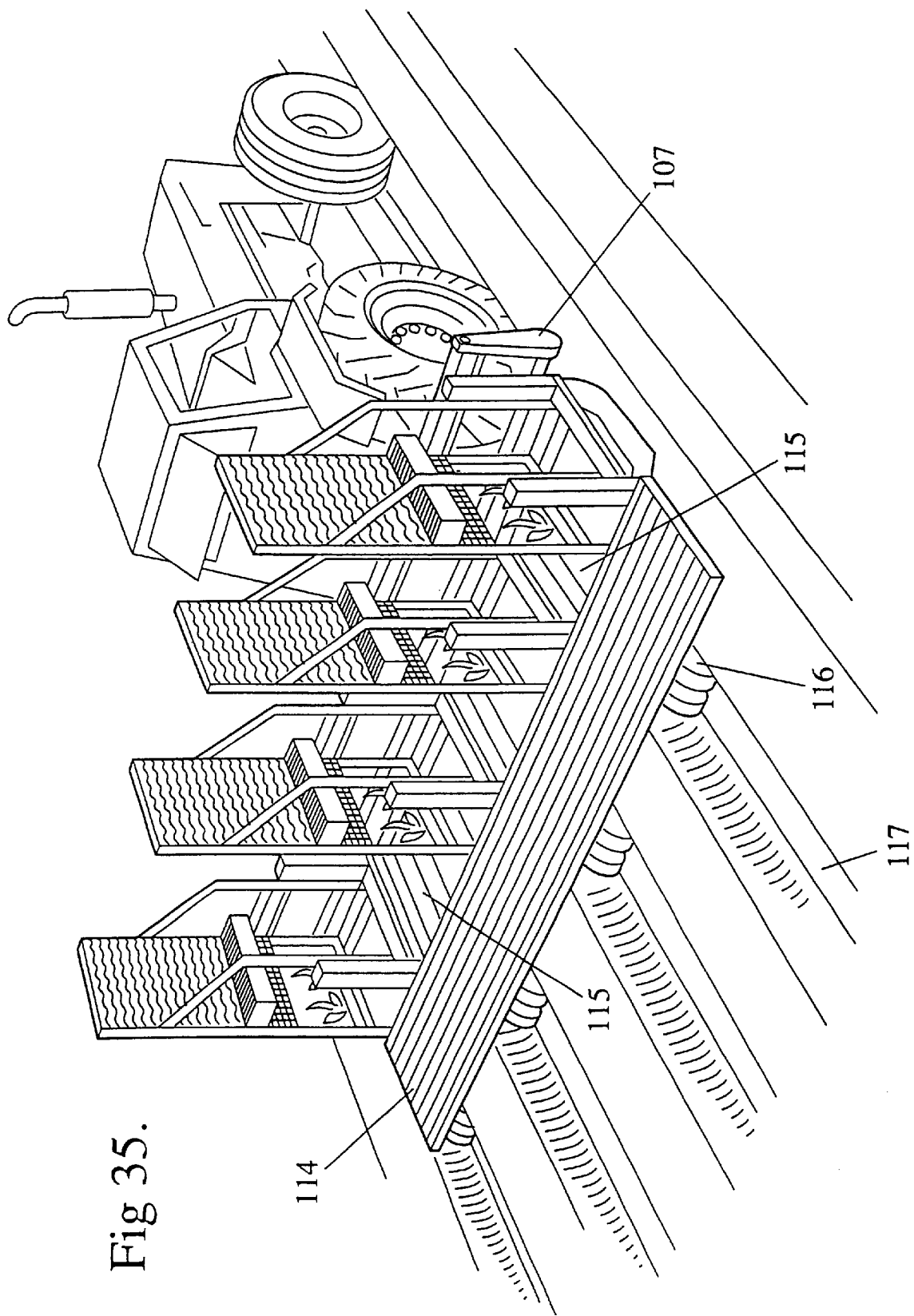
FIG. 35 is a schematic view of apparatus according to the present invention in use.
Figure 36A:
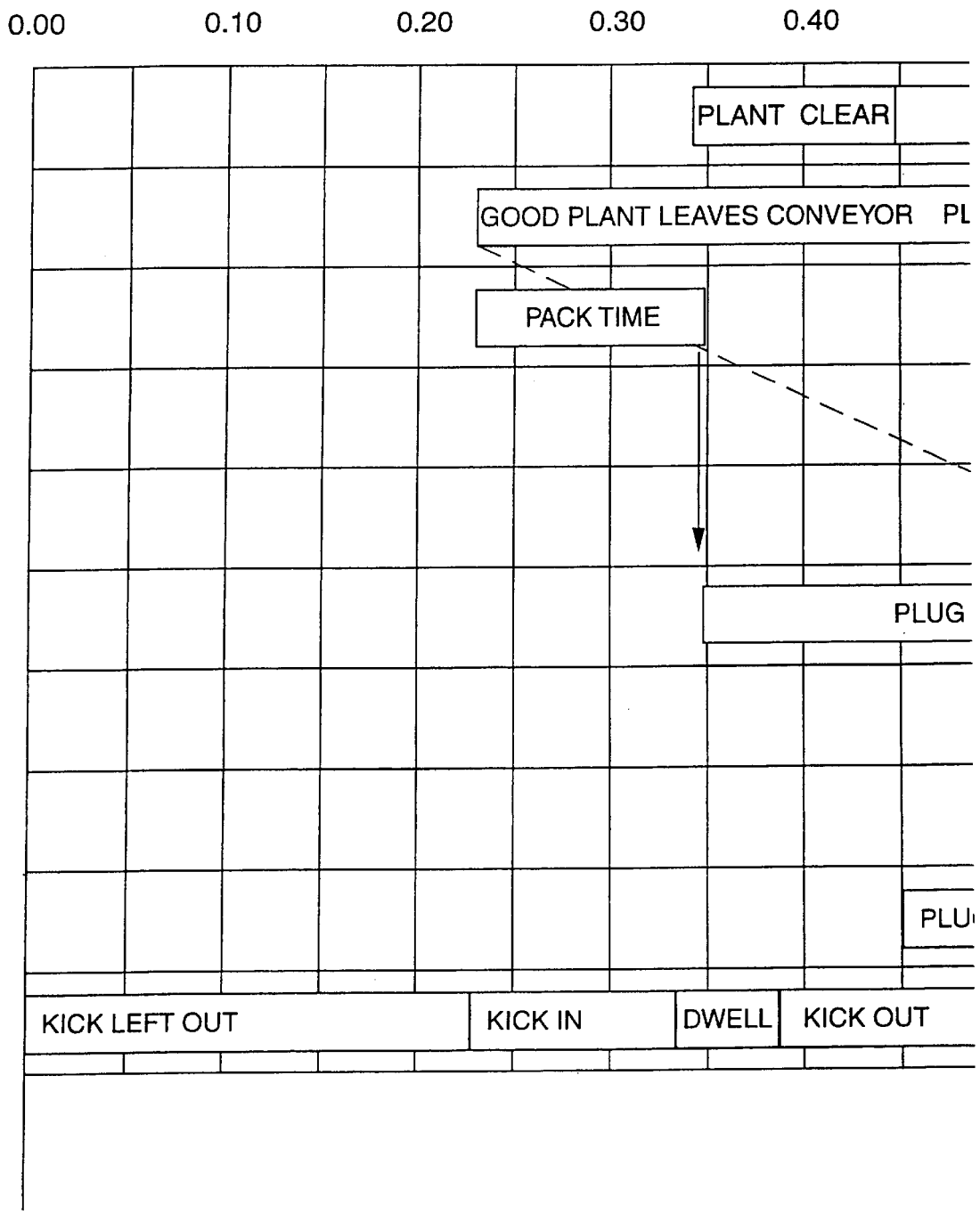
FIGS. 36, 37 and 38 are illustrative timing diagrams for various parts of the apparatus disclosed in this specification.
Figure 36B:
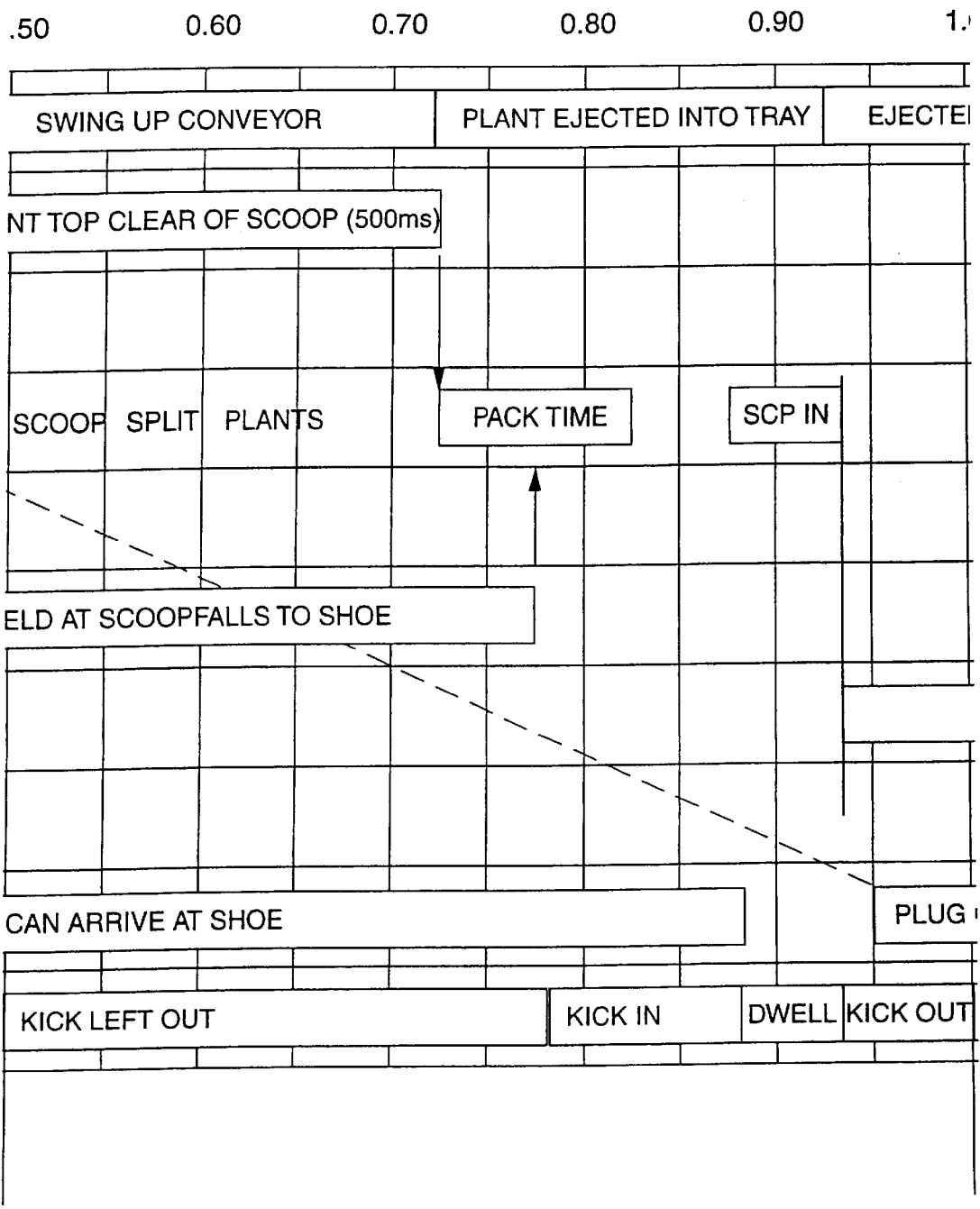
Figure 36C:
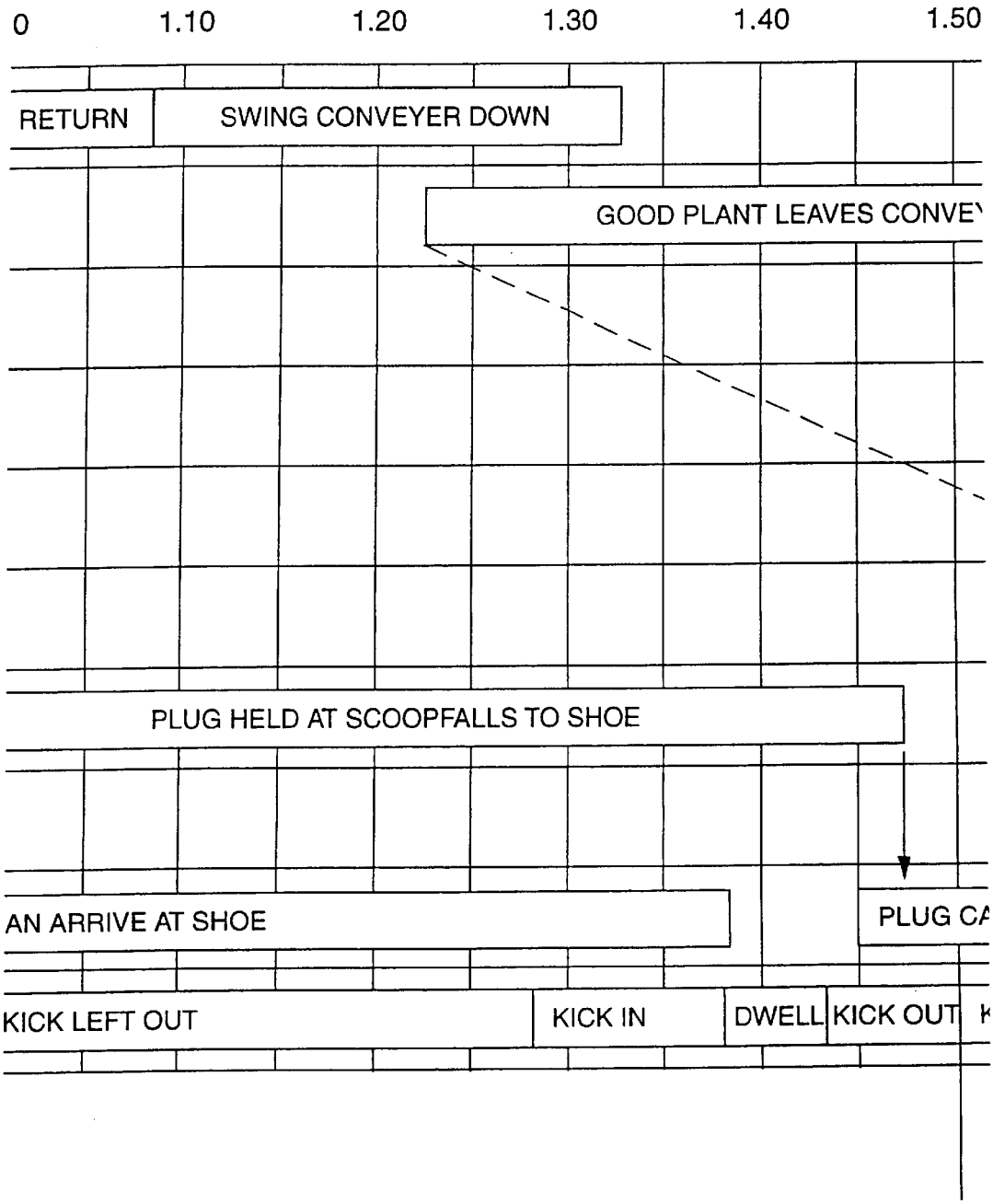
Figure 36D:
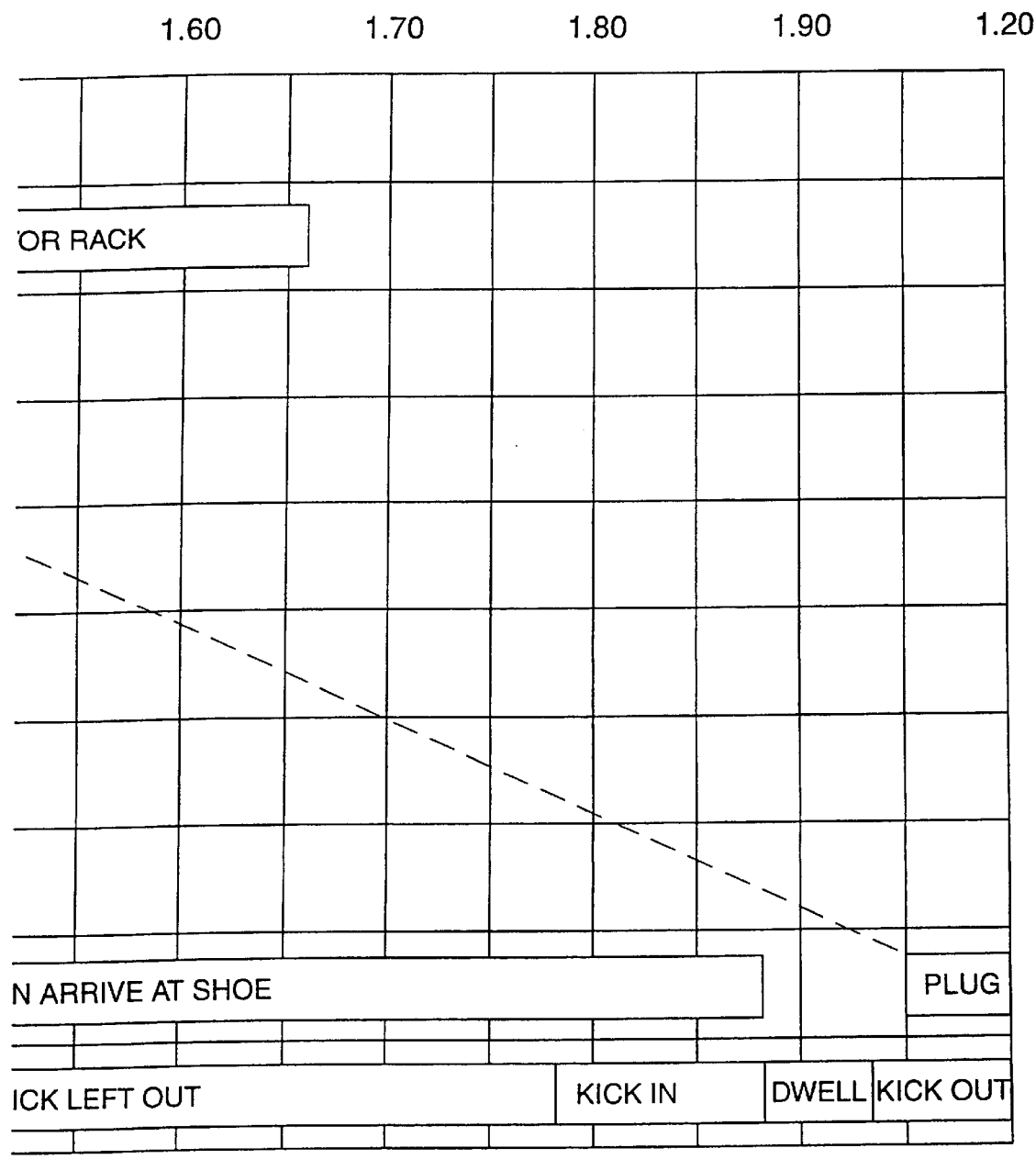
Figure 37A:
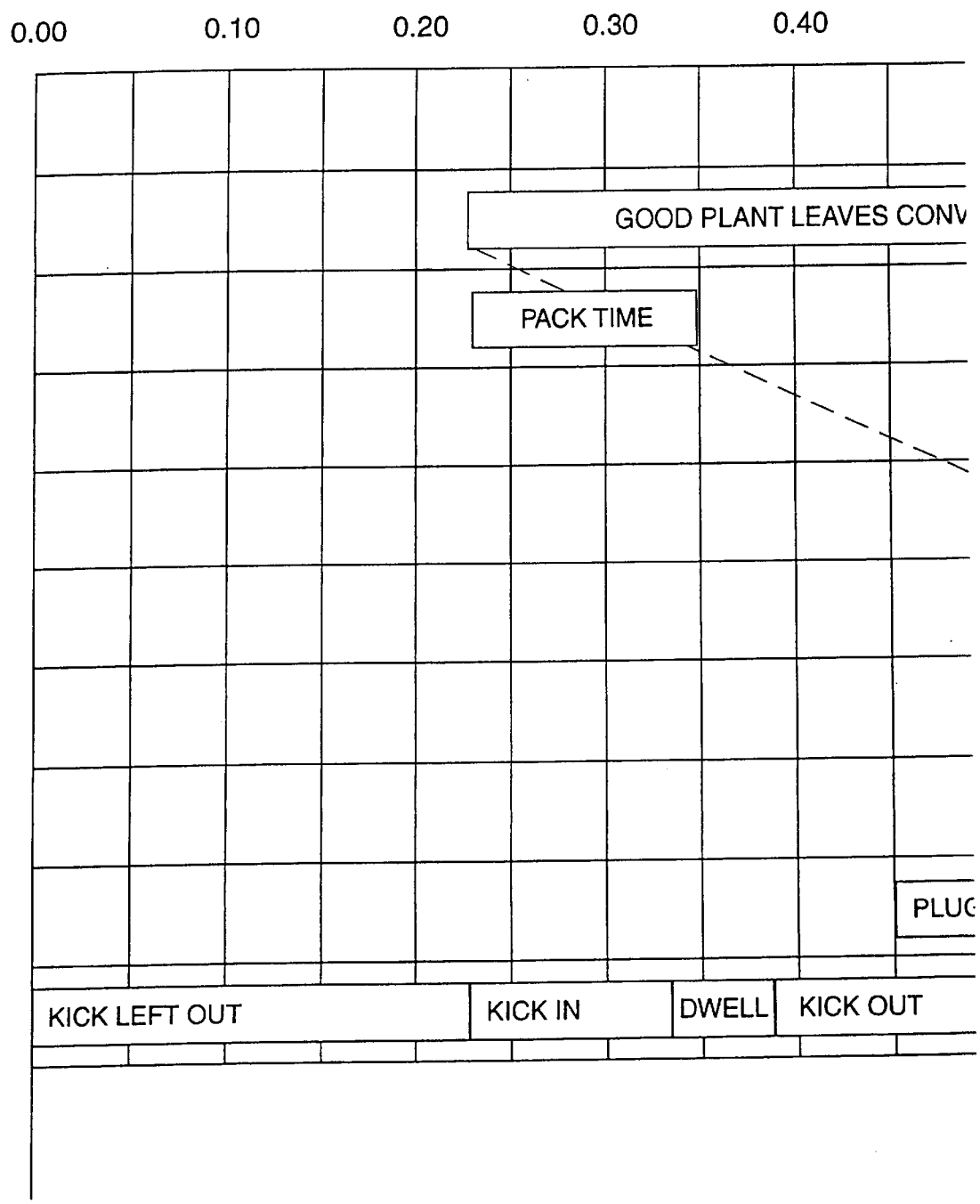
Figure 37B:
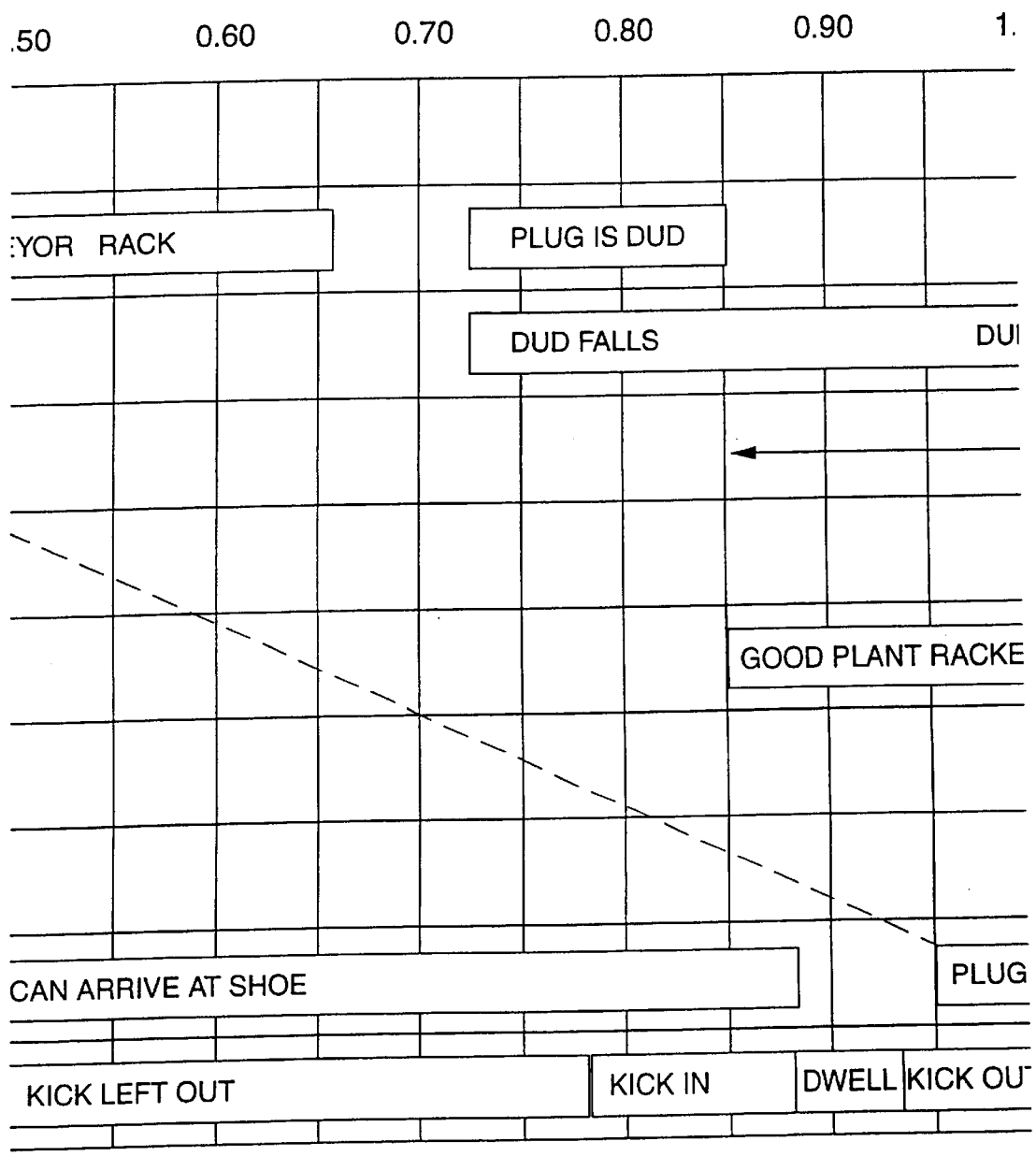
Figure 37C:
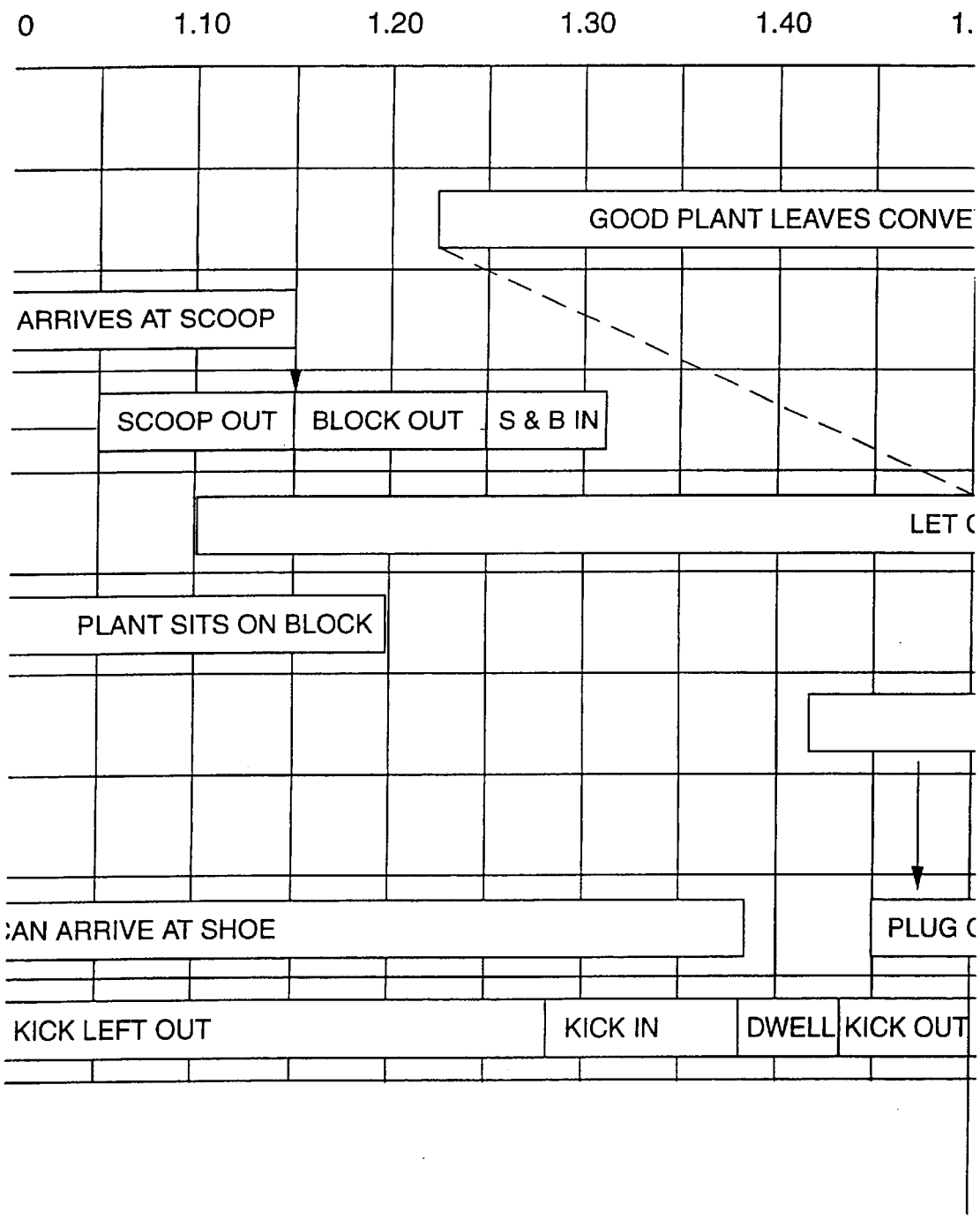
Figure 37D:
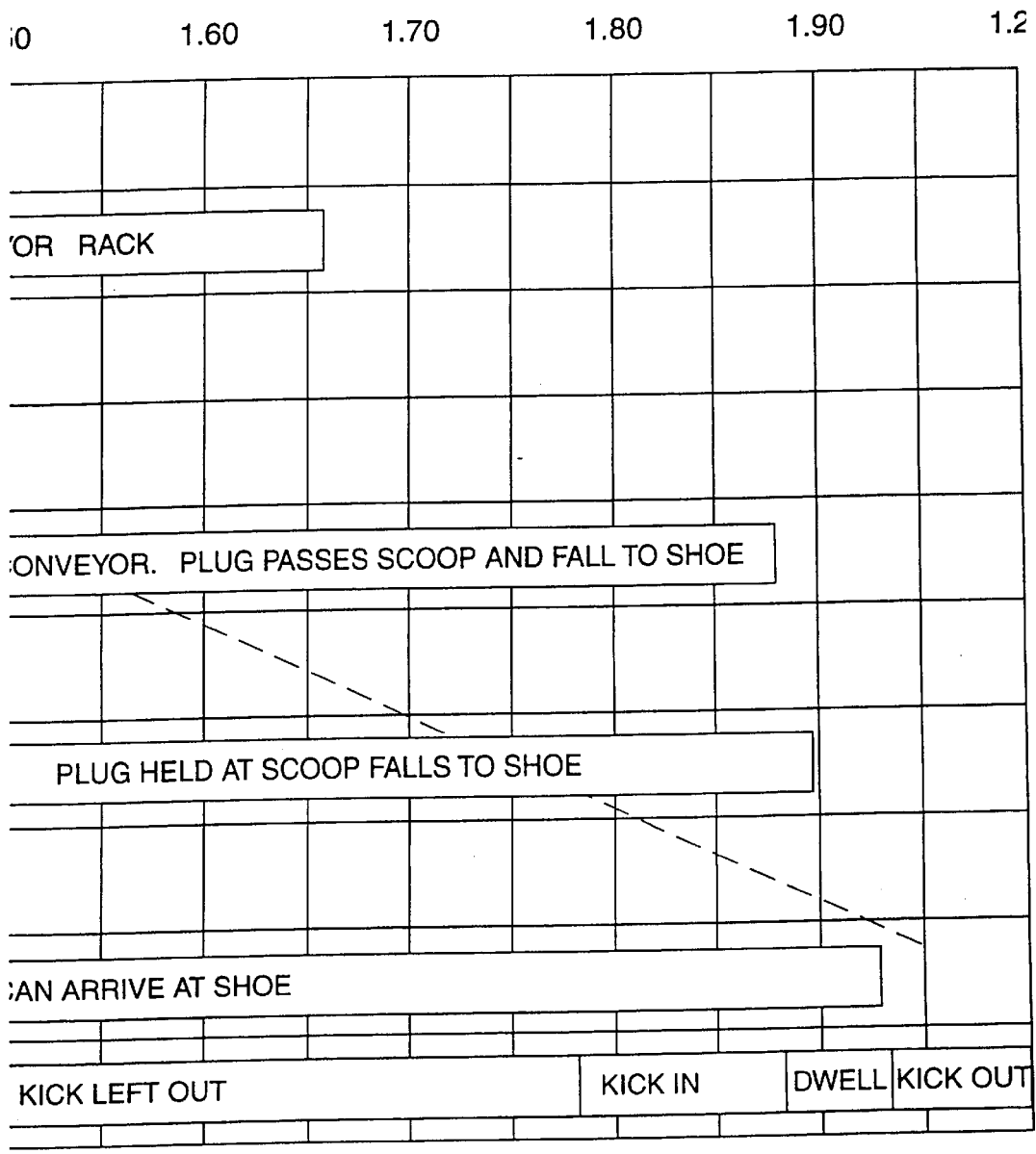
Figure 38A:
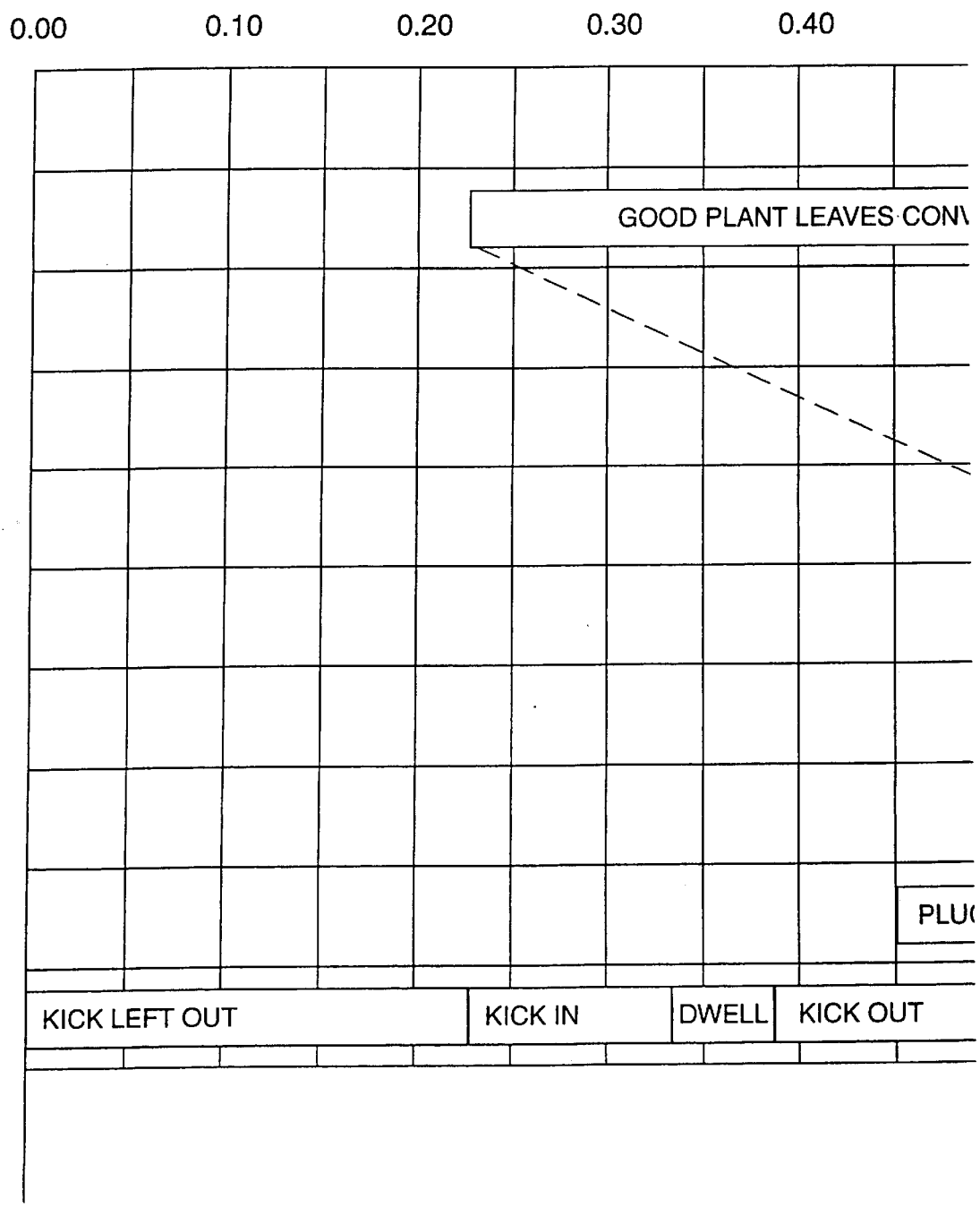
Figure 38B:
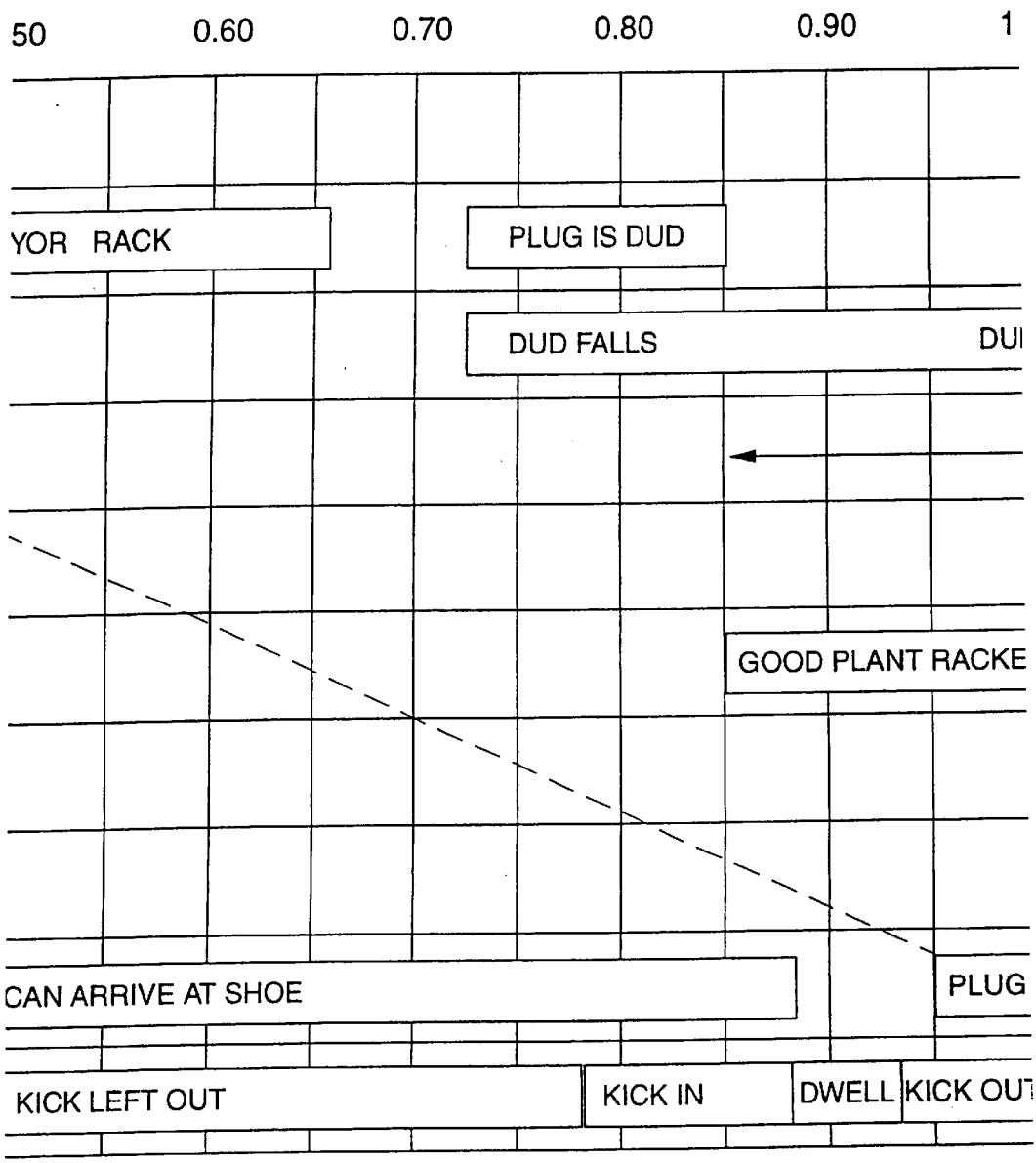
Figure 38C:
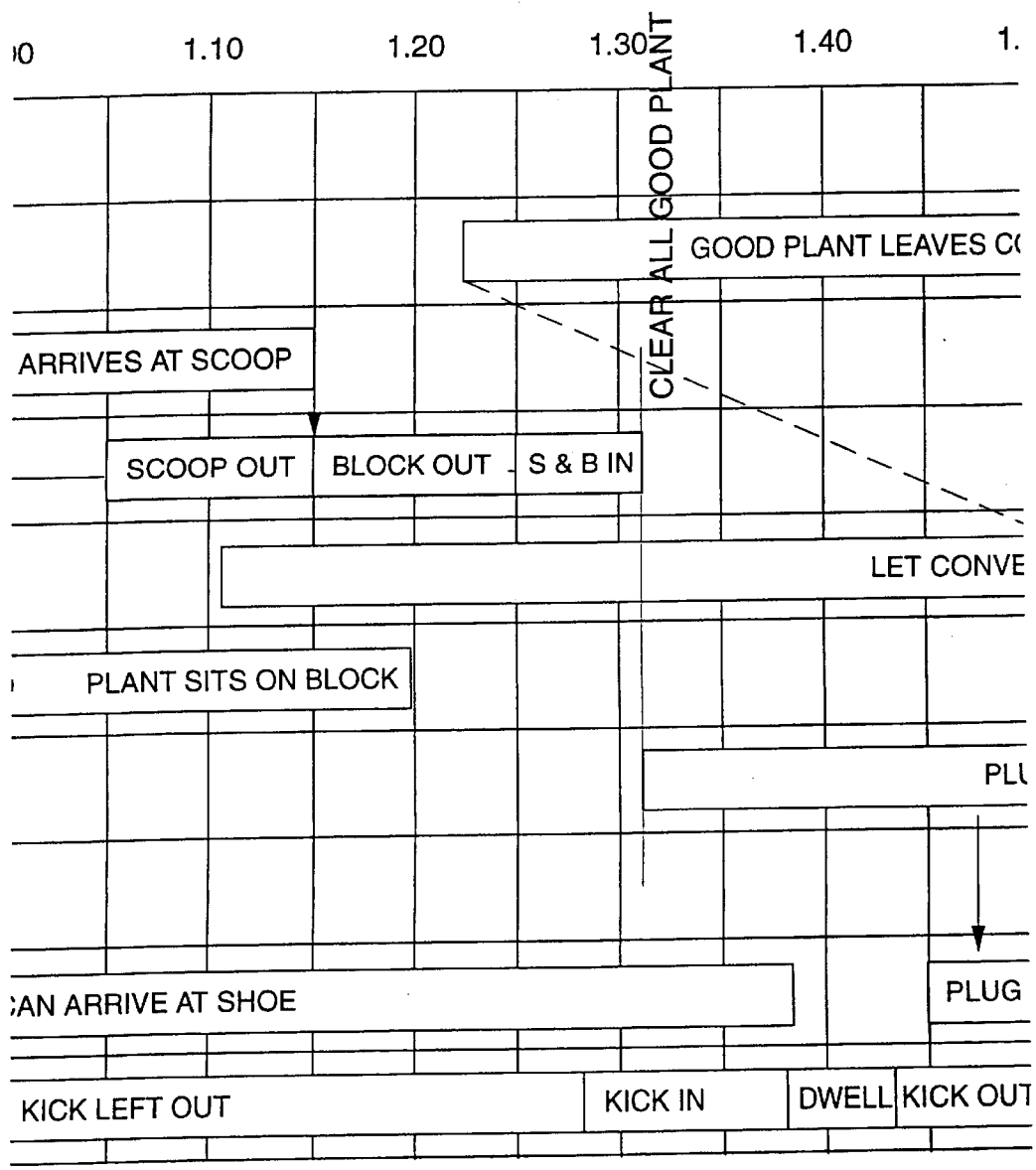
Figure 38D:
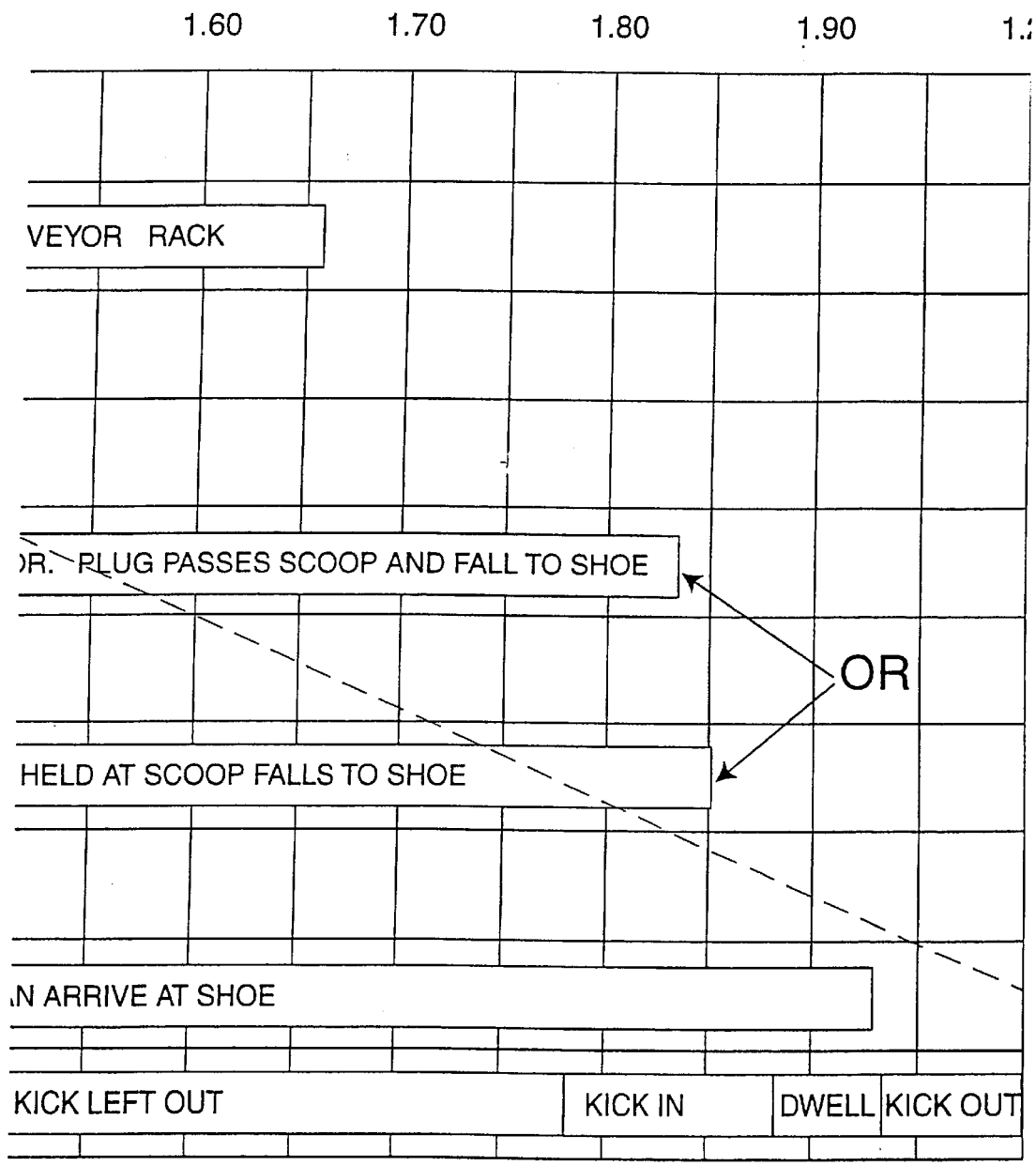

This vertical travel frame (314) is connected to the tool bar (107) (FIG. 32) via four clamp bolts (108). These clamp bolts (108) screw into flat steel bars (109) which can slide in an open horizontal channel (110) made up of two L shaped lengths of steel (111) which are welded to the tool bar (107). The tool bar (107) consists of two horizontal pipes (112) one located above the other, separated and supported by vertical plates (25). These clamp bars (109) connect the vertical travel frame (89) to the tool bar (107). These pipes (112) have a dual purpose. They act as the main structural members of the tool bar (107) and also as compressed air reservoirs to supply compressed air to the transplanter heads. The purpose of the tool bar (107) is to carry the field transplanter heads (FIG. 35). There may be four heads per tool bar. The tool bar (107) also carries the air compressor and the power supply for the electronics. Importantly soil conditions vary markedly from very soft, free running sands, through to heavy clay soils and cloddy material. To ensure gentle action on the surface of soft soils in one embodiment [see FIG. 31] of this invention an air cylinder (312) is placed between the constant height tool bar (314) and the transplanter's vertical free rolling attachment point (104). The pneumatic cylinder (312) in turn is connected to a pressure regulator so that by varying the pressure the weight of the transplanting head can be biased from zero weight through to full weight. By this means one or a multiplicity of transplanting heads can be controlled from a singular point and by raising the pressure sufficiently can be used as a means of raising all of the heads to their upper limit stops and by placing a mechanical pin to restrain individual heads and then releasing the pressure, easily converts the transplanter to any number of operative rows to suit any type of crops. The important aspect of the invention is that the control can make sure that the skis pressure can be changed from feather light on the ground, through to full pressure, and having once adjusted the correct pressure, the same surface contact pressure of the ski on the ground will remain throughout the range of vertical travel form the lower to the upper stop, as distinct from the variable pressure as obtained by a mechanical spring assembly. This feature ensures precision planting even over variable bed heights without further adjustments, giving precision plant heights relative to the surface of the individual beds. Attached to the tool bar (107) are land wheels which can be vertically adjusted to suit the bed heights or planting heights. The tool bar is connected to the tractor via the three point linkage. A rear walkway (114) can also be mounted to the tool bar via longitudinal frames (115), for easy loading and unloading of trays and easy access to field transplanting machinery whilst in operation. Small pneumatic tyred wheels (116) mounted on the longitudinal frames running between the field transplanter heads, support the rear walkway. These walkways run in the gaps between the plant beds (117) in line with the tractor wheels.

The problem of discharging one separate plant at a time from the plug retaining belt to the vertical discharge mechanism is that during the process of growth in the tray the leaves and stems tend to grow past each other and interlock. This is particularly evident with any plant that has a relatively thin stem with a broad leaf on the end of the stem, and also with plant types that have leaves that curl, and have a barbed effect of engaging with the other leaves, eg. tomatoes.

This interlocking of the leaves disrupts separation of individual plugs and plants at the eject point.

Figure 33:
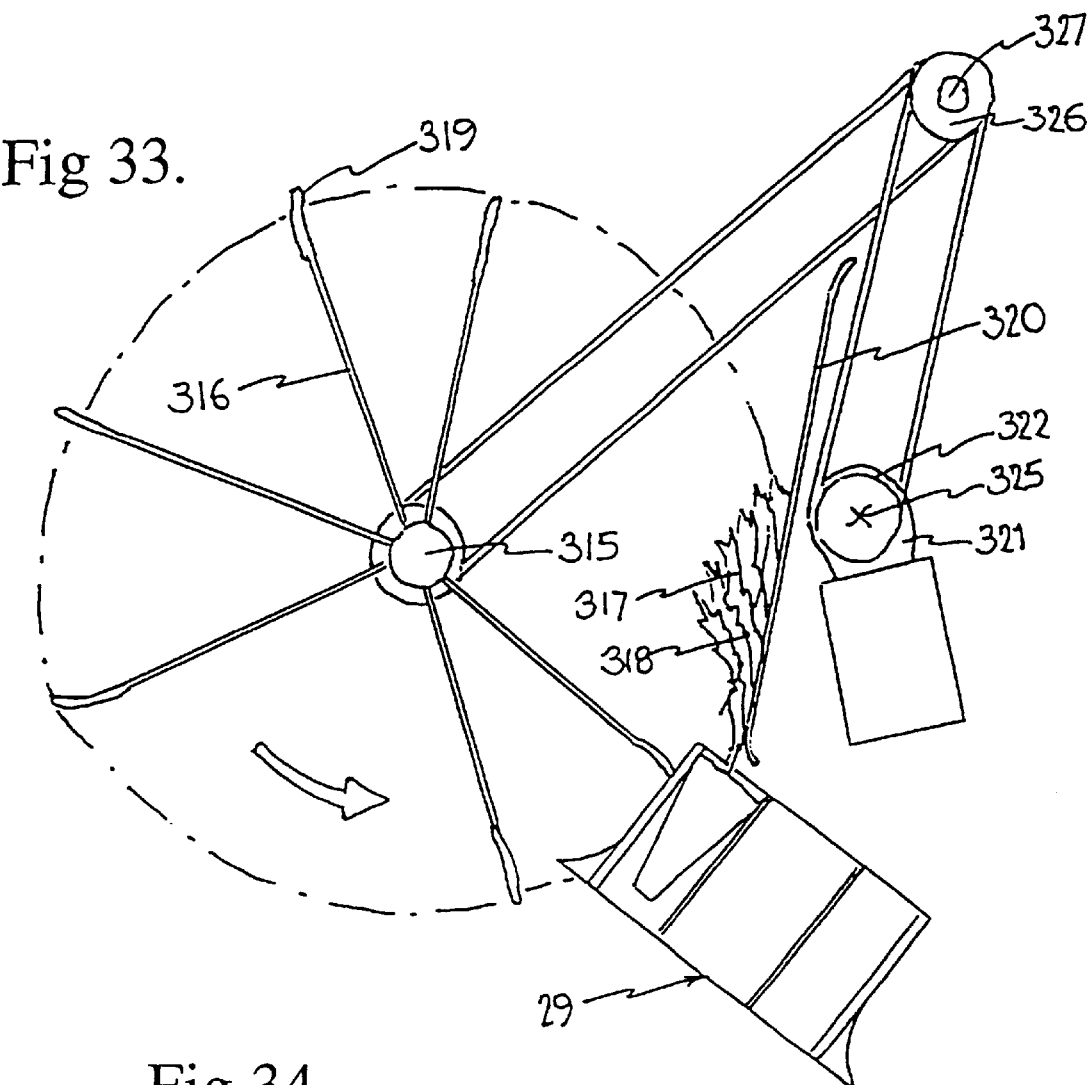
FIGS. 33 and 34 are views illustrating a device for separating leaves between adjacent plugs.
Figure 34:
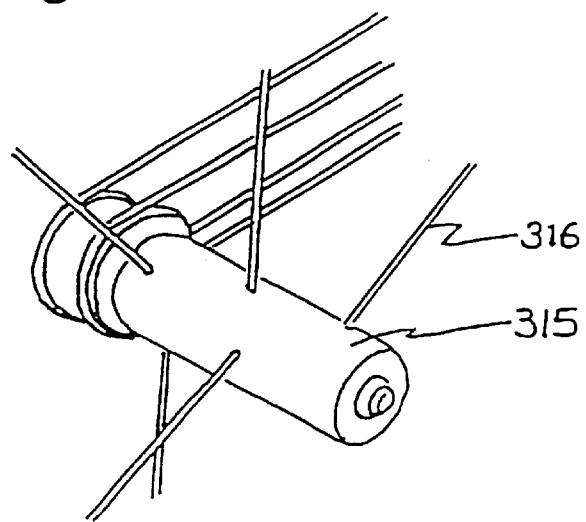

Referring to FIGS. 33 and 34, in one preferred embodiment of this invention a rotating central spindle (315) is fitted with a helix of radially disposed fingers (316) so positioned as to be sure to engage one or more times between each of the plant tops (317) and sweep upwardly, gently combing apart the foliage (318). At the end of these radially disposed fingers is a short length of soft polyurethane (319) which is attached to these fingers to prevent damage to the plants. The invention provides for the plant tops to be held against a vertical platen (320) attached to the plug retaining index belt frame to ensure presentation to the rotary comb and that each plant is separated from the next prior to reaching the eject and selectively position. Importantly the correlation between the combing fingers and the plant restraining platform must remain the same at all times during the sweep of the plug retaining belt during the up sweep to load and down sweep to eject.

To achieve this the drive (321) for the combing rotor is from a pulley (322) or sprocket centrally located on the pivotal point (325) of the plug retaining index belt (29). By this means the drive belt remains constant in length and the drive motor is mounted on a fixed location driving to the twin pulley (326) on the fulcrum point (327). This ensures minimal weight in the moving indexing plug retaining belt assembly to retain high speed movement.

To enable gapping up the various functions and movement of plants through the sequences of transfer plant storage, gapping up and transfer into the ground require very fast times of plug and plant movement as can be seen from FIGS. 36, 37, and 38. FIG. 36 illustrates the conveyor action. Gapping up suing a first sensor is shown in FIG. 37, whilst the separation of plugs without live plants (duds) from plugs with plants is shown in FIG. 38.

Gapping up is measured in terms of milliseconds as indicated in FIGS. 36 to 38 in each of the functions. Preferably the plug retaining belt is able to move in eight discrete steps per second, which equates to a time period of 125 milliseconds to move from a stationary position through one complete step or the movement of one plug retainer position to the next position and stopping within the 125 milliseconds.

With the planting rate per row into the ground at two plants per second, the time between each plant being planted is 500 milliseconds. This means that four plug retainers can be moved past a single point in 500 milliseconds. This also means that a maximum of four successive plug retainers, not containing a live plant, can be passed by a fixed point without causing a gap in the continuously and evenly spaced plants along the row in the field. It can therefore be seen that the function of transferring rows of plugs and plants from the tray to the plug retaining belt and the transfer of the plug retainer belt to a position enabling the transfer of the first plug and plant has a direct correlation between the 500 milliseconds between the plants being planted and the ability to store one or more plants which have previously been selected in the main at 125 milliseconds each and also to the vertical transfer mechanism the distance and the velocity reached by the plug and plant from the vertical transfer caused by gravity.

The result of the inter-relationship of the plant storage and speeds of loading the plants and transferring the plug retainer belt to the planting position, must be less than one second. This means that the following steps must occur within one second. The plug retaining belt transfers from the transplanting position (400) to the plant loading position (401) (FIG. 5), the plug ejectors (17) transfer the plug and plants (24) from the trays (6) into the plug retainer belt (29), the plug ejectors (17) withdraw clear of the plug retaining belt (29), which is indicated by a sensor, the plug retaining belt swings down through its tangential arc and pulses forward a plug and plant. This series of steps is accomplished within one second.

The claims defining the invention are as follows:

1. Apparatus for transplanting plugs of propagating medium and seedlings from a tray including a plurality of plug retaining cells into a prepared ground planting position, said apparatus including tray holding means, plug eject means for removing one or more said plugs from the retaining cells, plug delivery means for receiving a plug ejected from said tray and delivering same via a travel path having at least one substantially upright drop tube to a ground planting preparation device arranged to at least partly prepare said ground planting position, plug holding means associated with said ground planting preparation device arranged to hold a plug delivered by said delivery means, plug removal means arranged between said eject means and said holding means to remove any plug not containing a seedling viable for planting from said travel path prior to reaching said holding means, and plug planting means operable to release and move a plug containing a viable for planting seedling from said holding means to the prepared ground planting position in response to said apparatus having travelled a predetermined distance over the ground.

2. Apparatus according to claim 1, wherein said plug holding means further includes at least one intermediate plug holding means located along said travel path to interrupt and hold a plug at said intermediate holding device, the or each said intermediate holding means including sensor means to determine is a seedling viable for planting is included in the plug held by the intermediate plug holding means, and plug removal means associated with each said intermediate holding means to remove from said travel path any plug not containing a seedling viable for planting.

3. Apparatus according to claim 2 wherein at least one said intermediate plug holding means is located along the or each said drop tube.

4. Apparatus according to claim 2 wherein at least one further sensor means is located before the or each said intermediate plug holding device to determine if a plug contains a seedling viable for planting as said plug moves along said travel path.

5. Apparatus according to claim 4, wherein a further said plug removal means is provided associated with the or each said further sensor means to remove from said travel path any plug not containing a seedling viable for planting.

6. Apparatus according to claim 2 further including adjustable control means for varying the time of release of a said plug from at least one of said holding means.

7. Apparatus according to claim 1 wherein said plug delivery means includes an endless conveyor having a plurality of plug receiving receptacles therealong, each of said plug receiving receptacles being adapted to receive a plug ejected from a plug retaining cell of the tray, said endless conveyor being bodily movable from a position where one or more said plugs are positioned in respective said plug receiving receptacles to a second position where said plugs are sequentially released from said endless conveyor.

8. Apparatus according to claim 7, wherein the bodily movement of said endless conveyor occurs over 60° to 120°.

9. Apparatus according to claim 1 wherein said tray holding means is arranged to hold at least one tray in a substantially vertical orientation and includes tray indexing means to index each said tray downwardly a predetermined distance by one row of said plug retaining cells per each indexing movement, said plug eject means being arranged to eject simultaneously a row of said plugs to the plug delivery means.

10. Apparatus for transplanting plugs of propagating medium and seedlings from a tray including a plurality of plug retaining cells into a prepared ground planting position, said apparatus comprising tray holding means, plug eject means from removing one or more of said plugs from the plug retaining cells, plug delivery means for receiving a plug ejected from said tray and delivering same to a ground planting preparation device, said plug delivery means including one or more drop tubes defining a travel path for ejected plugs to the planting preparation device, plug holding means having sensor means associated therewith to determine if an ejected plug at said plug holding means includes a live seedling viable for planting, said plug holding means also including plug deflecting means operable in response to said sensor means determining that an ejected plug at said plug holding means does not contain a live seedling viable for planting for deflecting from said path a plug not containing a live seedling.

11. Apparatus according to claim 10, wherein said plug delivery means include re-orientation means arranged to reorientate ejected plugs such that the ejected plugs are directed downwardly when they enter any of said drop tubes.

12. Apparatus for transplanting plugs of propagating medium and seedlings from a tray including a plurality of plug retaining cells into a prepared ground planting position, said apparatus comprising tray holding means, plug eject means for removing one or more of said plugs from the plug retaining cells, plug delivery means for receiving a plug ejected from said tray and delivering same to a ground planting preparation device, said plug delivery means including an endless conveyor operable in a first position to receive and hold a plurality of ejected plugs from the plug retaining cells of the tray, said endless conveyor being bodily movable from said first position to a second position where said ejected plugs are sequentially released at a release zone from said endless conveyor, delivery tube means for delivering ejected plugs along a path from said release zone to said planting device, first sensor means arranged to sense each ejected plug after release from said endless conveyor to determine whether a live seedling viable for transplanting is included in said plug, and deflecting means operable in response to operation of said first sensor means sensing the absence of a viable plant in an ejected plug to deflect such plug from said path.

13. Apparatus according to claim 12 including means operable if said first sensor means does not sense a live seedling viable for transplanting to accelerate the advance of said conveyor until a live seedling viable for transplanting is sensed.

14. Apparatus according to claim 12 further including second sensor means associated with said endless conveyor to sense each said ejected plug conveyed by said endless conveyor and operable to determine whether a live seedling viable for transplanting exists therewith, said second sensor means being upstream of said received portion of said conveyor.

15. Apparatus according to claim 14 wherein an intermediate ejected plug holding means for holding ejected plugs is provided part way along said path, a third sensor means at said intermediate ejected plug holding means operable to sense if a seedling viable for transplanting exists with each ejected plug held at the intermediate plug holding means, and additional eject means adjacent the intermediate plug holding means to eject plugs from said path means when the third sensor means senses that a plug does not contain a seedling viable for transplanting.

16. Apparatus according to claim 12, wherein said delivery tube means has an inlet and said plug deflecting means is adjacent the inlet of said delivery tube means.

17. Apparatus according to claim 12 wherein the endless conveyor includes a plurality of adjacent transversely extending receptacles open at both ends and adapted to retain an ejected plug therein, each said receptacle being formed by a belt portion of the endless conveyor and spaced wall portions laterally extending from said belt portion, each said wall portion having a T-shape in cross-section providing a plurality of spaced retaining bars spaced from said belt portion.

18. Apparatus according to claim 17, wherein said belt portion passes around roller means of a diameter sufficient to enlarge the space between adjacent retaining bars to form a release zone at which the plugs may be released from the endless conveyor.

19. Apparatus according to claim 18, wherein the belt portion of said conveyor moves at a speed sufficient to release said plugs laterally away from the conveyor means at said release zone.

20. Apparatus according to claim 17 wherein when said conveyor is at said second position, a movable member underlies a lower end of the receptacles so as to retain the plugs therein until the release zone is reached.

21. Apparatus according to claim 12 wherein the endless conveyor includes a plurality of transversely extending receptacles to retain an ejected plug therein, said endless conveyor having a plurality of spaced teeth formations on an inner surface, an indexing member having shaped formations thereon complimentary to and cooperable with said spaced teeth formations, activator means for moving said indexing member, said indexing member being movable in a forward direction and a reverse direction whereby in the forward direction of movement of said indexing member said indexing engages with the teeth formations on one length of said endless conveyor and in the reverse direction of movement of said indexing member, said indexing member engages with the teeth formations on a second length of said endless conveyor opposite to said one length.

22. Apparatus according to claim 21, wherein said indexing member is movable laterally towards said second length and away from said one length, and vice versa, when the indexing member is moved in the reverse and the forward directions respectively.

23. Seedling transplanting apparatus for use with a planting device movable in a planting direction along a field for successively transplanting seedlings each of which is retained in a plug of propagating medium removably accommodated in a cell of a multi-cell tray, said apparatus comprising ejecting means for ejecting said plugs from the respective cells of said tray; plug delivery means for receiving an ejected plug and delivering said ejected plug along a path toward said planting device in condition to be planted in said field; sensing means along said path for sensing the absence from an ejected plug traveling said path of a seedling viable for planting; and ejected plug removal means upstream of said plug planting device operable in response to sensing by said sensing means of the absence of a viable seedling from said ejected plug to remove such plug from said path prior to its delivery to said planting device.

24. The apparatus according to claim 23 wherein said delivery means comprises an upright drop tube.

* * * * *